(12) United States Patent
Koyama et al.

(10) Patent No.: US 8,907,881 B2
(45) Date of Patent: Dec. 9, 2014

(54) LIQUID CRYSTAL DISPLAY DEVICE AND METHOD FOR DRIVING THE SAME

(75) Inventors: Jun Koyama, Sagamihara (JP); Hiroyuki Miyake, Atsugi (JP); Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 739 days.

(21) Appl. No.: 13/078,209

(22) Filed: Apr. 1, 2011

(65) Prior Publication Data

US 2011/0248970 A1 Oct. 13, 2011

(30) Foreign Application Priority Data

| Apr. 9, 2010 | (JP) | 2010-090938 |
| Apr. 9, 2010 | (JP) | 2010-090944 |
| May 18, 2010 | (JP) | 2010-114440 |
| May 18, 2010 | (JP) | 2010-114445 |

(51) Int. Cl.
| G09G 3/38 | (2006.01) |
| G06F 3/042 | (2006.01) |
| G06F 3/047 | (2006.01) |
| G06F 3/044 | (2006.01) |
| G09G 3/34 | (2006.01) |
| G02F 1/1345 | (2006.01) |
| G09G 3/36 | (2006.01) |

(52) U.S. Cl.
CPC ...... G09G 3/3607 (2013.01); G09G 2310/0235 (2013.01); G06F 3/042 (2013.01); G06F 3/047 (2013.01); G09G 2310/024 (2013.01); G09G 3/3688 (2013.01); G06F 3/044 (2013.01); G09G 2310/0205 (2013.01); G09G 2300/0426 (2013.01); G09G 3/3426 (2013.01); G09G 2300/0814 (2013.01); G09G 3/3413 (2013.01); G09G 3/3677 (2013.01); G09G 3/3659 (2013.01); G02F 1/13452 (2013.01); G09G 2320/0242 (2013.01)
USPC .................. 345/93; 345/92; 345/94; 345/211

(58) Field of Classification Search
USPC .................... 345/87–103, 204–215, 690–699
See application file for complete search history.

(56) References Cited

U.S. PATENT DOCUMENTS

| 6,115,017 A * | 9/2000 | Mikami et al. | 345/92 |
| 6,448,951 B1 * | 9/2002 | Sakaguchi et al. | 345/88 |

(Continued)

FOREIGN PATENT DOCUMENTS

| EP | 1930865 A | 6/2008 |
| JP | 11-337904 A | 12/1999 |

(Continued)

OTHER PUBLICATIONS

Taira, K. et al., "A 15" Field-Sequential Display without Color Break-Up using an AFLC Color Shutter", IDW '00, Proceedings of the Seventh International Display Workshops, 73-76 (2000).

(Continued)

*Primary Examiner* — Dmitriy Bolotin
(74) *Attorney, Agent, or Firm* — Eric J. Robinson; Robinson Intellectual Property Law Office, P.C.

(57) ABSTRACT

In the liquid crystal display device, image signals are concurrently supplied to pixels provided in a plurality of rows among pixels arranged in matrix in a pixel portion where input of image signals is controlled by transistors including polycrystalline semiconductors or single crystal semiconductors in channel formation regions. Thus, the image quality of the liquid crystal display device can be improved.

7 Claims, 22 Drawing Sheets

(56) References Cited

U.S. PATENT DOCUMENTS

| | | |
|---|---|---|
| 6,597,348 B1 | 7/2003 | Yamazaki et al. |
| 7,317,438 B2 | 1/2008 | Yamazaki et al. |
| 7,385,579 B2 | 6/2008 | Satake |
| 7,403,177 B2 | 7/2008 | Tanada et al. |
| 7,728,810 B2 * | 6/2010 | You et al. ............... 345/103 |
| 7,773,066 B2 | 8/2010 | Yamazaki et al. |
| 7,791,571 B2 | 9/2010 | Ohtani et al. |
| 7,834,830 B2 | 11/2010 | Yamazaki et al. |
| 7,855,770 B2 | 12/2010 | Egi et al. |
| 8,426,866 B2 * | 4/2013 | Kimura et al. ............... 257/72 |
| 8,766,906 B2 | 7/2014 | Yoshida et al. |
| 2002/0018029 A1 * | 2/2002 | Koyama ............... 345/39 |
| 2002/0024485 A1 * | 2/2002 | Koyama ............... 345/87 |
| 2004/0095305 A1 * | 5/2004 | Kimura et al. ............... 345/92 |
| 2004/0222955 A1 * | 11/2004 | Koyama ............... 345/87 |
| 2007/0057904 A1 * | 3/2007 | Huang et al. ............... 345/103 |
| 2007/0120810 A1 * | 5/2007 | You et al. ............... 345/103 |
| 2007/0279359 A1 * | 12/2007 | Yoshida et al. ............... 345/89 |
| 2007/0279374 A1 | 12/2007 | Kimura et al. |
| 2008/0024418 A1 * | 1/2008 | Kim ............... 345/98 |
| 2008/0158137 A1 * | 7/2008 | Yoshida ............... 345/102 |
| 2008/0180385 A1 | 7/2008 | Yoshida et al. |
| 2009/0051674 A1 * | 2/2009 | Kimura et al. ............... 345/204 |
| 2009/0073100 A1 * | 3/2009 | Kim et al. ............... 345/92 |
| 2009/0267878 A1 * | 10/2009 | Song et al. ............... 345/87 |
| 2009/0273555 A1 * | 11/2009 | Song et al. ............... 345/96 |
| 2009/0273557 A1 * | 11/2009 | Song et al. ............... 345/100 |
| 2009/0289964 A1 * | 11/2009 | Miyachi ............... 345/690 |
| 2010/0134398 A1 * | 6/2010 | Toyota et al. ............... 345/92 |
| 2010/0134451 A1 * | 6/2010 | Cho et al. ............... 345/205 |
| 2010/0225615 A1 * | 9/2010 | Kurokawa ............... 345/175 |
| 2010/0321420 A1 | 12/2010 | Ohtani et al. |
| 2011/0001725 A1 | 1/2011 | Kurokawa |
| 2011/0025729 A1 | 2/2011 | Yamazaki et al. |
| 2011/0051034 A1 | 3/2011 | Egi et al. |
| 2011/0248978 A1 | 10/2011 | Koyama et al. |
| 2011/0249037 A1 | 10/2011 | Koyama et al. |
| 2012/0002132 A1 | 1/2012 | Yamazaki et al. |
| 2012/0019567 A1 | 1/2012 | Yamazaki et al. |
| 2014/0139568 A1 | 5/2014 | Yoshida et al. |

FOREIGN PATENT DOCUMENTS

| | | |
|---|---|---|
| JP | 2003-255912 A | 9/2003 |
| JP | 2006-220685 | 8/2006 |
| JP | 2006-220685 A | 8/2006 |
| JP | 2007-264211 A | 10/2007 |
| JP | 2008-139797 A | 6/2008 |
| JP | 2009-042405 | 2/2009 |
| JP | 2009-042405 A | 2/2009 |
| JP | 2009-053594 A | 3/2009 |

OTHER PUBLICATIONS

Kurita, T. et al., "Evaluation and Improvement of Picture Quality for Moving Images on Field-sequential Color Displays", IDW '00, Proceedings of the Seventh International Display Workshops, 69-72 (2000).

Järvenpää, T. "Measuring Color Breakup of Stationary Images in Field-Sequential-Color Displays", SID 04 Digest, 82-85 (2004).

Baron, P. C. et al., "Can Motion Compensation Eliminate Color Breakup of Moving Objects in Field-Sequential Color Displays?", SID 96 Digest, 843-846.

* cited by examiner

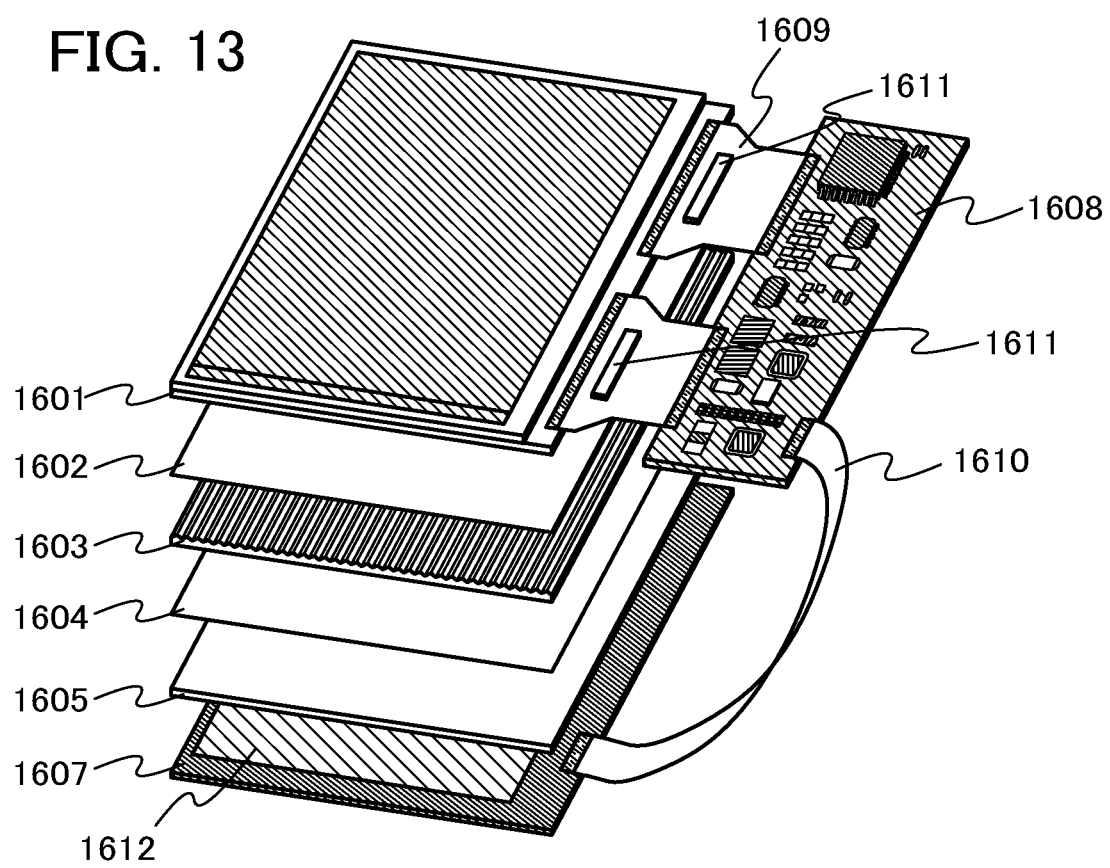

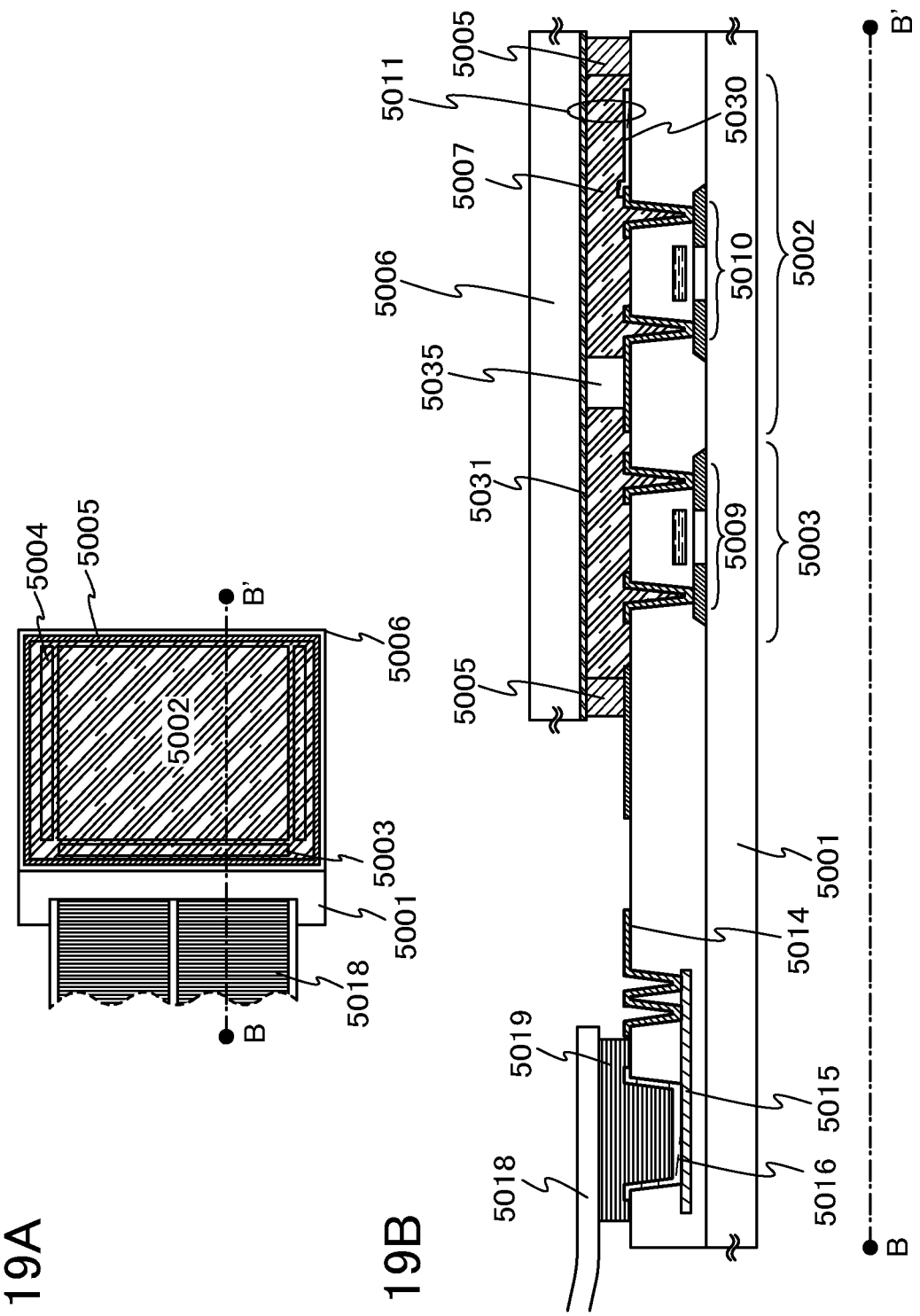

LIQUID CRYSTAL DISPLAY DEVICE AND METHOD FOR DRIVING THE SAME

BACKGROUND OF THE INVENTION

1. Field of the Invention

The present invention relates to liquid crystal display devices and methods for driving the liquid crystal display devices. In particular, the present invention relates to field-sequential liquid crystal display devices and methods for driving the field-sequential liquid crystal display devices.

2. Description of the Related Art

As display methods of liquid crystal display devices, a color filter method and a field sequential method are known. In a color-filter liquid crystal display device, a plurality of subpixels which have color filters for transmitting only light of wavelengths with given colors (e.g., red (R), green (G), and blue (B)) are provided in each pixel. A desired color is expressed by control of transmission of white light in each subpixel and mixture of a plurality of colors in each pixel. In contrast, in a field-sequential liquid crystal display device, a plurality of light sources that emit lights of different colors (e.g., red (R), green (G), and blue (B)) are provided. A desired color is expressed by sequential lighting of the plurality of light sources and control of transmission of light of different colors in each pixel. In other words, the color filter method is a method by which a desired color is expressed by division of one pixel among lights of given colors, and the field sequential method is a method by which a desired color is expressed by division of a display period among lights of given colors.

The field-sequential liquid crystal display device has the following advantages over the color-filter liquid crystal display device. First, in the field-sequential liquid crystal display device, it is not necessary to provide subpixels in each pixel. Thus, the aperture ratio can be improved or the number of pixels can be increased. Further, in the field-sequential liquid crystal display device, it is not necessary to provide color filters. That is, light loss caused by light absorption in color filters does not occur. Therefore, transmittance can be improved and power consumption can be reduced.

Reference 1 discloses a field-sequential liquid crystal display device. Specifically, Reference 1 discloses a liquid crystal display device in which each pixel includes a transistor for controlling input of an image signal, a signal storage capacitor for holding the image signal, and a transistor for controlling transfer of an electrical charge from the signal storage capacitor to a display pixel capacitor. In the liquid crystal display device with the structure, writing of an image signal to the signal storage capacitor and display based on an electrical charge held in the display pixel capacitor can be performed concurrently.

REFERENCE

Reference 1: Japanese Published Patent Application No. 2009-042405

SUMMARY OF THE INVENTION

An object of one embodiment of the present invention is to improve the image quality of a liquid crystal display device.

The object can be achieved by concurrent supply of image signals to pixels provided in a plurality of rows among pixels arranged in matrix in a pixel portion of a liquid crystal display device.

In other words, one embodiment of the present invention is a liquid crystal display device which includes a first signal line, a second signal line, a third signal line, a first pixel, a second pixel, and a third pixel. The first pixel comprises a first transistor, a second transistor, a third transistor, and a first liquid crystal element. A gate of the first transistor is electrically connected to a first scan line, and one of a source and a drain of the first transistor is electrically connected to the first signal line. A gate of the second transistor is electrically connected to a second scan line, and one of a source and a drain of the second transistor is electrically connected to the second signal line. A gate of the third transistor is electrically connected to a third scan line, and one of a source and a drain of the third transistor is electrically connected to the third signal line. One of electrodes of the first liquid crystal element is electrically connected to the other of the source and the drain of the first transistor, the other of the source and the drain of the second transistor, and the other of the source and the drain of the third transistor. The second pixel comprises a fourth transistor, a fifth transistor, a sixth transistor, and a second liquid crystal element. A gate of the fourth transistor is electrically connected to a fourth scan line, and one of a source and a drain of the fourth transistor is electrically connected to the first signal line. A gate of the fifth transistor is electrically connected to a fifth scan line, and one of a source and a drain of the fifth transistor is electrically connected to the second signal line. A gate of the sixth transistor is electrically connected to a sixth scan line, and one of a source and a drain of the sixth transistor is electrically connected to the third signal line. One of electrodes of the second liquid crystal element is electrically connected to the other of the source and the drain of the fourth transistor, the other of the source and the drain of the fifth transistor, and the other of the source and the drain of the sixth transistor. The third pixel comprises a seventh transistor, an eighth transistor, a ninth transistor, and a third liquid crystal element. A gate of the seventh transistor is electrically connected to a seventh scan line, and one of a source and a drain of the seventh transistor is electrically connected to the first signal line. A gate of the eighth transistor is electrically connected to an eighth scan line, and one of a source and a drain of the eighth transistor is electrically connected to the second signal line. A gate of the ninth transistor is electrically connected to a ninth scan line, and one of a source and a drain of the ninth transistor is electrically connected to the third signal line. One of electrodes of the third liquid crystal element is electrically connected to the other of the source and the drain of the seventh transistor, the other of the source and the drain of the eighth transistor, and the other of the source and the drain of the ninth transistor. Channel formation regions of the first to ninth transistors include polycrystalline semiconductors or single crystal semiconductors. Further, from the first signal line, a first image signal is supplied in a first horizontal scan period included in a first sampling period, a second image signal is supplied in a first horizontal scan period included in a second sampling period, and a third image signal is supplied in a first horizontal scan period included in a third sampling period. From the second signal line, a fourth image signal is supplied in the first horizontal scan period included in the first sampling period, a fifth image signal is supplied in the first horizontal scan period included in the second sampling period, and a sixth image signal is supplied in the first horizontal scan period included in the third sampling period. From the third signal line, a seventh image signal is supplied in the first horizontal scan period included in the first sampling period, an eighth image signal is supplied in the first horizontal scan period included in the second sampling period, and a ninth image signal is supplied in the first horizontal scan period included in the third sampling period. Additionally, in the first horizontal scan period included in the first sampling period, a selection signal is supplied to the first scan line, the fifth scan line, and the ninth scan line, and a non-selection signal is supplied to the second scan line, the third scan line, the fourth scan line, the sixth scan line, the seventh scan line, and the eighth scan line. In the first horizontal scan period included in the second sampling period, a selection signal is supplied to the third scan line, the fourth scan line, and the eighth scan line, and a non-selection signal is supplied to the first scan line, the second scan line, the fifth scan line, the sixth scan line, the seventh scan line, and the ninth scan line. In the first horizontal scan period included in the third sampling period, a selection signal is supplied to the second scan line, the sixth scan line, and the seventh scan line, and a non-selection signal is supplied to the first scan line, the third scan line, the fourth scan line, the fifth scan line, the eighth scan line, and the ninth scan line. Note that the first scan line, the fourth scan line, and the seventh scan line are electrically connected to a first shift register, and the selection signal and the non-selection signal are supplied from the first shift register. The second scan line, the fifth scan line, and the eighth scan line are electrically connected to a second shift register, and the selection signal and the non-selection signal are supplied from the second shift register. The third scan line, the sixth scan line, and the ninth scan line are electrically connected to a third shift register, and the selection signal and the non-selection signal are supplied from the third shift register.

One embodiment of the present invention is a liquid crystal display device which includes a first signal line, a second signal line, a first pixel, and a second pixel. The first pixel comprises a first transistor, a second transistor, and a first liquid crystal element. A gate of the first transistor is electrically connected to a first scan line, and one of a source and a drain of the first transistor is electrically connected to the first signal line. A gate of the second transistor is electrically connected to a second scan line, and one of a source and a drain of the second transistor is electrically connected to the second signal line. One of electrodes of the first liquid crystal element is electrically connected to the other of the source and the drain of the first transistor and the other of the source and the drain of the second transistor. The second pixel comprises a third transistor, a fourth transistor, and a second liquid crystal element. A gate of the third transistor is electrically connected to a third scan line, and one of a source and a drain of the third transistor is electrically connected to the first signal line. A gate of the fourth transistor is electrically connected to a fourth scan line, and one of a source and a drain of the fourth transistor is electrically connected to the second signal line. One of electrodes of the second liquid crystal element is electrically connected to the other of the source and the drain of the third transistor and the other of the source and the drain of the fourth transistor. Channel formation regions of the first to fourth transistors include polycrystalline semiconductors or single crystal semiconductors. Further, from the first signal line, a first image signal is supplied in a first horizontal scan period included in a first sampling period, and a second image signal is supplied in a first horizontal scan period included in a second sampling period. From the second signal line, a third image signal is supplied in the first horizontal scan period included in the first sampling period, and a fourth image signal is supplied in the first horizontal scan period included in the second sampling period. Additionally, in the first horizontal scan period included in the first sampling period, a selection signal is supplied to the first scan line and the fourth scan line, and a non-selection signal is supplied to the second scan line and the third scan line. In the first horizontal scan period included in the second sampling period, a selection signal is supplied to the second scan line and the third scan line, and a non-selection signal is supplied to the first scan line and the fourth scan line. Note that the first scan line and the third scan line are electrically connected to a first shift register, and the selection signal and the non-selection signal are supplied from the first shift register. The second scan line and the fourth scan line are electrically connected to a second shift register, and the selection signal and the non-selection signal are supplied from the second shift register.

One embodiment of the present invention is a liquid crystal display device which includes a first signal line, a second signal line, a first pixel, and a second pixel. The first pixel comprises a first transistor and a first liquid crystal element. A gate of the first transistor is electrically connected to a first scan line, and one of a source and a drain of the first transistor is electrically connected to the first signal line. One of electrodes of the first liquid crystal element is electrically connected to the other of the source and the drain of the first transistor. The second pixel comprises a second transistor and a second liquid crystal element. A gate of the second transistor is electrically connected to a second scan line, and one of a source and a drain of the second transistor is electrically connected to the second signal line. One of electrodes of the second liquid crystal element is electrically connected to the other of the source and the drain of the second transistor. Channel formation regions of the first and second transistors include polycrystalline semiconductors or single crystal semiconductors. Further, from the first signal line, a first image signal is supplied in a first horizontal scan period included in a first sampling period, and a second image signal is supplied in a first horizontal scan period included in a second sampling period. From the second signal line, a third image signal is supplied in the first horizontal scan period included in the first sampling period, and a fourth image signal is supplied in the first horizontal scan period included in the second sampling period. Additionally, in the first horizontal scan period included in the first sampling period, a selection signal is supplied to the first scan line and the second scan line. In the first horizontal scan period included in the second sampling period, a selection signal is supplied to the first scan line and the second scan line. Note that the first scan line is electrically connected to a first shift register, and the selection signal is supplied from the first shift register. The second scan line is electrically connected to a second shift register, and the selection signal is supplied from the second shift register.

Further, in the liquid crystal display device according to one embodiment of the present invention, a transistor which includes a polycrystalline semiconductor or a single crystal semiconductor of silicon, germanium, or the like in a channel formation region can be used. A transistor including a polycrystalline semiconductor in a channel formation region has advantages that mobility is higher than that of a transistor including an amorphous semiconductor in a channel formation region by two or more digits and that a pixel portion and a peripheral driver circuit of a liquid crystal display device can be formed over one substrate.

Specifically, in the liquid crystal display device according to one embodiment of the present invention, with the use of a transistor including a polycrystalline semiconductor in a channel formation region, the pixel portion and part or all of the driver circuit can be formed over one substrate.

Further, in the liquid crystal display device according to one embodiment of the present invention, a transistor which includes a single crystal semiconductor of silicon, germanium, or the like in a channel formation region can be used.

Specifically, the liquid crystal display device can be manufactured using an SOI substrate obtained by attachment of a single crystal semiconductor film separated from a bulk semiconductor substrate to a substrate. A transistor which includes a single crystal semiconductor in a channel formation region can be formed using the SOI substrate. Thus, the pixel portion and the peripheral driver circuit of the liquid crystal display device can be formed over one substrate.

When part or all of the driver circuit is formed over the same substrate as the pixel portion, the number of components such as external driver circuits is reduced. Thus, it is possible not only to downsize the liquid crystal display device but also to reduce cost by the decrease in the number of assembly steps and inspection steps. Further, the number of terminals which connect the driver circuit and the pixel portion to each other can be reduced. Thus, it is possible to prevent the decrease in the yield caused by poor connection between the driver circuit and the pixel portion and the decrease in the reliability caused by low mechanical strength at a connection point.

In the liquid crystal display device according to one embodiment of the present invention, image signals can be concurrently supplied to pixels provided in a plurality of rows among pixels arranged in matrix. Thus, the frequency of input of an image signal to each pixel in the liquid crystal display device can be increased. Accordingly, the image quality of the liquid crystal display device can be improved.

BRIEF DESCRIPTION OF THE DRAWINGS

In the accompanying drawings:

FIG. 13 is a perspective view illustrating a specific example of a liquid crystal display device;

FIG. 19A is a top view illustrating a specific example of a liquid crystal display device, and FIG. 19B is a cross-sectional view illustrating the specific example of the liquid crystal display device;

DETAILED DESCRIPTION OF THE INVENTION

Embodiments of the present invention will be described below in detail with reference to the drawings. Note that the present invention is not limited to the following description. It will be readily appreciated by those skilled in the art that modes and details of the present invention can be changed in various ways without departing from the spirit and scope of the present invention. Therefore, the present invention should not be construed as being limited to the following description of the embodiments.

Embodiment 1

In this embodiment, an example of a field-sequential liquid crystal display device is described with reference to FIGS. 1A and 1B, FIG. 2, FIG. 3, FIGS. 4A and 4B, and FIG. 5.

<Structure Example of Liquid Crystal Display Device>

Figure 1A:
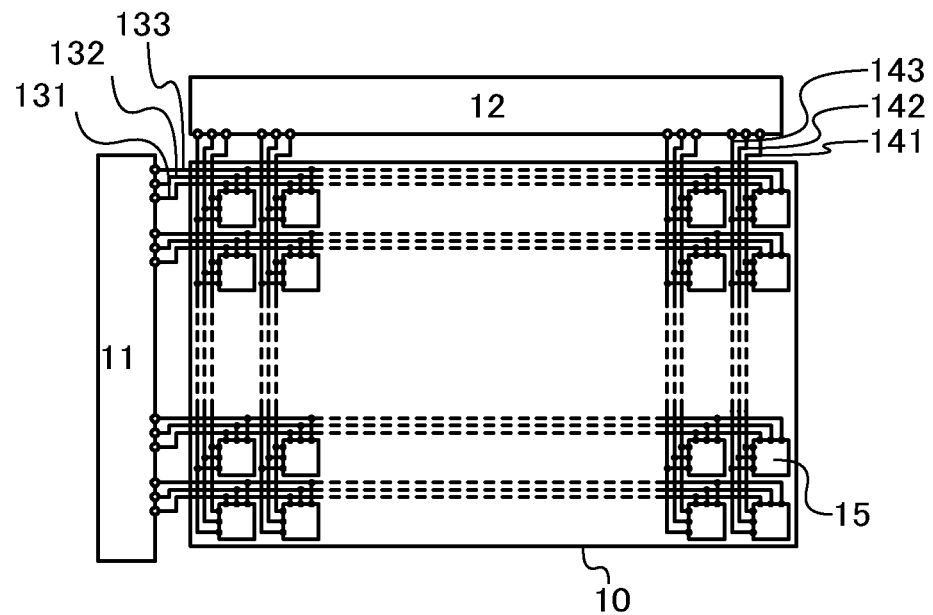
FIG. 1A illustrates a structure example of a liquid crystal display device.

FIG. 1A illustrates a structure example of a liquid crystal display device. The liquid crystal display device illustrated in FIG. 1A includes a pixel portion 10; a scan line driver circuit 11; a signal line driver circuit 12; 3n (n is a natural number that is 2 or more) scan lines 131, 3n scan lines 132, and 3n scan lines 133 which are arranged parallel (or almost parallel) to each other and whose potentials are controlled by the scan line driver circuit 11; and m (m is a natural number that is 2 or more) signal lines 141, m signal lines 142, and m signal lines 143 which are arranged parallel (or almost parallel) to each other and whose potentials are controlled by the signal line driver circuit 12.

The pixel portion 10 includes a plurality of pixels 15 arranged in matrix (3n rows by m columns). Note that each of the scan lines 131, 132, and 133 is electrically connected to m pixels 15 provided in a given row among the plurality of pixels 15 arranged in matrix (the 3n rows by the m columns). Further, each of the signal lines 141, 142, and 143 is electrically connected to 3n pixels 15 provided in a given column among the plurality of pixels 15 arranged in matrix (the 3n rows by the m columns).

Note that start signals (GSP1 to GSP3) for the scan line driver circuit, a clock signal (GCK) for the scan line driver circuit, and drive power supply potentials such as a high power supply potential ($V_{DD}$) and a low power supply potential ($V_{SS}$) are input to the scan line driver circuit 11 from the outside. Further, signals such as a start signal (SSP) for the signal line driver circuit, a clock signal (SCK) for the signal line driver circuit, and image signals (DATA1 to DATA3), and power supply potentials such as a high power supply potential and a low power supply potential are input to the signal line driver circuit 12 from the outside.

Figure 1B:
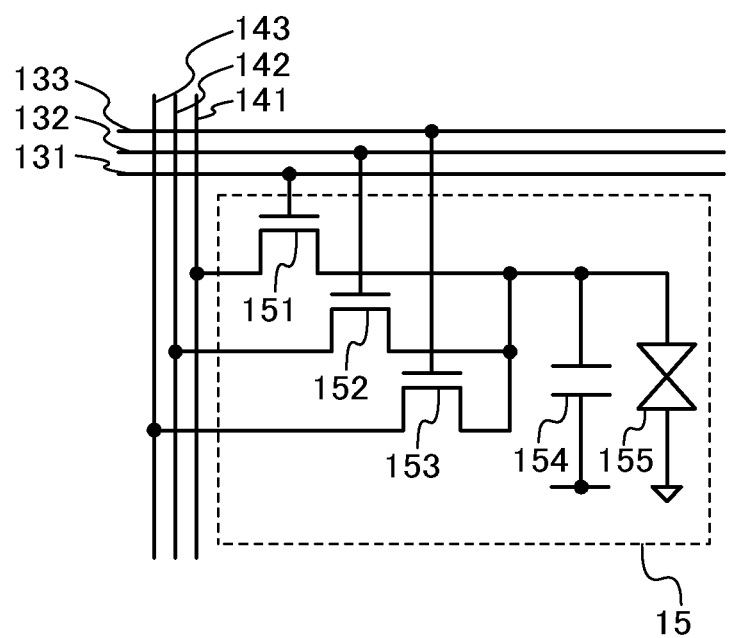
FIG. 1B illustrates a structure example of a pixel.

FIG. 1B illustrates an example of the circuit structure of the pixel 15. The pixel 15 illustrated in FIG. 1B includes a transistor 151, a transistor 152, a transistor 153, a capacitor 154, and a liquid crystal element 155. A gate of the transistor 151 is electrically connected to the scan line 131. One of a source and a drain of the transistor 151 is electrically connected to the signal line 141. A gate of the transistor 152 is electrically connected to the scan line 132. One of a source and a drain of the transistor 152 is electrically connected to the signal line 142. A gate of the transistor 153 is electrically connected to the scan line 133. One of a source and a drain of the transistor 153 is electrically connected to the signal line 143. One electrode of the capacitor 154 is electrically connected to the other of the source and the drain of the transistor 151, the other of the source and the drain of the transistor 152, and the other of the source and the drain of the transistor 153. The other electrode of the capacitor 154 is electrically connected to a wiring for supplying a capacitor potential. One electrode of the liquid crystal element 155 is electrically connected to the other of the source and the drain of the transistor 151, the other of the source and the drain of the transistor 152, the other of the source and the drain of the transistor 153, and one electrode of the capacitor 154. The other electrode of the liquid crystal element 155 is electrically connected to a wiring for supplying a counter potential.

<Structure Example of Scan Line Driver Circuit 11>

Figure 2:
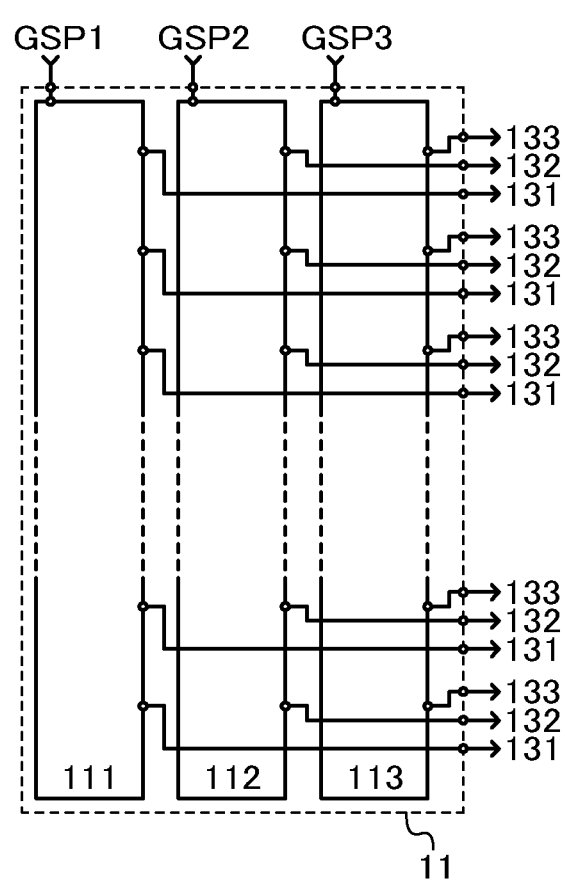
FIG. 2 illustrates a structure example of a scan line driver circuit.

FIG. 2 illustrates a structure example of the scan line driver circuit 11 included in the liquid crystal display device illustrated in FIG. 1A. The scan line driver circuit 11 illustrated in FIG. 2 includes three shift registers 111 to 113 each including 3n output terminals. Note that each output terminal of the shift register 111 is electrically connected to one of the 3n scan lines 131 provided in the pixel portion 10. Each output terminal of the shift register 112 is electrically connected to one of the 3n scan lines 132 provided in the pixel portion 10. Each output terminal of the shift register 113 is electrically connected to one of the 3n scan lines 133 provided in the pixel portion 10. In other words, the shift register 111 drives the scan lines 131; the shift register 112 drives the scan lines 132; and the shift register 113 drives the scan lines 133. Specifically, the shift register 111 has a function of sequentially supplying selection signals (sequentially selecting the scan lines 131 every half the cycle of the clock signal (GCK) for the scan line driver circuit) from the scan line 131 provided in a first row with the first start pulse signal (GSP1) for the scan line driver circuit that is input from the outside serving as a trigger; the shift register 112 has a function of sequentially supplying selection signals from the scan line 132 provided in the first row with the second start pulse signal (GSP2) for the scan line driver circuit that is input from the outside serving as a trigger; and the shift register 113 has a function of sequentially supplying selection signals from the scan line 133 provided in the first row with the third start pulse signal (GSP3) for the scan line driver circuit that is input from the outside serving as a trigger.

<Operation Example of Scan Line Driver Circuit 11>

Figure 3:
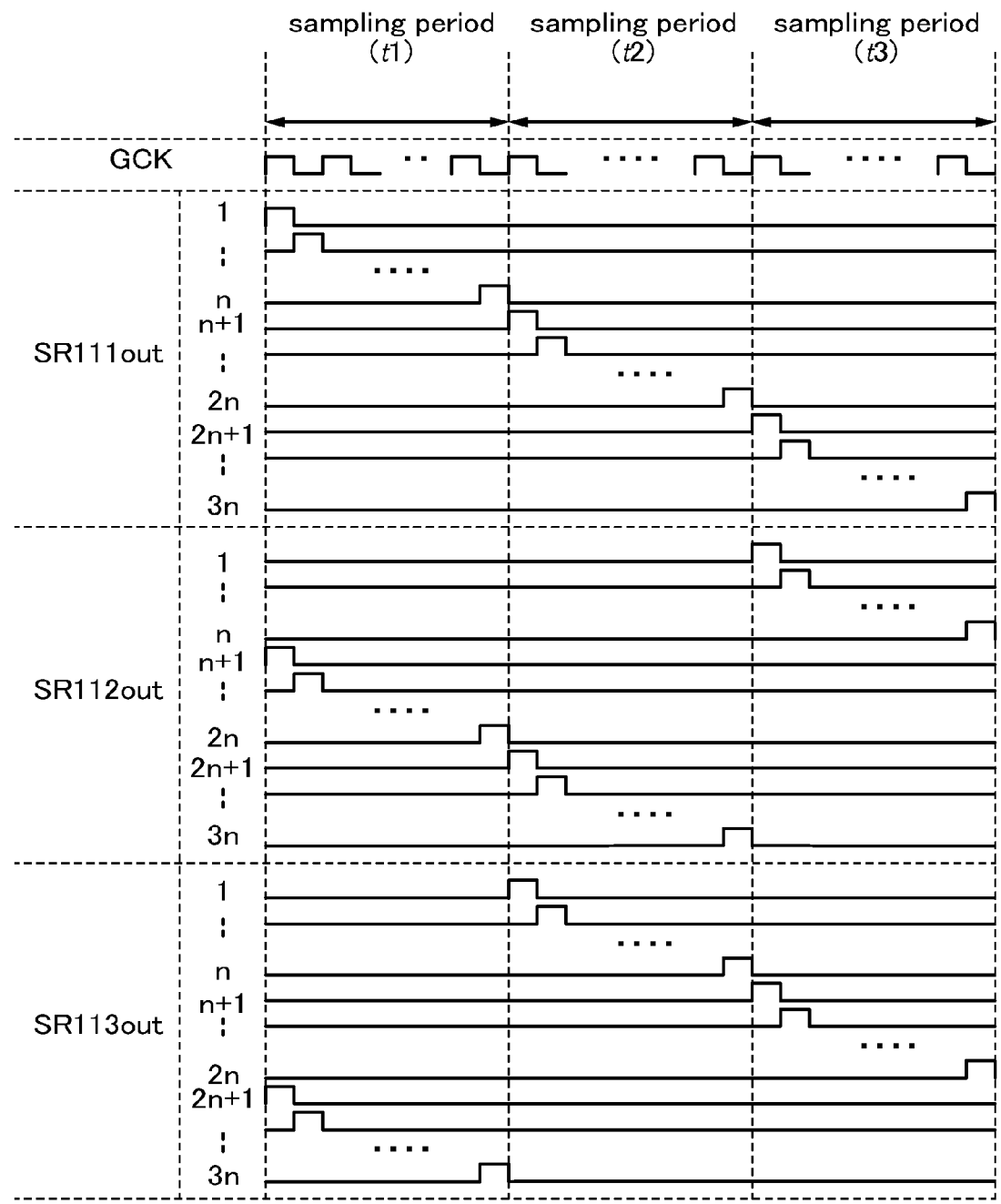
FIG. 3 illustrates output signals of shift registers.

An operation example of the scan line driver circuit 11 is described with reference to FIG. 3. Note that FIG. 3 illustrates the clock signal (GCK) for the scan line driver circuit, signals (SR111out) output from the 3n output terminals of the shift register 111, signals (SR112out) output from the 3n output terminals of the shift register 112, and signals (SR113out) output from the 3n output terminals of the shift register 113.

Here, the sampling period means a shortest period required to input an image signal to all pixels (from the first row to the 3n-th row).

In a sampling period (t1), high-level potentials are sequentially shifted from the scan line 131 provided in the first row to the scan line 131 provided in an n-th row every half the cycle of the clock signal (horizontal scan period) in the shift register 111; high-level potentials are sequentially shifted from the scan line 132 provided in an (n+1)th row to the scan line 132 provided in a 2n-th row every half the cycle of the clock signal (horizontal scan period) in the shift register 112; and high-level potentials are sequentially shifted from the scan line 133 provided in a (2n+1)th row to the scan line 133 provided in the 3n-th row every half the cycle of the clock signal (horizontal scan period) in the shift register 113. Therefore, in the scan line driver circuit 11, m pixels 15 provided in the first row to m pixels 15 provided in the n-th row are sequentially selected through the scan lines 131; m pixels 15 provided in the (n+1)th row to m pixels 15 provided in the 2n-th row are sequentially selected through the scan lines 132; and m pixels 15 provided in the (2n+1)th row to m pixels 15 provided in the 3n-th row are sequentially selected through the scan lines 133. In other words, in the scan line driver circuit 11, selection signals can be supplied to 3m pixels 15 provided in different three rows every horizontal scan period.

In a sampling period (t2), although output signals of the shift registers 111 to 113 are different from those in the sampling period (t1), the following operation is the same as that in the sampling period (t1): one of the shift registers 111 to 113 (the shift register 113 in the sampling period (t2)) sequentially selects the m pixels 15 provided in the first row to the m pixels 15 provided in the n-th row; another one of the shift registers 111 to 113 that is different from the one of the shift registers 111 to 113 (the shift register 111 in the sampling period (t2)) sequentially selects the m pixels 15 provided in the (n+1)th row to the m pixels 15 provided in the 2n-th row; and the other of the shift registers 111 to 113 that is different from the two of the shift registers 111 to 113 (the shift register 112 in the sampling period (t2)) sequentially selects the m pixels 15 provided in the (2n+1)th row to the m pixels 15 provided in the 3n-th row. In other words, in the scan line driver circuit 11, as in the sampling period (t1), selection signals can be supplied to 3m pixels 15 provided in given three rows every horizontal scan period.

<Structure Example of Signal Line Driver Circuit 12>

Figure 4A:
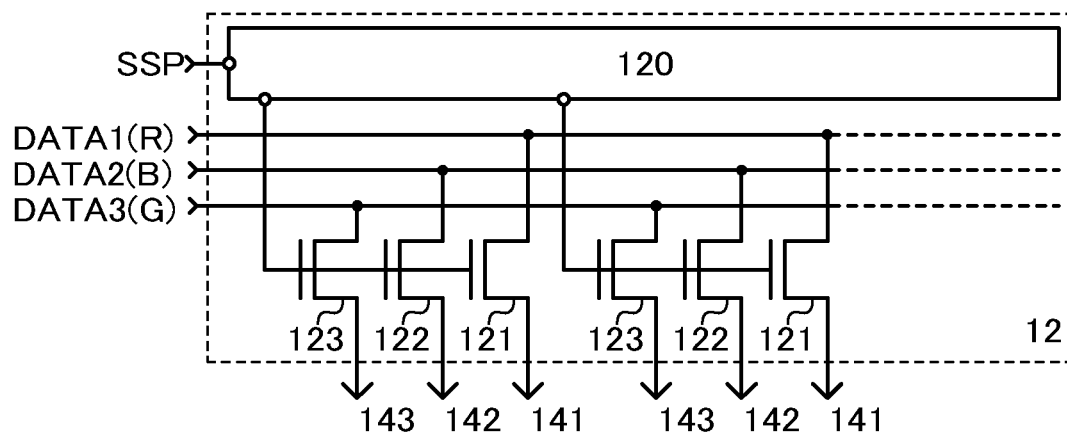
FIG. 4A illustrates a structure example of a signal line driver circuit.

FIG. 4A illustrates a structure example of the signal line driver circuit 12 included in the liquid crystal display device illustrated in FIG. 1A. The signal line driver circuit 12 illustrated in FIG. 4A includes a shift register 120 having m output terminals, m transistors 121, m transistors 122, and m transistors 123. Note that a gate of the transistor 121 is electrically connected to a j-th output terminal (j is a natural number that is 1 or more and m or less) of the shift register 120; one of a source and a drain of the transistor 121 is electrically connected to a wiring for supplying the first image signal (DATA1); and the other of the source and the drain of the transistor 121 is electrically connected to the signal line 141 provided in a j-th column in the pixel portion 10. In addition, a gate of the transistor 122 is electrically connected to the j-th output terminal of the shift register 120; one of a source and a drain of the transistor 122 is electrically connected to a wiring for supplying the second image signal (DATA2); and the other of the source and the drain of the transistor 122 is electrically connected to the signal line 142 provided in the j-th column in the pixel portion 10. Further, a gate of the transistor 123 is electrically connected to the j-th output terminal of the shift register 120; one of a source and a drain of the transistor 123 is electrically connected to a wiring for supplying the third image signal (DATA3); and the other of the source and the drain of the transistor 123 is electrically connected to the signal line 143 provided in the j-th column in the pixel portion 10.

Note that here, a red (R) image signal (an image signal for controlling transmission of red (R) light) is supplied to the signal line 141 as the first image signal (DATA1); a blue (B) image signal (an image signal for controlling transmission of blue (B) light) is supplied to the signal line 142 as the second image signal (DATA2); and a green (G) image signal (an image signal for controlling transmission of green (G) light) is supplied to the signal line 143 as the third image signal (DATA3).

<Structure Example of Backlight>

Figure 4B:
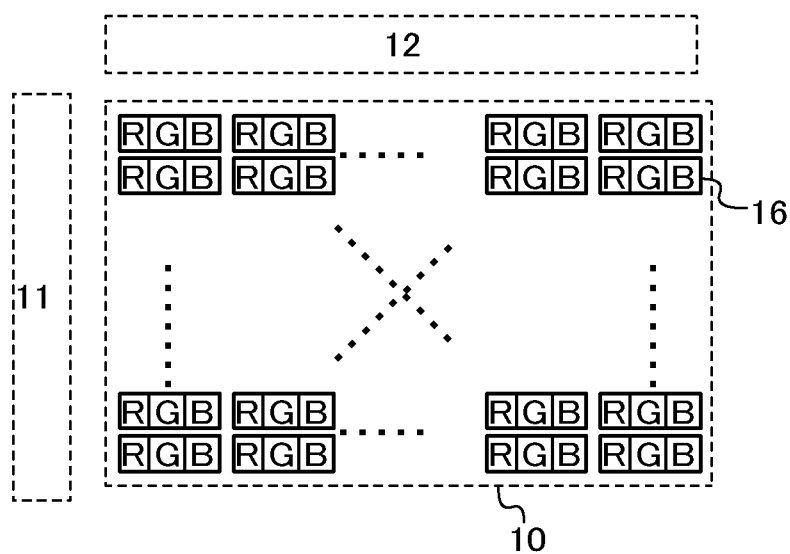
FIG. 4B illustrates a structure example of a backlight.

FIG. 4B illustrates a structure example of a backlight provided behind the pixel portion 10 in the liquid crystal display device illustrated in FIG. 1A. The backlight illustrated in FIG. 4B includes a plurality of backlight units 16 each including light sources of three colors of red (R), green (G), and blue (B). Note that the plurality of backlight units 16 are arranged in matrix and lighting of the backlight units 16 can be controlled every given region. Here, a backlight unit group is provided at least every k rows by m columns (here, k is n/4) as the backlight for the plurality of pixels 15 provided in the 3n rows by the m columns. Lighting of the backlight unit groups can be controlled independently. In other words, the backlight can include at least a backlight unit group for the first to k-th rows to a backlight unit group for a (3n−k+1)th row to the 3n-th row. Lighting of the backlight unit groups can be controlled independently.

<Operation Example of Liquid Crystal Display Device>

Figure 5:
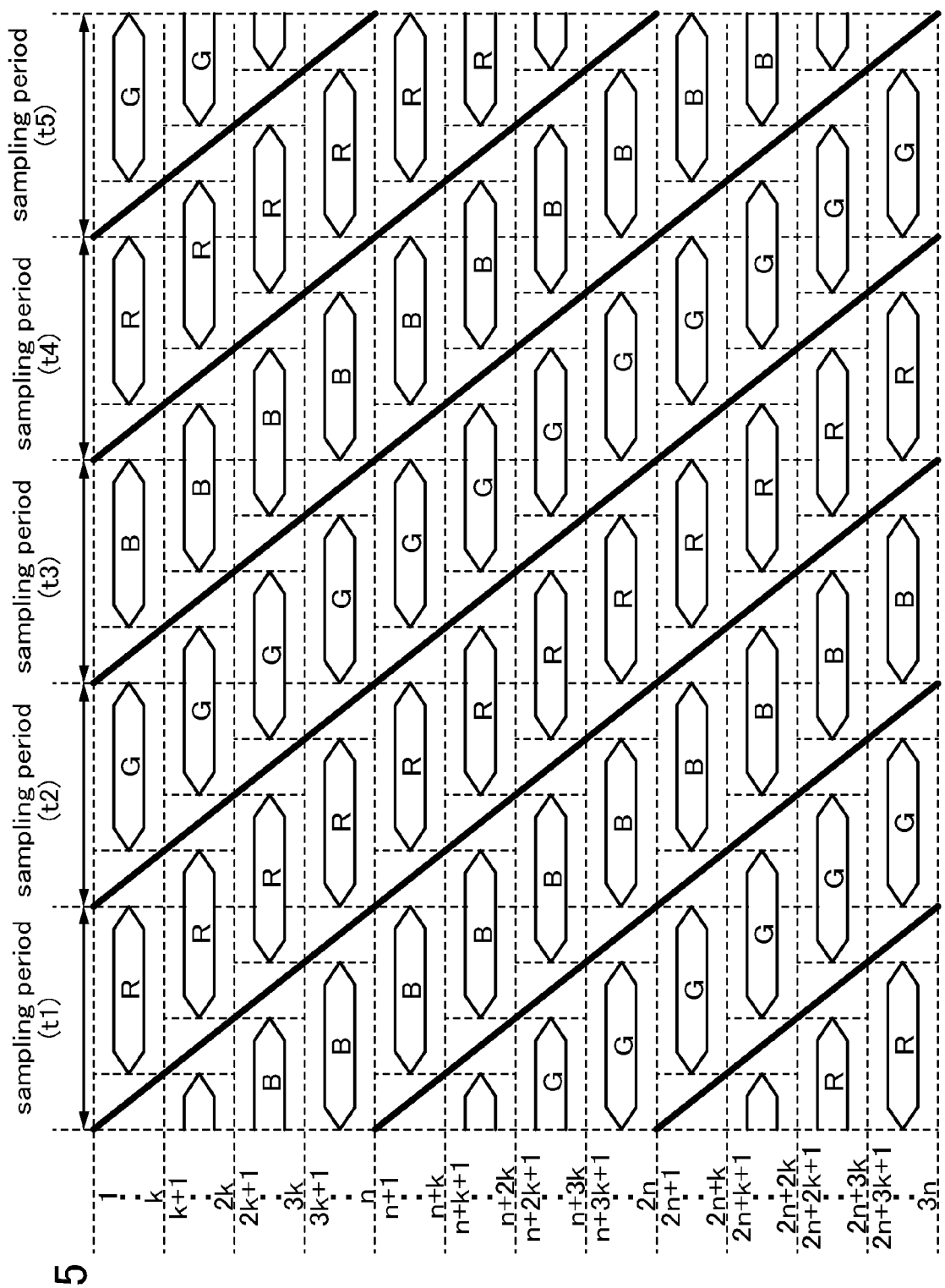
FIG. 5 illustrates an operation example of a liquid crystal display device.

FIG. 5 illustrates timing of when the backlight unit group for the first to k-th rows to the backlight unit group for the (3n−k+1)th to 3n-th rows that are included in the backlight are lit in the liquid crystal display device and timing of when image signals are input to m pixels provided in the first row to m pixels provided in an 3n-th row in the pixel portion 10. Specifically, in FIG. 5, 1 to 3n indicate the number of rows and solid lines indicate timing of when image signals are input in the rows. In the liquid crystal display device, in the sampling period (t1), the m pixels 15 provided in the first row to the m pixels 15 provided in the n-th row are sequentially selected; the m pixels 15 provided in the (n+1)th row to the m pixels 15 provided in the 2n-th row are sequentially selected; and the m pixels 15 provided in the (2n+1)th row to the m pixels 15 provided in the 3n-th row are sequentially selected. Thus, the image signal can be input to each pixel. Specifically, in the liquid crystal display device, in the sampling period (t1), the red (R) image signals can be sequentially input to the pixels through the signal lines 141 when the transistors 151 included in the m pixels 15 provided in the first row to the transistors 151 included in the m pixels 15 provided in the n-th row are sequentially turned on through the scan lines 131; the blue (B) image signals can be sequentially input to the pixels through the signal lines 142 when the transistors 152 included in the m pixels 15 provided in the (n+1)th row to the transistors 152 included in the m pixels 15 provided in the 2n-th row are sequentially turned on through the scan lines 132; and the green (G) image signals can be sequentially input to the pixels through the signal lines 143 when the transistors 153 included in the m pixels 15 provided in the (2n+1)th row to the transistors 153 included in the m pixels 15 provided in the 3n-th row are sequentially turned on through the scan lines 133.

Further, in the liquid crystal display device, in the sampling period (t1), red (R) light is emitted from the backlight unit group for the first to k-th rows after the red (R) image signals are input to the m pixels 15 provided in the first row to the m pixels 15 provided in the k-th row; blue (B) light is emitted from the backlight unit group for the (n+1)th to (n+k)th rows after the blue (B) image signals are input to the m pixels 15 provided in the (n+1)th row to the m pixels 15 provided in the (n+k)th row; and green (G) light is emitted from the backlight unit group in the (2n+1)th to (2n+k)th rows after the green (G) image signals are input to the m pixels 15 provided in the (2n+1)th row to the m pixels 15 provided in the (2n+k)th row. In other words, in the liquid crystal display device, a selection signal and light of a given color can be supplied concurrently every region (the first to n-th rows, the (n+1)th to 2n-th rows, and the (2n+1) to 3n-th rows).

<Liquid Crystal Display Device Disclosed in this Specification>

In the liquid crystal display device disclosed in this specification, image signals can be concurrently supplied to pixels provided in a plurality of rows among pixels arranged in matrix. Thus, without any change in the response speed of a transistor or the like included in the liquid crystal display device, the frequency of input of an image signal to each pixel can be increased. Specifically, in the liquid crystal display device, without any change in the clock frequency or the like of the scan line driver circuit, the frequency of input of an image signal to each pixel can be triple. In other words, the liquid crystal display device is suitable for a field-sequential liquid crystal display device or a liquid crystal display device with high frame rate driving.

The reasons why the liquid crystal display device disclosed in this specification is preferably used as a field-sequential liquid crystal display device are as follows. As described above, in the field-sequential liquid crystal display device, a display period is divided among lights of given colors. Thus, display viewed by a user might be changed (deviated) from display based on original display data (such a phenomenon is also referred to as color break or color breakup) due to lack of given display data that is caused by block of display in a short time (e.g., blink of the user). Here, the increase in the frame frequency is effective in suppressing color break. In the liquid crystal display device disclosed in this specification, the frequency of input an image signal to each pixel can be increased. Thus, color break can be easily suppressed in the field-sequential liquid crystal display device.

Further, in the case where images are displayed by a field sequential method, lights of different colors are preferably supplied to regions as illustrated in FIG. 5 for the following reasons. In the case where lights of the same color are supplied to the whole screen, only color data on a given color exists in a pixel portion in a given moment. Thus, lack of display data in a given period that is caused by blink of a user or the like corresponds to lack of given color data. In contrast, in the case where lights of different colors are supplied to regions, color data on the colors exists in the pixel portion in a given moment. Therefore, lack of display data in a given period that is caused by blink of a user or the like does not correspond to lack of given color data. That is, when lights of different colors are supplied to regions, color break can be suppressed. Further, in the case where backlight unit groups are lit as illustrated in FIG. 5, the adjacent backlight unit groups do not emit lights of different colors. Specifically, in the sampling period (t1), when the backlight unit group for the (n+1)th to (n+k)th rows emits blue (B) light after the blue (B) image signals are input to the m pixels 15 in the (n+1)th row to the m pixels 15 in the (n+k)th row, blue (B) light is emitted or emission itself is not performed (neither red (R) light nor green (G) light is emitted) in a backlight unit group for a (3k+1)th row to the n-th row and a backlight unit group in an (n+k+1)th to (n+2k)th rows. Thus, the probability of transmission of light of a color different from a given color through a pixel to which image data on the given color is input can be reduced.

Modification Example

A liquid crystal display device with the above structure is one embodiment of the present invention, and the present invention includes a liquid crystal display device which is different from the aforementioned liquid crystal display device.

For example, the liquid crystal display device has a structure where image signals are concurrently supplied to 3m pixels provided in given three rows in the pixel portion 10 in the same period; however, the structure of a liquid crystal display device in the present invention is not limited to such a structure. In other words, the liquid crystal display device in the present invention can have a structure where image signals are concurrently supplied to a plurality of pixels provided in given plural rows in the pixel portion 10 in the same period. Note that it is obvious that in the case where the number of rows is changed, the number of rows and the number of shift registers should be the same.

The liquid crystal display device has a structure where image signals are concurrently supplied to pixels provided in given three rows arranged at regular intervals (the interval between rows supplied with image signals is n rows of pixels) in the same period; however, the structure of the liquid crystal display device in the present invention is not limited to such a structure. In other words, the liquid crystal display device in the present invention can have a structure where image signals are concurrently supplied to pixels provided in particular three rows which are not arranged at regular intervals. Specifically, the liquid crystal display device in the present invention can have a structure where image signals are concurrently supplied to m pixels provided in the first row, m pixels provided in an (a+1)th row (a is a natural number), and m pixels provided in an (a+b+1)th row (b is a natural number which is different from a) in the same period.

In the liquid crystal display device, the scan line driver circuit includes shift registers; however, the shift registers can be replaced with circuits having similar functions. For example, the shift registers can be replaced with decoders.

The liquid crystal display device has a structure where light sources that emit lights of three colors of red (R), green (G), and blue (B) are used as a plurality of light sources; however, the structure of the liquid crystal display device in the present invention is not limited to such a structure. In other words, in the liquid crystal display device in the present invention, light sources that emit lights of given colors can be used in combination. For example, light sources that emit lights of four colors of red (R), green (G), blue (B), and white (W) can be used in combination or light sources that emit lights of three colors of cyan, magenta, and yellow can be used in combination. Further, light sources that emit lights of six colors of pale red (R), pale green (G), pale blue (B), deep red (R), deep green (G), and deep blue (B) can be used in combination or light sources that emit lights of six colors of red (R), green (G), blue (B), cyan, magenta, and yellow can be used in combination. In this manner, with a combination of light sources that emit lights of a wider variety of colors, the color gamut of the liquid crystal display device can be increased, so that image quality can be improved.

The liquid crystal display device includes a capacitor for holding voltage applied to a liquid crystal element (see FIG. 1B); however, it is possible not to provide the capacitor.

The liquid crystal display device has a structure where light sources of three colors of red (R), green (G), and blue (B) are arranged laterally in a linear manner as a backlight unit (see FIG. 4B); however, the structure of the backlight unit is not limited to such a structure. For example, the light sources of the three colors may be arranged in triangle; the light sources of the three colors may be arranged longitudinally in a linear manner; or a light source of a red (R) color, a light source of a green (G) color, and a light source of a blue (B) color may be separately provided. Moreover, the liquid crystal display device includes a direct-lit backlight as the backlight (see FIG. 4B); however, an edge-lit backlight can be used as the backlight.

Embodiment 2

In this embodiment, an example of a field-sequential liquid crystal display device with a structure which is different from that in Embodiment 1 is described with reference to FIGS. 6A to 6D, FIGS. 7A and 7B, and FIG. 8.

<Structure Example of Liquid Crystal Display Device>

Figure 6A:
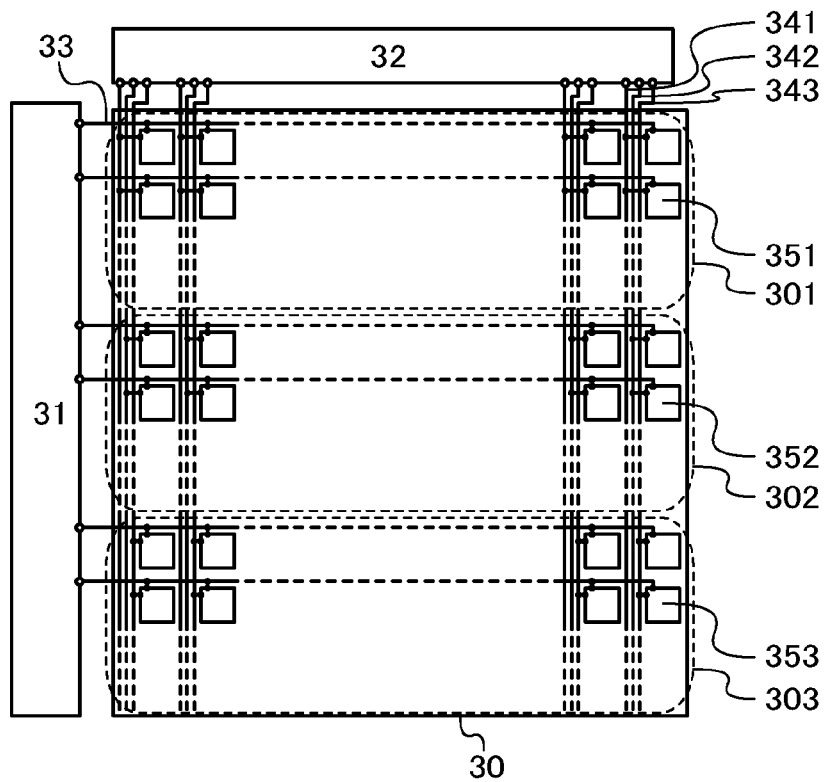
FIG. 6A illustrates a structure example of a liquid crystal display device.

FIG. 6A illustrates a structure example of a liquid crystal display device. The liquid crystal display device illustrated in FIG. 6A includes a pixel portion 30; a scan line driver circuit 31; a signal line driver circuit 32; 3n (n is a natural number that is 2 or more) scan lines 33 which are arranged parallel (or almost parallel) to each other and whose potentials are controlled by the scan line driver circuit 31; and m (m is a natural number that is 2 or more) signal lines 341, m signal lines 342, and m signal lines 343 which are arranged parallel (or almost parallel) to each other and whose potentials are controlled by the signal line driver circuit 32.

The pixel portion 30 is divided into three regions (regions 301 to 303) and includes a plurality of pixels which are arranged in matrix (n rows by m columns) in each region. Note that each of the scan lines 33 is electrically connected to m pixels provided in a given row among the plurality of pixels arranged in matrix (3n rows by the m columns) in the pixel portion 30. In addition, each of the signal lines 341 is electrically connected to n pixels provided in a given column among the plurality of pixels arranged in matrix (the n rows by the m columns) in the region 301. Further, each of the signal lines 342 is electrically connected to n pixels provided in a given column among the plurality of pixels arranged in matrix (the n rows by the m columns) in the region 302. Furthermore, each of the signal lines 343 is electrically connected to n pixels provided in a given column among the plurality of pixels arranged in matrix (the n rows by the m columns) in the region 303.

Note that a start signal (GSP) for the scan line driver circuit, the clock signal (GCK) for the scan line driver circuit, and drive power supply potentials such as a high power supply potential and a low power supply potential are input to the scan line driver circuit 31 from the outside. Further, signals such as the start signal (SSP) for the signal line driver circuit, the clock signal (SCK) for the signal line driver circuit, and image signals (data1 to data3), and drive power supply potentials such as a high power supply potential and a low power supply potential are input to the signal line driver circuit 32 from the outside.

Figure 6B:
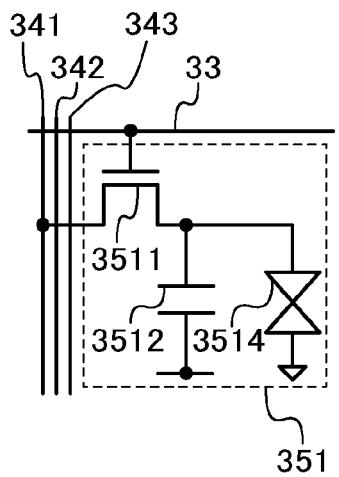
FIGS. 6B to 6D illustrate structure examples of pixels.
Figure 6C:
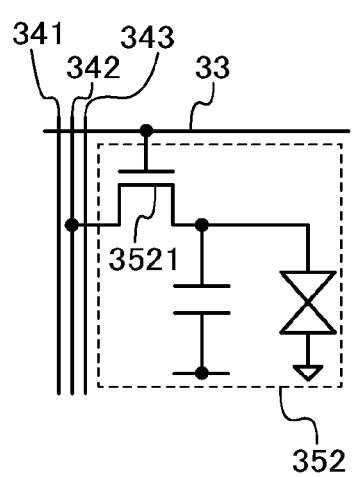
Figure 6D:
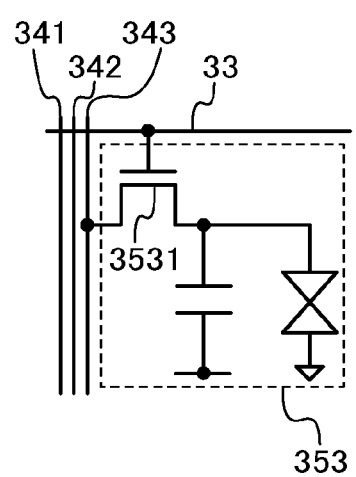

FIGS. 6B to 6D illustrate examples of the circuit structures of pixels. Specifically, FIG. 6B illustrates an example of the circuit structure of a pixel 351 provided in the region 301; FIG. 6C illustrates an example of the circuit structure of a pixel 352 provided in the region 302; and FIG. 6D illustrates an example of the circuit structure of a pixel 353 provided in the region 303. The pixel 351 illustrated in FIG. 6B includes a transistor 3511, a capacitor 3512, and a liquid crystal element 3514. A gate of the transistor 3511 is electrically connected to the scan line 33. One of a source and a drain of the transistor 3511 is electrically connected to the signal line 341. One electrode of the capacitor 3512 is electrically connected to the other of the source and drain of the transistor 3511. The other electrode of the capacitor 3512 is electrically connected to a wiring for supplying a capacitor potential. One electrode of the liquid crystal element 3514 is electrically connected to the other of the source and the drain of the transistor 3511 and one electrode of the capacitor 3512. The other electrode of the liquid crystal element 3514 is electrically connected to a wiring for supplying a counter potential.

The circuit structures of the pixel 352 illustrated in FIG. 6C and the pixel 353 illustrated in FIG. 6D are the same as that of the pixel 351 illustrated in FIG. 6B. Note that the pixel 352 illustrated in FIG. 6C differs from the pixel 351 illustrated in FIG. 6B in that one of a source and a drain of a transistor 3521 is electrically connected to the signal line 342 instead of the signal line 341; and the pixel 353 illustrated in FIG. 6D differs from the pixel 351 illustrated in FIG. 6B in that one of a source and a drain of a transistor 3531 is electrically connected to the signal line 343 instead of the signal line 341.

<Structure Example of Scan Line Driver Circuit 31>

Figure 7A:
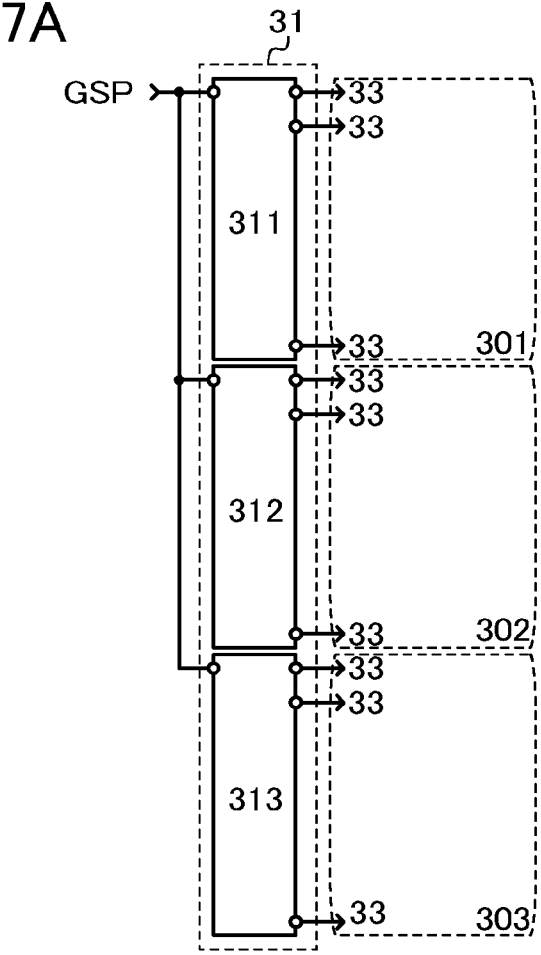
FIG. 7A illustrates a structure example of a scan line driver circuit.

FIG. 7A illustrates a structure example of the scan line driver circuit 31 included in the liquid crystal display device illustrated in FIG. 6A. The scan line driver circuit 31 illustrated in FIG. 7A includes shift registers 311 to 313 each including n output terminals. Note that each output terminal of the shift register 311 is electrically connected to one of the n scan lines 33 provided in the region 301. Each output terminal of the shift register 312 is electrically connected to one of the n scan lines 33 provided in the region 302. Each output terminal of the shift register 313 is electrically connected to one of the n scan lines 33 provided in the region 303. In other words, the shift register 311 supplies selection signals in the region 301; the shift register 312 supplies selection signals in the region 302; and the shift register 313 supplies selection signals in the region 303. Specifically, the shift register 311 has a function of sequentially supplying selection signals (sequentially selecting the scan lines 33 every half the cycle of the clock signal (GCK) for the scan line driver circuit) from the scan line 33 provided in a first row with the start signal (GSP) for the scan line driver circuit that is input from the outside serving as a trigger; the shift register 312 has a function of sequentially supplying selection signals from the scan line 33 provided in the (n+1)th row with the start signal (GSP) for the scan line driver circuit that is input from the outside serving as a trigger; and the shift register 313 has a function of sequentially supplying selection signals from the scan line 33 provided in the (2n+1)th row with the start signal (GSP) for the scan line driver circuit that is input from the outside serving as a trigger.

<Operation Example of Scan Line Driver Circuit 31>

Figure 7B:
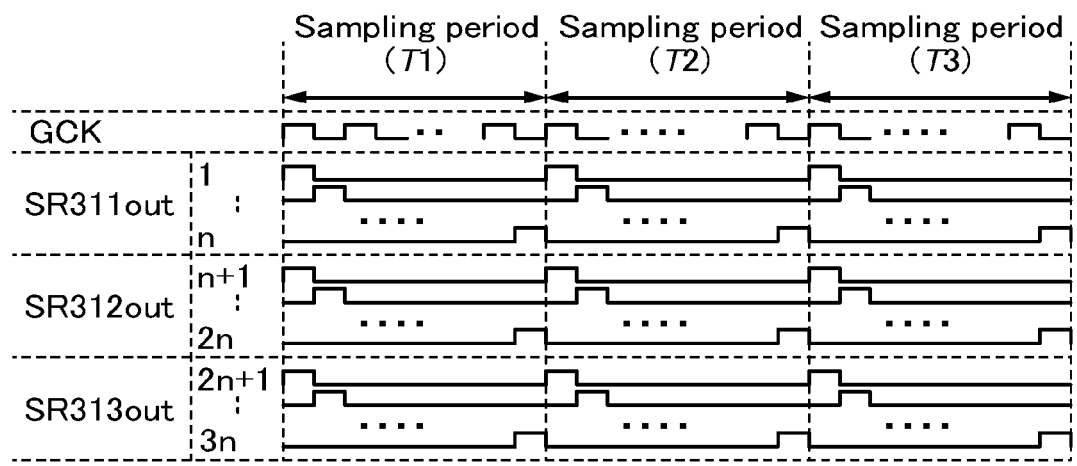
FIG. 7B illustrates output signals of shift registers.

An operation example of the scan line driver circuit 31 is described with reference to FIG. 7B. Note that FIG. 7B illustrates the clock signal (GCK) for the scan line driver circuit, signals (SR311out) output from the n output terminals of the shift register 311, signals (SR312out) output from the n output terminals of the shift register 312, and signals (SR313out) output from the n output terminals of the shift register 313.

In a sampling period (T1), high-level potentials are sequentially shifted from the scan line 33 provided in the first row to the scan line 33 provided in the n-th row every half the cycle of the clock signal (horizontal scan period) in the shift register 311; high-level potentials are sequentially shifted from the scan line 33 provided in the (n+1)th row to the scan line 33 provided in the 2n-th row every half the cycle of the clock signal (horizontal scan period) in the shift register 312; and high-level potentials are sequentially shifted from the scan line 33 provided in the (2n+1)th row to the scan line 33 provided in the 3n-th row every half the cycle of the clock signal (horizontal scan period) in the shift register 313. Therefore, in the scan line driver circuit 31, m pixels 351 provided in the first row to m pixels 351 provided in the n-th row are sequentially selected through the scan lines 33; m pixels 352 provided in the (n+1)th row to m pixels 352 provided in the 2n-th row are sequentially selected; and m pixels 353 provided in the (2n+1)th row to m pixels 353 provided in the 3n-th row are sequentially selected. In other words, in the scan line driver circuit 31, selection signals can be supplied to 3m pixels provided in different three rows every horizontal scan period.

In a sampling period (T2) and a sampling period (T3), the operation of the shift registers 311 to 313 is the same as that in the sampling period (T1). In other words, in the scan line driver circuit 31, as in the sampling period (T1), selection signals can be supplied to 3m pixels provided in given three rows every horizontal scan period.

<Structure Example of Signal Line Driver Circuit 32>

Figure 8:
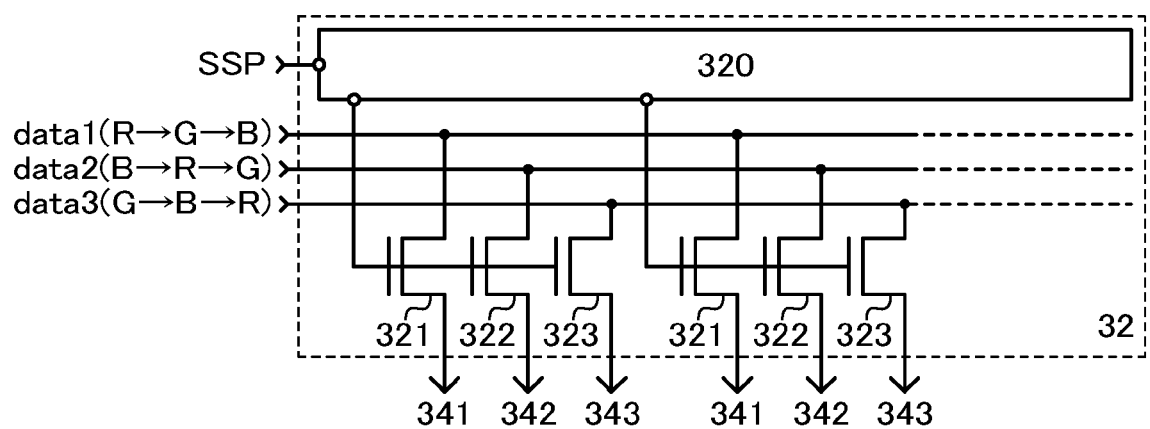
FIG. 8 illustrates a structure example of a signal line driver circuit.

FIG. 8 illustrates a structure example of the signal line driver circuit 32 included in the liquid crystal display device illustrated in FIG. 6A. The signal line driver circuit 32 illustrated in FIG. 8 includes a shift register 320 having m output terminals, m transistors 321, m transistors 322, and m transistors 323. Note that a gate of the transistor 321 is electrically connected to a j-th output terminal (j is a natural number that is 1 or more and m or less) of the shift register 320; one of a source and a drain of the transistor 321 is electrically connected to a wiring for supplying the first image signal (data1); and the other of the source and the drain of the transistor 321 is electrically connected to the signal line 341 provided in a j-th column in the pixel portion 30. In addition, a gate of the transistor 322 is electrically connected to the j-th output terminal of the shift register 320; one of a source and a drain of the transistor 322 is electrically connected to a wiring for supplying the second image signal (data2); and the other of the source and the drain of the transistor 322 is electrically connected to the signal line 342 provided in the j-th column in the pixel portion 30. Further, a gate of the transistor 323 is electrically connected to the j-th output terminal of the shift register 320; one of a source and a drain of the transistor 323 is electrically connected to a wiring for supplying the third image signal (data3); and the other of the source and the drain of the transistor 323 is electrically connected to the signal line 343 provided in the j-th column in the pixel portion 30.

Note that here, in the sampling period (T1), a red (R) image signal (an image signal for controlling transmission of red (R) light) is supplied to the signal line 341 as the first image signal (data1); in the sampling period (T2), a green (G) image signal (an image signal for controlling transmission of green (G) light) is supplied to the signal line 341 as the first image signal (data1); and in the sampling period (T3), a blue (B) image signal (an image signal for controlling transmission of blue (B) light) is supplied to the signal line 341 as the first image signal (data1). In addition, in the sampling period (T1), the blue (B) image signal is supplied to the signal line 342 as the second image signal (data2); in the sampling period (T2), the red (R) image signal is supplied to the signal line 342 as the second image signal (data2); and in the sampling period (T3), the green (G) image signal is supplied to the signal line 342 as the second image signal (data2). Further, in the sampling period (T1), the green (G) image signal is supplied to the signal line 343 as the third image signal (data3); in the sampling period (T2), the blue (B) image signal is supplied to the signal line 343 as the third image signal (data3); and in the sampling period (T3), the red (R) image signal is supplied to the signal line 343 as the third image signal (data3).

<Structure Example of Backlight>

The backlight described in Embodiment 1 can be used as a backlight of the liquid crystal display device described in this embodiment. Therefore, the above description is to be referred to.

<Operation Example of Liquid Crystal Display Device>

The liquid crystal display device described in this embodiment can operate like the liquid crystal display device described in Embodiment 1 (see FIG. 5). In other words, in the liquid crystal display device described in this embodiment, in the sampling period (T1), the m pixels 351 provided in the first row to the m pixels 351 provided in the n-th row are sequentially selected; the m pixels 352 provided in the (n+1)th row to the m pixels 352 provided in the 2n-th row are sequentially selected; and the m pixels 353 provided in the (2n+1)th row to the m pixels 353 provided in the 3n-th row are sequentially selected. Thus, the image signal can be input to each pixel.

Further, in the liquid crystal display device in this embodiment, as in the liquid crystal display device described in Embodiment 1, a selection signal and light of a given color can be supplied concurrently every region (the first to n-th rows, the (n+1) to 2n-th rows, and the (2n+1) to 3n-th rows).

<Liquid Crystal Display Device in this Embodiment>

The liquid crystal display device described in this embodiment operates like the liquid crystal display device described in Embodiment 1. In addition, as compared to the liquid crystal display device described in Embodiment 1, in the liquid crystal display device described in this embodiment, the aperture ratio can be further improved because the number of scan lines provided in the pixel portion and the number of transistors provided in each pixel are reduced. Further, because the number of scan lines provided in the pixel portion can be reduced, parasitic capacitance generated by overlap of the signal line and the scan line can be reduced; thus, the signal line can operate at high speed. Furthermore, the area of the scan line driver circuit and the number of signals that are necessary for the operation of the scan line driver circuit can be reduced (it is not necessary to input different start signals for the scan line driver circuit to a plurality of shift registers).

Modification Example

The liquid crystal display device described in this embodiment is one embodiment of the present invention, and the present invention includes a liquid crystal display device which is different from the aforementioned liquid crystal display device. For example, the structure of the liquid crystal display device described in this embodiment can be changed to the structure described in the modification example in Embodiment 1. Specifically, the shift register included in the liquid crystal display device in this embodiment can be replaced with a circuit having a similar function (e.g., a decoder).

The liquid crystal display device described in this embodiment has a structure where the pixel portion 30 is divided into three regions; however, the structure of the liquid crystal display device described in this embodiment is not limited to such a structure. In other words, in the liquid crystal display device described in this embodiment, the pixel portion 30 can be divided into given plural regions. Note that it is obvious that in the case where the number of regions is changed, the number of regions and the number of shift registers should be the same.

In the liquid crystal display device described in this embodiment, the number of pixels included in each of the three regions is the same (pixels are arranged in n rows and m columns in each region); however, in the liquid crystal display device described in this embodiment, the number of pixels can vary between regions. Specifically, pixels can be arranged in c rows and the m columns (c is a natural number) in a first region, and pixels can be arranged in d rows and the m columns (d is a natural number which is different from c) in a second region.

Embodiment 3

In this embodiment, the specific structure of the liquid crystal display device described in Embodiment 1 or 2 is described.

<Specific Example of Cross Section of Pixel>

Figure 9:
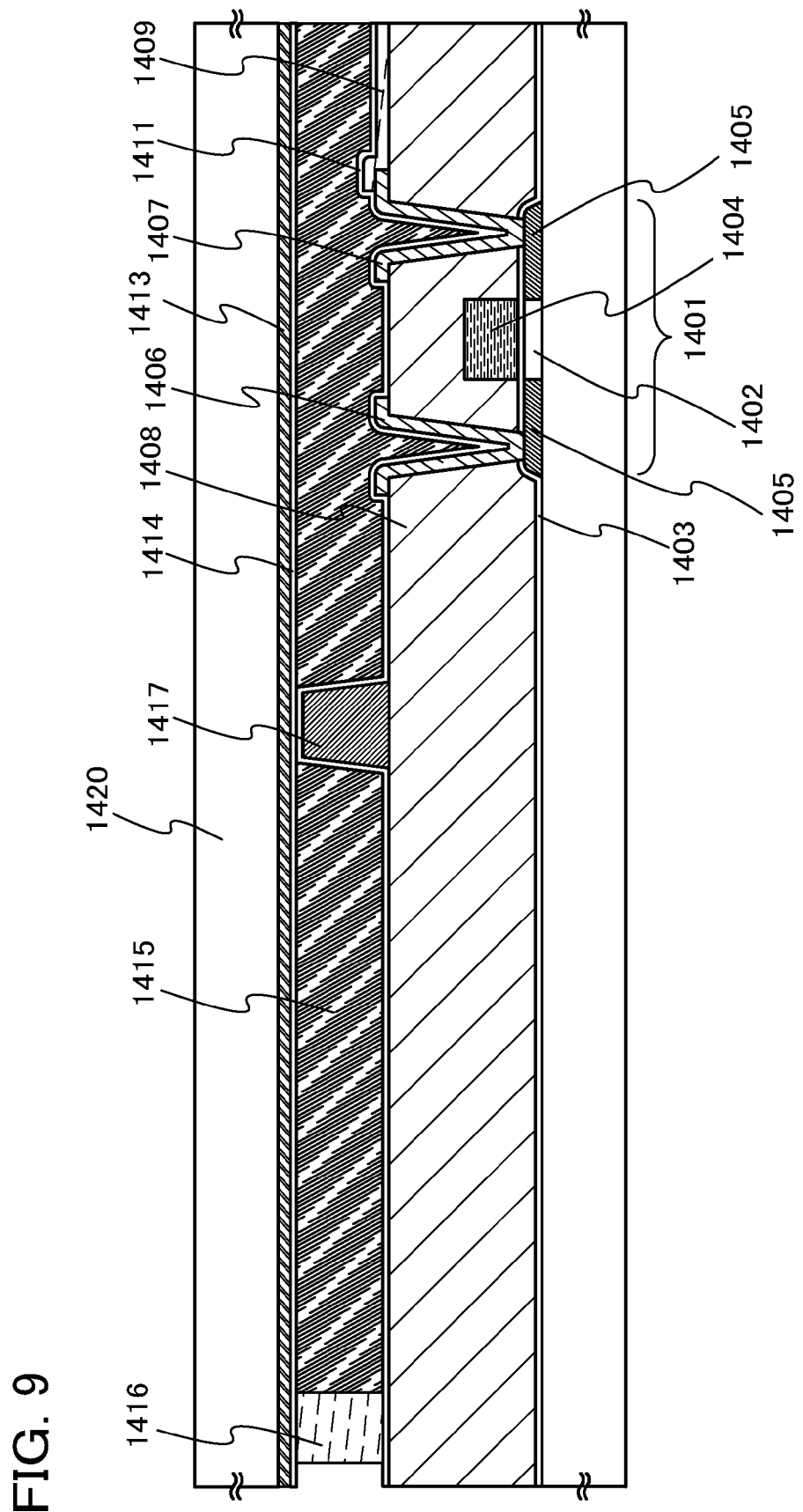
FIG. 9 is a cross-sectional view illustrating a specific example of a pixel.

FIG. 9 is a cross-sectional view of a pixel in a liquid crystal display device according to one embodiment of the present invention, as an example. A transistor 1401 illustrated in FIG. 9 includes at least a semiconductor layer 1402 including a polycrystalline semiconductor or a single crystal semiconductor, a gate insulating layer 1403 over the semiconductor layer 1402, and a gate layer 1404 which overlaps the semiconductor layer 1402 with the gate insulating layer 1403 provided therebetween. A pair of impurity regions 1405 functioning as a source and a drain is formed in the semiconductor layer 1402.

The transistor 1401 is covered with an insulating layer 1408. Conductive films 1406 and 1407 which are in contact with the pair of impurity regions 1405 through openings provided in the gate insulating layer 1403 and the insulating layer 1408 are formed over the insulating layer 1408. Further, a pixel electrode 1409 is formed over the insulating layer 1408 so as to be in contact with the conductive film 1407.

A spacer 1417 for controlling the cell gap of a liquid crystal element is formed over the insulating layer 1408. An insulating layer is etched to have a desired shape, so that the spacer 1417 can be formed. Alternatively, the cell gap may be controlled by dispersion of a filler over the insulating layer 1408.

An alignment film 1411 is formed over the pixel electrode 1409. Further, a counter substrate 1420 is provided with a counter electrode 1413 which faces the pixel electrode 1409, and an alignment film 1414 is formed on a side of the counter electrode 1413 that is close to the pixel electrode 1409. The alignment film 1411 and the alignment film 1414 can be formed using organic resins such as polyimide and poly(vinyl alcohol). Alignment treatment for aligning liquid crystal molecules in a certain direction, such as rubbing, is performed on their surfaces. A roller wrapped with cloth of nylon or the like is rolled while being in contact with the alignment film so that the surface of the alignment film can be rubbed in a certain direction. Note that it is also possible to form the alignment films 1411 and 1414 that have alignment characteristics with the use of inorganic materials such as silicon oxide, without alignment treatment.

Liquid crystals 1415 are provided in a region which is surrounded by a sealant 1416 between the pixel electrode 1409 and the counter electrode 1413. The liquid crystals 1415 may be injected by a dispenser method (a dripping method) or a dipping method (a pumping method). Note that a filler may be mixed in the sealant 1416.

A light-blocking film which can block light may be formed between pixels so that disclination caused by disorder of alignment of the liquid crystals 1415 between the pixels is prevented from being observed. The light-blocking film can be formed using an organic resin containing a black pigment such as a carbon black or low-valent titanium oxide. Alternatively, the light-blocking film can be formed using a film including chromium.

The pixel electrode 1409 and the counter electrode 1413 can be formed using transparent conductive materials such as indium tin oxide including silicon oxide (ITSO), indium tin oxide (ITO), zinc oxide (ZnO), indium zinc oxide (IZO), and zinc oxide to which gallium is added (GZO), for example.

Note that although a TN (twisted nematic) liquid crystal display device is used as the liquid crystal display device here, a different liquid crystal display device such as a VA (vertical alignment) liquid crystal display device, an OCB (optically compensated birefringence) liquid crystal display device, an IPS (in-plane switching) liquid crystal display device, or an MVA (multi-domain vertical alignment) liquid crystal display device may be used.

Alternatively, a liquid crystal exhibiting a blue phase for which an alignment film is unnecessary may be used. A blue phase is one of liquid crystal phases, which is observed just before a cholesteric phase changes into an isotropic phase while the temperature of a cholesteric liquid crystal is increased. Since the blue phase appears only in a narrow temperature range, a chiral agent or an ultraviolet curable resin is added so that the temperature range is improved. Specifically, a liquid crystal composition in which 5 wt. % or more of a chiral agent is mixed is used for the liquid crystal 1415. The liquid crystal composition which includes a liquid crystal exhibiting a blue phase and a chiral agent has a short response time of 10 to 100 μs and has optical isotropy. Therefore, the liquid crystal display device does not require an alignment film and has a small viewing angle dependence. A liquid crystal with such characteristics is particularly preferable as a liquid crystal included in the liquid crystal display device (a liquid crystal display device which needs to input image signals to each pixel plural times in order to display images).

Note that FIG. 9 illustrates a liquid crystal element with a structure where the liquid crystals 1415 are provided between the pixel electrode 1409 and the counter electrode 1413; however, the structure of the liquid crystal display device according to one embodiment of the present invention is not limited to this structure. Like an IPS liquid crystal element or a liquid crystal element using a liquid crystal exhibiting a blue phase, a pair of electrodes may be formed over one substrate.

<Specific Example of Connection Between Pixel Portion and Driver Circuit>

Next, a method for connecting terminals to each other when a substrate provided with a driver circuit is directly mounted on a substrate provided with a pixel portion is described.

Figure 10A:
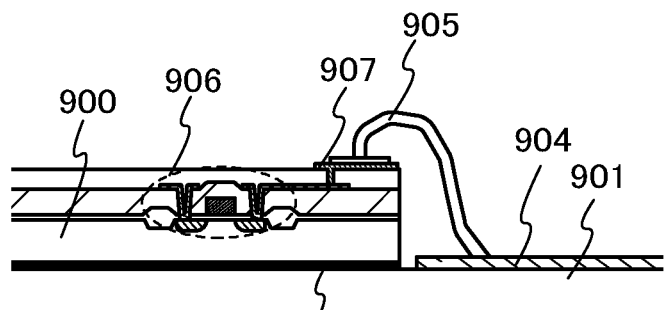
FIGS. 10A to 10C illustrate specific examples of connections between terminals.

FIG. 10A is the cross-sectional view of a portion where a substrate 900 provided with a driver circuit and a substrate 901 provided with a pixel portion are connected to each other by wire bonding. The substrate 900 is attached onto the substrate 901 with an adhesive 903. The substrate 900 is provided with a transistor 906 included in the driver circuit. In addition, the transistor 906 is electrically connected to a pad 907 that is formed so as to be exposed on a surface of the substrate 900 and that functions as a terminal A terminal 904 is provided over the substrate 901 illustrated in FIG. 10A, and the pad 907 and the terminal 904 are connected to each other with a wire 905.

Figure 10B:
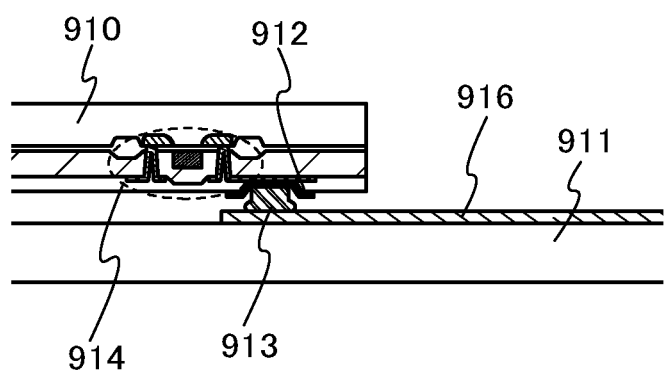

FIG. 10B is the cross-sectional view of a portion where a substrate 911 provided with a pixel portion and a substrate 910 provided with a driver circuit are connected to each other by a flip-chip method. In FIG. 10B, a solder ball 913 is connected to a pad 912 formed so as to be exposed on a surface of the substrate 910. Thus, a transistor 914 included in the driver circuit provided on the substrate 910 is electrically connected to the solder ball 913 through the pad 912. In addition, the solder ball 913 is connected to a terminal 916 formed over the substrate 911.

Note that the solder ball 913 and the terminal 916 can be connected to each other by any of a variety of methods such as thermocompression bonding and thermocompression bonding with vibration generated with ultrasonic waves. The mechanical strength of a connection portion or the efficiency of diffusion or the like of heat generated in the substrate 911 may be increased when an under-fill resin is provided between the substrate 910 and the substrate 911 so that a space between the solder balls subjected to the thermocompression bonding is filled with the under-fill resin. The under-fill resin is not necessarily provided; however, with the under-fill resin, poor connection caused by stress generated by mismatch of the thermal expansion coefficient of the substrate 910 and the thermal expansion coefficient of the substrate 911 can be prevented. In the case of thermocompression bonding with vibration generated with ultrasonic waves, poor connection can be prevented more efficiently as compared to thermocompression bonding.

The flip-chip method is suitable for connection when the number of terminals is large because a pitch between pads can be increased as compared to the wire bonding even when the number of pads that should be connected is increased.

Note that a droplet discharge method by which a liquid in which metal nanoparticles are dispersed is discharged may be employed.

Figure 10C:
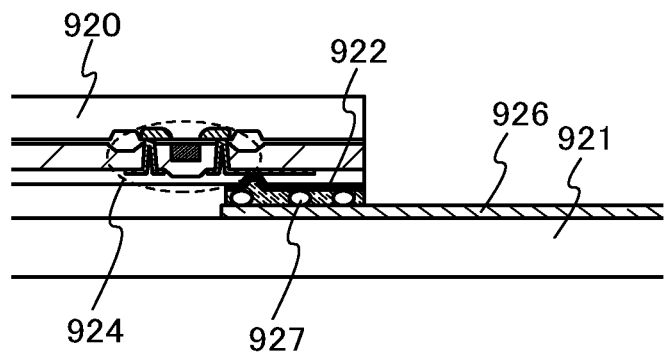

FIG. 10C is the cross-sectional view of a portion where a substrate 921 provided with a pixel portion and a substrate 920 provided with a driver circuit are connected to each other with an anisotropic conductive resin. In FIG. 10C, a pad 922 formed so as to be exposed on a surface of the substrate 920 is electrically connected to a transistor 924 included in the driver circuit provided on the substrate 920. In addition, the pad 922 is connected to a terminal 926 formed over the substrate 921 with an anisotropic conductive resin 927.

Note that the connection method is not limited to the methods illustrated in FIGS. 10A to 10C. The terminals may be connected to each other with a combination of the wire bonding and the flip-chip method.

<Specific Example of Panel>

Next, examples of a pixel portion and a driver circuit are described. Note that here, transistors which include polycrystalline semiconductors in channel formation regions are used as transistors included in the whole of or part of the pixel portion and the driver circuit. In that case, the pixel portion and part or all of the driver circuit can be formed over one substrate.

Figure 11A:
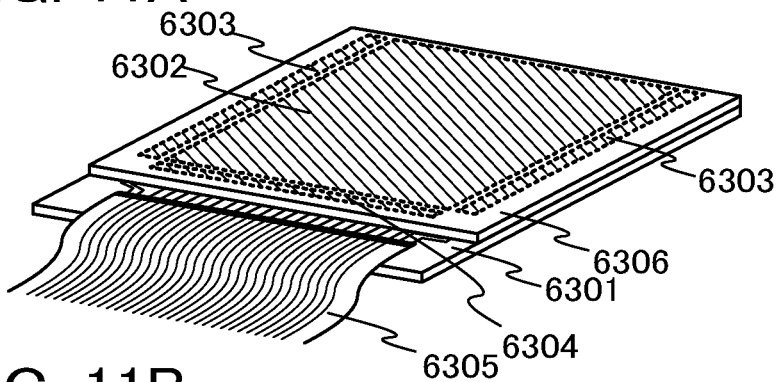
FIGS. 11A to 11D are perspective views illustrating specific examples of liquid crystal display devices.

A liquid crystal display device illustrated in FIG. 11A includes a pixel portion 6302, scan line driver circuits 6303, and a signal line driver circuit 6304 over a substrate 6301. A counter substrate 6306 overlaps with the substrate 6301 so as to cover the pixel portion 6302, the scan line driver circuits 6303, and the signal line driver circuit 6304. In addition, power supply potentials, a variety of signals, and the like are supplied to the pixel portion 6302, the scan line driver circuits 6303, and the signal line driver circuit 6404 through an FPC 6305.

Figure 11B:
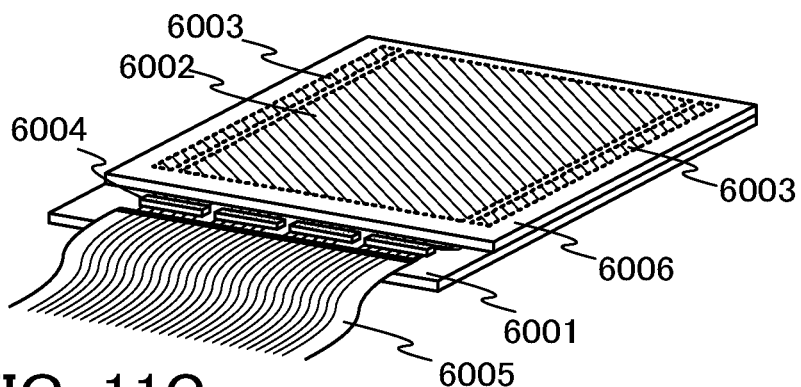

A liquid crystal display device illustrated in FIG. 11B includes a pixel portion 6002 and scan line driver circuits 6003 over a substrate 6001. A counter substrate 6006 overlaps with the substrate 6001 so as to cover the pixel portion 6002 and the scan line driver circuits 6003. A substrate 6004 provided with a signal line driver circuit is directly mounted on the substrate 6001. Specifically, the signal line driver circuit provided on the substrate 6004 is attached to the substrate 6001 and is electrically connected to the pixel portion 6002. In addition, power supply potentials, a variety of signals, and the like are supplied to the pixel portion 6002, the scan line driver circuits 6003, and the signal line driver circuit provided on the substrate 6004 through an FPC 6005.

Figure 11C:
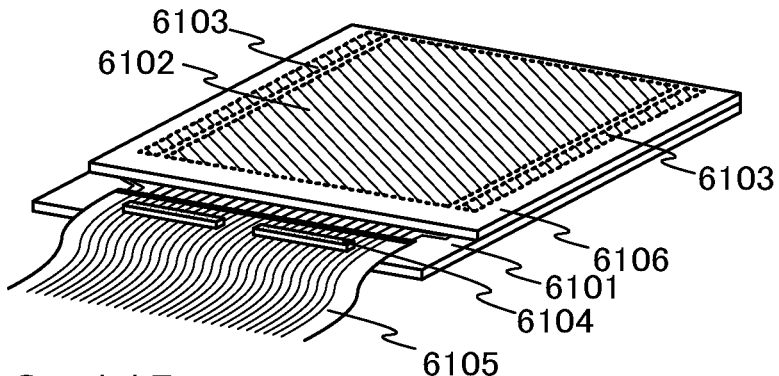

A liquid crystal display device illustrated in FIG. 11C includes a pixel portion 6102 and scan line driver circuits 6103 over a substrate 6101. A counter substrate 6106 overlaps with the substrate 6101 so as to cover the pixel portion 6102 and the scan line driver circuits 6103. A substrate 6104 provided with a signal line driver circuit is mounted on an FPC 6105 connected to the substrate 6101. In addition, power supply potentials, a variety of signals, and the like are supplied to the pixel portion 6102, the scan line driver circuits 6103, and the signal line driver circuit provided on the substrate 6104 through the FPC 6105.

Figure 11D:
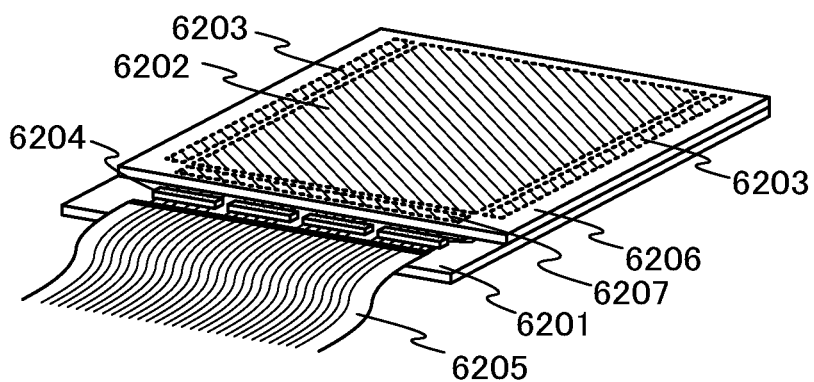

A liquid crystal display device illustrated in FIG. 11D includes a pixel portion 6202, scan line driver circuits 6203, and a part 6207 of a signal line driver circuit over a substrate 6201. A counter substrate 6206 overlaps with the substrate 6201 so as to cover the pixel portion 6202, the scan line driver circuits 6203, and the part 6207 of the signal line driver circuit. A substrate 6204 provided with a different part of the signal line driver circuit is directly mounted on the substrate 6201. Specifically, the different part of the signal line driver circuit provided on the substrate 6204 is attached to the substrate 6201 and is electrically connected to the part 6207 of the signal line driver circuit. In addition, power supply potentials, a variety of signals, and the like are supplied to the pixel portion 6202, the scan line driver circuits 6203, the part 6207 of the signal line driver circuit, and the different part of the signal line driver circuit provided on the substrate 6204 through an FPC 6205.

A mounting method of the substrate is not particularly limited to a certain method, and a known COG method, wire bonding, a TAB method, or the like can be employed. In addition, positions where the IC chips are mounted are not limited to the positions illustrated in FIGS. 11B to 11D as long as electrical connection is possible. Further, a controller, a CPU, a memory, or the like may be formed using an IC chip and may be mounted on the substrate provided with the pixel portion.

<Specific Example of Liquid Crystal Display Device>

Figures 12A, 12B:
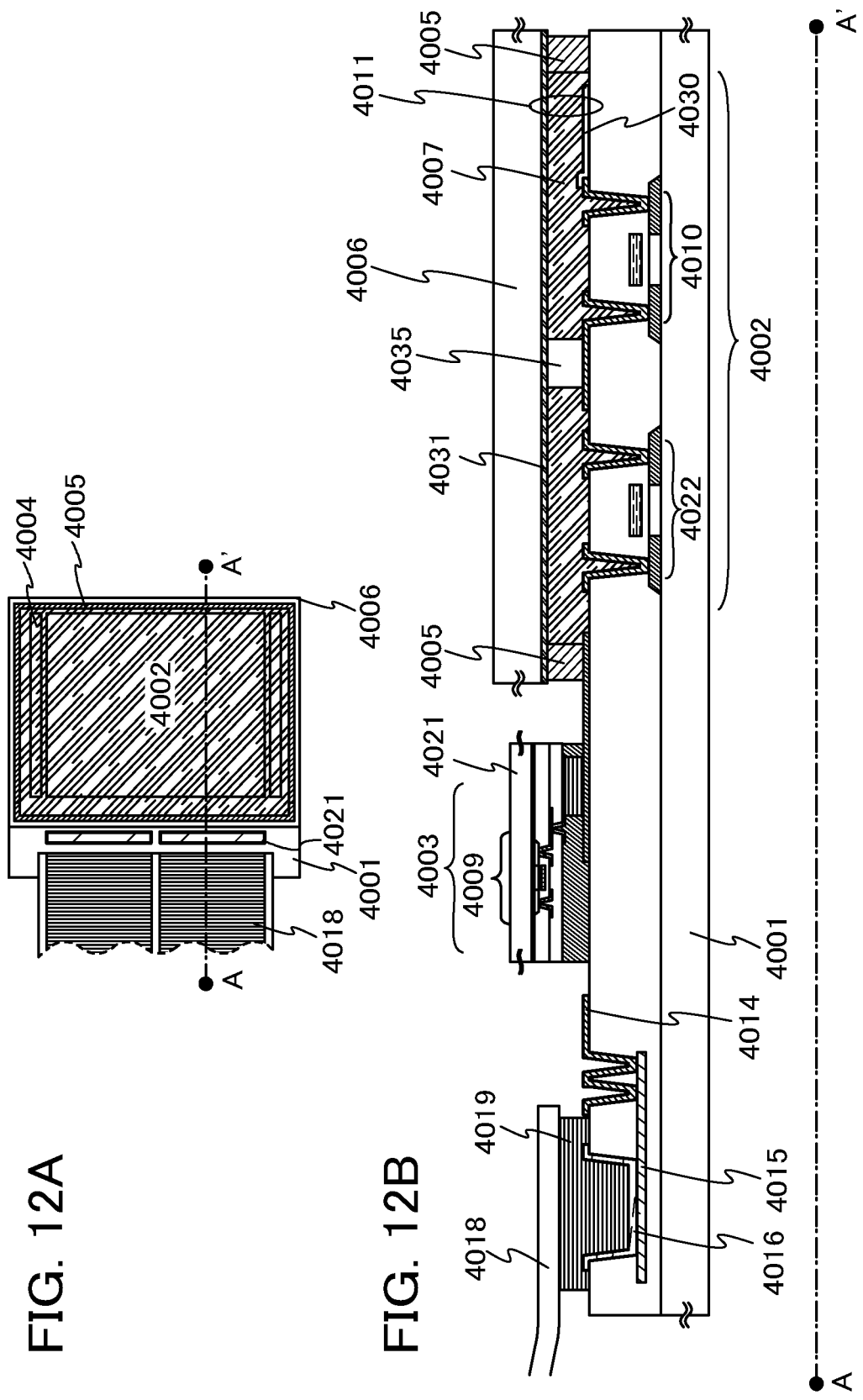
FIG. 12A is a top view illustrating a specific example of a liquid crystal display device.
FIG. 12B is a cross-sectional view illustrating the specific example of the liquid crystal display device.

Next, an appearance of a panel of the liquid crystal display device according to one embodiment of the present invention is described with reference to FIGS. 12A and 12B. FIG. 12A is a top view of a panel where a substrate 4001 and a counter substrate 4006 are bonded to each other with a sealant 4005. FIG. 12B corresponds to a cross-sectional view taken along broken line A-A' in FIG. 12A.

The sealant 4005 is provided so as to surround a pixel portion 4002 and a scan line driver circuit 4004 provided over the substrate 4001. In addition, the counter substrate 4006 is provided over the pixel portion 4002 and the scan line driver circuit 4004. Thus, the pixel portion 4002 and the scan line driver circuit 4004 are sealed together with liquid crystals 4007 by the substrate 4001, the sealant 4005, and the counter substrate 4006.

A substrate 4021 provided with a signal line driver circuit 4003 is mounted in a region which is different from a region surrounded by the sealant 4005 over the substrate 4001. FIG. 12B illustrates a transistor 4009 included in the signal line driver circuit 4003.

A plurality of transistors are included in the pixel portion 4002 and the scan line driver circuit 4004 which are provided over the substrate 4001. FIG. 12B illustrates transistors 4010 and 4022 which are included in the pixel portion 4002. Each of the transistors 4010 and 4022 includes a polycrystalline semiconductor in a channel formation region.

A pixel electrode 4030 included in a liquid crystal element 4011 is electrically connected to the transistor 4010. A counter electrode 4031 of the liquid crystal element 4011 is formed on the counter substrate 4006. A portion where the pixel electrode 4030, the counter electrode 4031, and the liquid crystal 4007 overlap with each other corresponds to the liquid crystal element 4011.

A spacer 4035 is provided in order to control a distance (a cell gap) between the pixel electrode 4030 and the counter electrode 4031. Note that although FIG. 12B illustrates the case where the spacer 4035 is obtained by patterning of an insulating film, a spherical spacer may be used.

A variety of signals and potentials are supplied to the signal line driver circuit 4003, the scan line driver circuit 4004, and the pixel portion 4002 from a connection terminal 4016 through lead wirings 4014 and 4015. The connection terminal 4016 is electrically connected to a terminal of an FPC 4018 through an anisotropic conductive film 4019.

Note that as the substrate 4001, the counter substrate 4006, and the substrate 4021, glass, ceramics, or plastics can be used. Plastics include a fiberglass-reinforced plastic (FRP) plate, a poly(vinyl fluoride) (PVF) film, a polyester film, an acrylic resin film, and the like.

Note that a light-transmitting material such as a glass plate, plastics, a polyester film, or an acrylic resin film is used for a substrate which is positioned in a direction from which light transmitted through the liquid crystal element 4011 is extracted.

FIGS. 19A and 19B illustrate an appearance of a panel which is different from that of the liquid crystal display device illustrated in FIGS. 12A and 12B. Note that FIG. 19A is a top view of a panel where a substrate 5001 and a counter substrate 5006 are bonded to each other with a sealant 5005. FIG. 19B corresponds to a cross-sectional view taken along broken line B-B' in FIG. 19A. The liquid crystal display device illustrated in FIGS. 19A and 19B differs from the liquid crystal display device illustrated in FIGS. 12A and 12B in that not only a pixel portion 5002 and a scan line driver circuit 5004 but also a signal line driver circuit 5003 is formed over the substrate 5001.

In the liquid crystal display device illustrated in FIGS. 19A and 19B, the sealant 5005 is provided so as to surround the pixel portion 5002, the signal line driver circuit 5003, and the scan line driver circuit 5004 which are provided over the substrate 5001. In addition, the counter substrate 5006 is provided over the pixel portion 5002, the signal line driver circuit 5003, and the scan line driver circuit 5004. Thus, the pixel portion 5002, the signal line driver circuit 5003, and the scan line driver circuit 5004 are sealed together with liquid crystals 5007 by the substrate 5001, the sealant 5005, and the counter substrate 5006.

A plurality of transistors are included in the pixel portion 5002, the signal line driver circuit 5003, and the scan line driver circuit 5004 which are provided over the substrate 5001. FIG. 19B illustrates a transistor 5010 which is included in the pixel portion 5002 and a transistor 5009 which is included in the signal line driver circuit 5003. Note that each of the transistors 5009 and 5010 includes a single crystal semiconductor in a channel formation region. Therefore, the pixel portion 5002 and all of the driver circuits such as the signal line driver circuit 5003 and the scan line driver circuit 5004 can be formed over the substrate 5001.

A pixel electrode 5030 included in a liquid crystal element 5011 is electrically connected to the transistor 5010. A counter electrode 5031 of the liquid crystal element 5011 is formed on the counter substrate 5006. A portion where the pixel electrode 5030, the counter electrode 5031, and the liquid crystal 5007 overlap with each other corresponds to the liquid crystal element 5011.

A spacer 5035 is provided in order to control a distance (a cell gap) between the pixel electrode 5030 and the counter electrode 5031. Note that although FIG. 19B illustrates the case where the spacer 5035 is obtained by patterning of an insulating film, a spherical spacer may be used.

A variety of signals and potentials are supplied to the signal line driver circuit 5003, the scan line driver circuit 5004, and the pixel portion 5002 from a connection terminal 5016 through lead wirings 5014 and 5015. The connection terminal 5016 is electrically connected to a terminal of an FPC 5018 through an anisotropic conductive film 5019.

Note that as the substrate 5001 and the counter substrate 5006, glass, ceramics, or plastics can be used. Plastics include a fiberglass-reinforced plastic (FRP) plate, a poly(vinyl fluoride) (PVF) film, a polyester film, an acrylic resin film, and the like.

Note that a light-transmitting material such as a glass plate, plastics, a polyester film, or an acrylic resin film is used for a substrate which is positioned in a direction from which light transmitted through the liquid crystal element 5011 is extracted.

FIG. 13 is an example of a perspective view illustrating the structure of the liquid crystal display device according to one embodiment of the present invention. The liquid crystal display device illustrated in FIG. 13 includes a panel 1601 including a pixel portion, a first diffusion plate 1602, a prism sheet 1603, a second diffusion plate 1604, a light guide plate 1605, a backlight panel 1607, a circuit board 1608, and substrates 1611 provided with signal line driver circuits.

The panel 1601, the first diffusion plate 1602, the prism sheet 1603, the second diffusion plate 1604, the light guide plate 1605, and the backlight panel 1607 are sequentially stacked. The backlight panel 1607 includes a backlight 1612 including a plurality of backlight units. Light from the backlight 1612 that is diffused in the light guide plate 1605 is delivered to the panel 1601 through the first diffusion plate 1602, the prism sheet 1603, and the second diffusion plate 1604.

Although the first diffusion plate 1602 and the second diffusion plate 1604 are used in this embodiment, the number of diffusion plates is not limited to two. The number of diffusion plates may be one, or may be three or more. It is acceptable as long as the diffusion plate is provided between the light guide plate 1605 and the panel 1601. Thus, the diffusion plate may be provided only on a side closer to the panel 1601 than the prism sheet 1603, or may be provided only on a side closer to the light guide plate 1605 than the prism sheet 1603.

Further, the shape of the cross section of the prism sheet 1603 is not limited to a sawtooth shape illustrated in FIG. 13, but may be a shape with which light from the light guide plate 1605 can be concentrated on the panel 1601 side.

The circuit board 1608 includes a circuit for generating various kinds of signals to be input to the panel 1601, a circuit for processing the signals, and the like. In addition, in FIG. 13, the circuit board 1608 and the panel 1601 are connected to each other via COF tapes 1609. Further, the substrates 1611 provided with the signal line driver circuits are connected to the COF tapes 1609 by a chip on film (COF) method.

FIG. 13 illustrates an example in which the circuit board 1608 is provided with a control circuit which controls driving of the backlight 1612 and the control circuit and the backlight panel 1607 are connected to each other through an FPC 1610. Note that the control circuit may be formed over the panel 1601. In that case, the panel 1601 and the backlight panel 1607 are connected to each other through an FPC or the like.

<Specific Example of Liquid Crystal Display Device with Touch Panel>

Figure 14A:
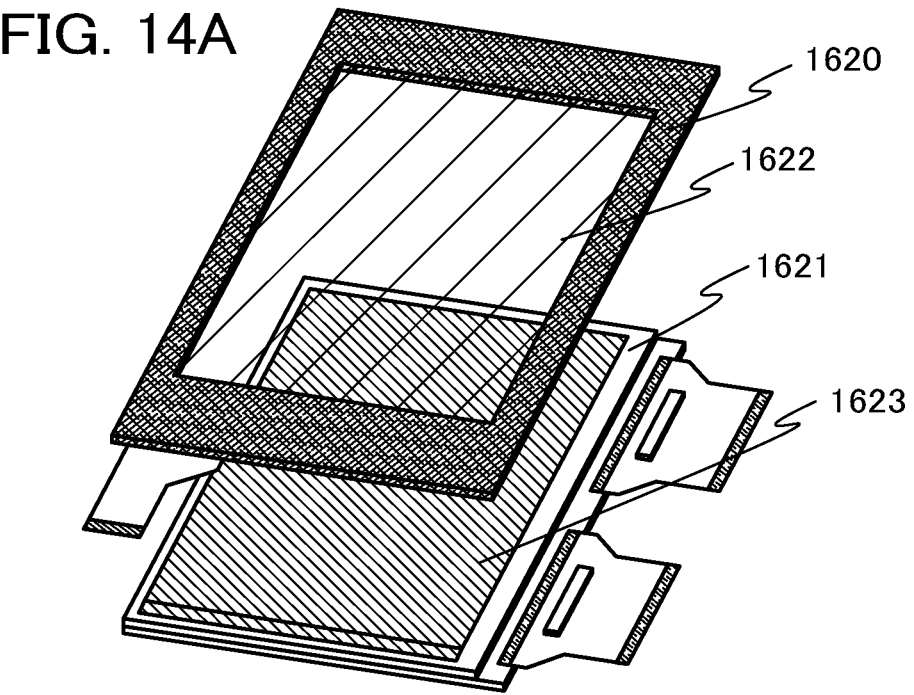
FIGS. 14A and 14B illustrate a specific example of a touch panel.

The liquid crystal display device according to one embodiment of the present invention may include a pointing device called a touch panel. FIG. 14A illustrates the case where a touch panel 1620 and a panel 1621 overlap with each other.

The touch panel 1620 can detect a position touched by a finger, a stylus, or the like in a light-transmitting position detection portion 1622 and can generate a signal including data on the position. Thus, when the touch panel 1620 is provided so that the position detection portion 1622 overlaps with a pixel portion 1623 of the panel 1621, data on a position in the pixel portion 1623 that is touched by the user of the liquid crystal display device can be obtained.

Figure 14B:
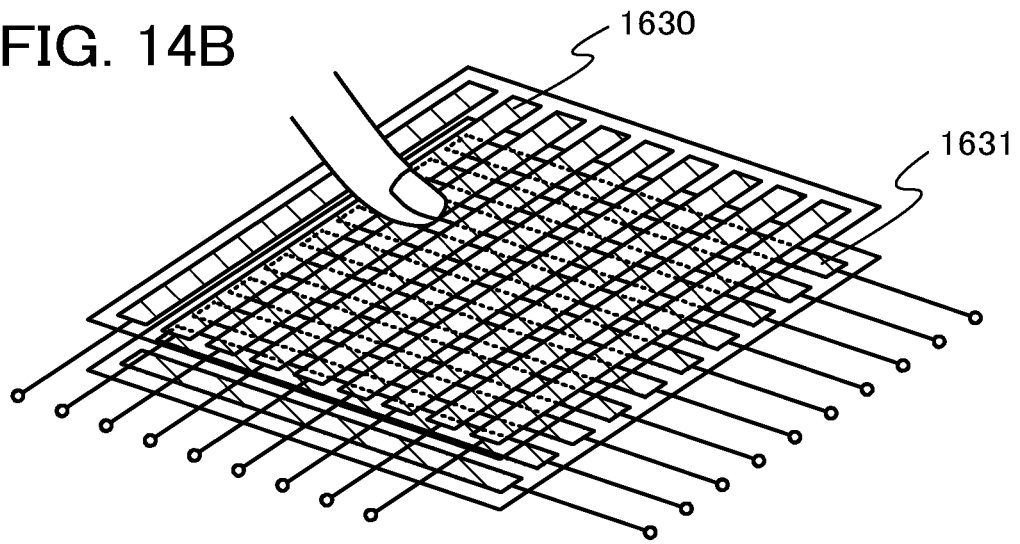

The position detection portion 1622 can detect positions by a variety of methods such as a resistive method, a capacitive method, and the like. FIG. 14B is a perspective view of the resistive position detection portion 1622. The resistive position detection portion 1622 is provided so that a plurality of first electrodes 1630 and a plurality of second electrodes 1631 face each other with spaces provided therebetween. When stress is applied to one of the plurality of first electrodes 1630 with a finger or the like, the first electrode 1630 is in contact with one of the plurality of second electrodes 1631. In addition, when the level of voltage of both ends of each of the plurality of first electrodes 1630 and the level of voltage of both ends of each of the plurality of second electrodes 1631 are monitored, it is possible to identify which first electrode 1630 is in contact with which second electrode 1631; thus, the position touched by the finger can be detected.

The first electrode 1630 and the second electrode 1631 can be formed using light-transmitting conductive materials such as indium tin oxide including silicon oxide (ITSO), indium tin oxide (ITO), zinc oxide (ZnO), indium zinc oxide (IZO), and zinc oxide to which gallium is added (GZO), for example.

Figure 15A:
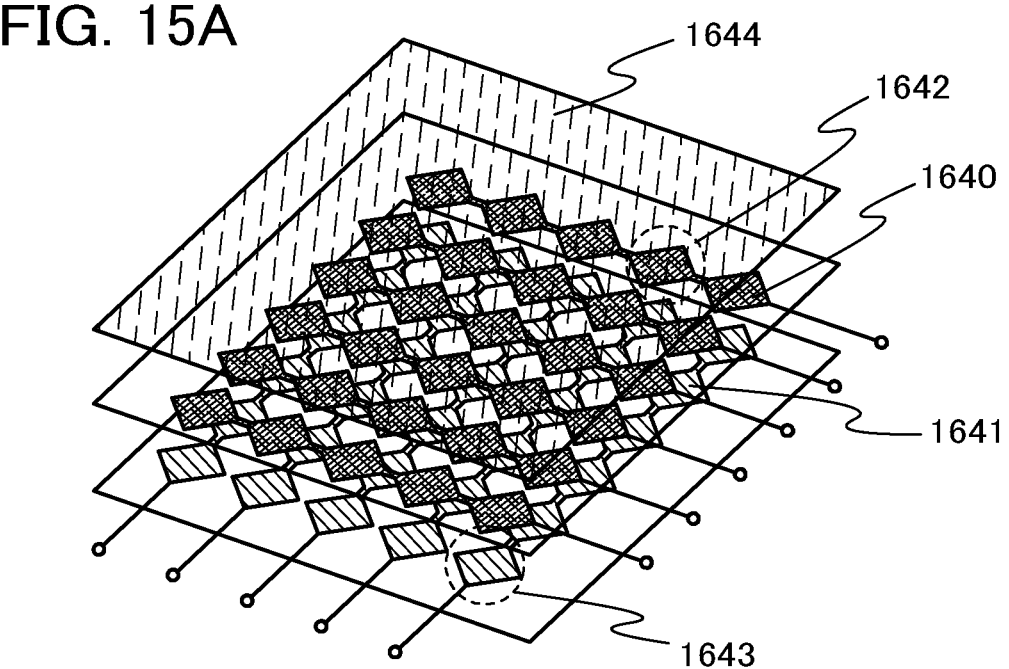
FIGS. 15A and 15B illustrate a specific example of a touch panel.

FIG. 15A is a perspective view of the position detection portion 1622 using a projected capacitive method as a capacitive method. The projected capacitive position detection portion 1622 is provided so that a plurality of first electrodes 1640 and a plurality of second electrodes 1641 overlap with each other. The plurality of first electrodes 1640 have a structure where a plurality of rectangular conductive films 1642 are connected to each other. The plurality of second electrodes 1641 have a structure where a plurality of rectangular conductive films 1643 are connected to each other. Note that the structures of the first electrode 1640 and the second electrode 1641 are not limited to these structures.

Figure 15B:
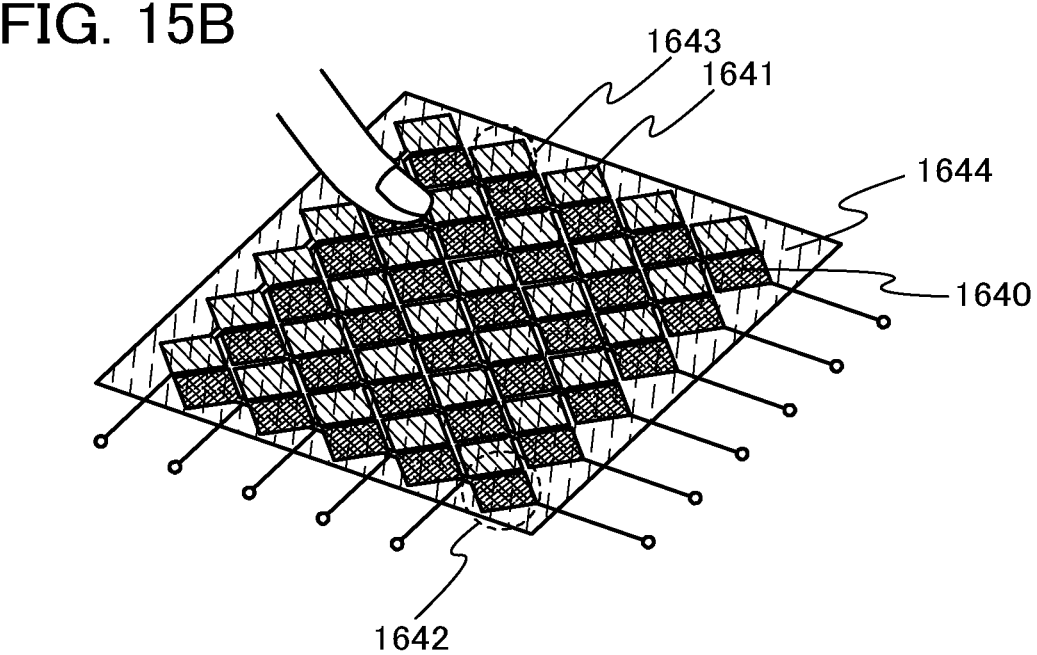

Further, in FIG. 15A, an insulating layer 1644 functioning as a dielectric overlaps with the plurality of first electrodes 1640 and the plurality of second electrodes 1641. FIG. 15B illustrates the case where the plurality of first electrodes 1640, the plurality of second electrodes 1641, and the insulating layer 1644 which are illustrated in FIG. 15A overlap with each other. As illustrated in FIG. 15B, the plurality of first electrodes 1640 and the plurality of second electrodes 1641 overlap with each other so that the position of the rectangular conductive film 1642 and the position of the rectangular conductive film 1643 are not aligned with each other.

When a finger or the like is in contact with the insulating layer 1644, capacitance is generated between one of the plurality first electrodes 1640 and the finger. Further, capacitance is generated between one of the plurality second electrodes 1641 and the finger. Thus, when changes in capacitance are monitored, it is possible to identify which first electrode 1640 and which second electrode 1641 are closest to the finger. Accordingly, the position touched by the finger can be detected.

<Specific Example of Liquid Crystal Display Device Including Photo Sensor>

Figure 16A:
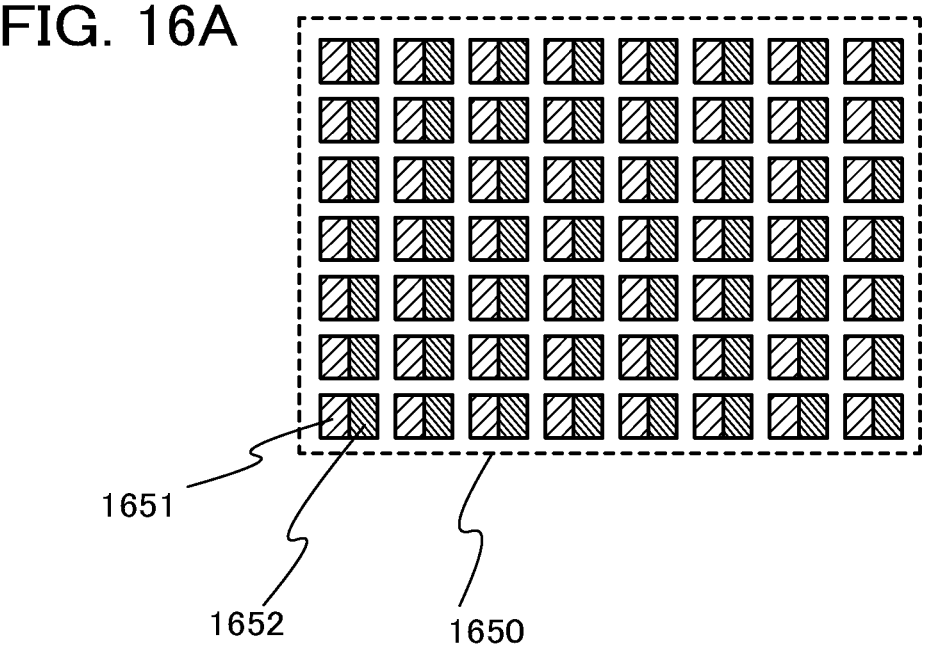
FIG. 16A illustrates a specific example of a pixel portion including a photo sensor.

The liquid crystal display device according to one embodiment of the present invention may include a photo sensor in a pixel portion. FIG. 16A schematically illustrates an example of the structure of the pixel portion including a photo sensor.

A pixel portion 1650 illustrated in FIG. 16A includes pixels 1651 and photo sensors 1652 corresponding to the pixels 1651. The photo sensor 1652 includes a transistor and a light-receiving element which has a function of generating an electrical signal when receiving light, such as a photodiode. Note that as light which is received by the photo sensor 1652, reflected light obtained when light from a backlight is delivered to an object to be detected can be used.

Figure 16B:
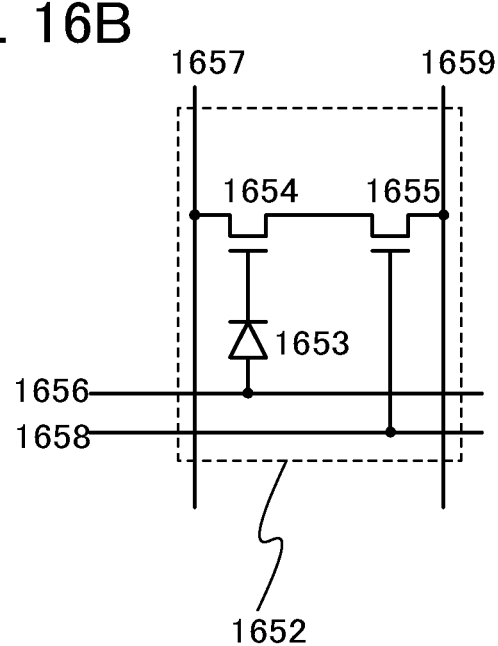
FIG. 16B illustrates a specific example of the photo sensor.

FIG. 16B illustrates an example of the structure of the photo sensor 1652. The photo sensor 1652 illustrated in FIG. 16B includes a photodiode 1653, a transistor 1654, and a transistor 1655. One electrode of the photodiode 1653 is electrically connected to a reset signal line 1656. The other electrode of the photodiode 1653 is electrically connected to a gate of the transistor 1654. One of a source and a drain of the transistor 1654 is connected to a reference signal line 1657. The other of the source and the drain of the transistor 1654 is connected to one of a source and a drain of the transistor 1655. A gate of the transistor 1655 is connected to a gate signal line 1658. The other of the source and the drain of the transistor 1655 is connected to an output signal line 1659.

<First Example of Method for Manufacturing Transistor>

Next, an example of a method for manufacturing a transistor including a polycrystalline semiconductor in a channel formation region is described.

Figure 17A:
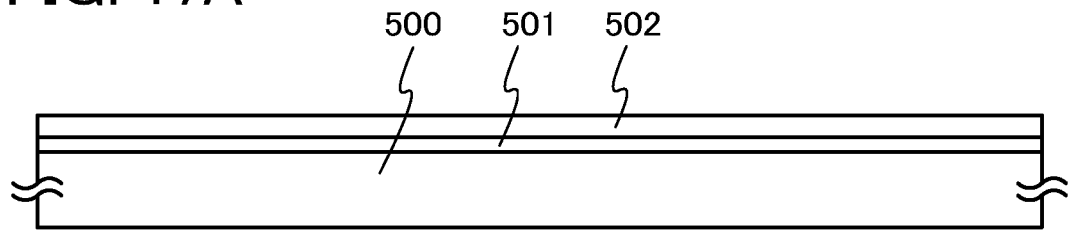
FIGS. 17A to 17D are cross-sectional views illustrating a specific example of a method for manufacturing a transistor.

First, as illustrated in FIG. 17A, an insulating layer 501 and a semiconductor layer 502 are sequentially formed over a light-transmitting substrate 500. The insulating layer 501 and the semiconductor layer 502 can be successively formed without being exposed to the air.

Although there is no particular limitation on a substrate which can be used as the substrate 500, it is necessary that the substrate have at least heat resistance high enough to withstand heat treatment to be performed later. For example, a glass substrate formed by a fusion process or a float process can be used. In the case where the temperature of the heat treatment to be performed later is high, a glass substrate whose strain point is 730° C. or higher is preferably used as a glass substrate. For the glass substrate, a glass material such as aluminosilicate glass, aluminoborosilicate glass, or barium borosilicate glass is used, for example. Note that in general, by containing more barium oxide (BaO) than boron oxide ($B_2O_3$), a more practical heat-resistant glass substrate can be obtained. Therefore, a glass substrate containing more BaO and $B_2O_3$ is preferably used. Here, as the substrate 500, a 0.5-mm-thick aluminosilicate glass substrate, which is a non-alkali glass substrate, (manufactured by Asahi Glass Co., Ltd. (trade name: AN100)) is used.

The insulating layer 501 is provided in order that alkali metal such as Na or alkaline earth metal contained in the substrate 500 can be prevented from diffusing into the semiconductor layer 502 and adversely affecting characteristics of a semiconductor element such as a transistor. Thus, it is preferable that the insulating layer 501 be formed using an insulating material having a high barrier property that can suppress diffusion of alkali metal or alkaline earth metal into the semiconductor layer 502. Note that in the case where a substrate containing even a small amount of alkali metal or alkaline earth metal, such as a glass substrate or a plastic substrate, is used, provision of the insulating layer 501 between the substrate 500 and the semiconductor layer 502 is effective in preventing diffusion of impurities. However, when a substrate in which diffusion of impurities does not lead to a significant problem, such as a quartz substrate, is used as the substrate 500, the insulating layer 501 is not necessarily provided.

The insulating layer 501 is formed using an insulating material such as silicon oxide, silicon nitride, silicon oxynitride, silicon nitride oxide, or aluminum nitride by CVD, sputtering, or the like.

Note that a silicon oxynitride film is a film which contains more oxygen than nitrogen and, in the case where measurement is performed using Rutherford backscattering spectrometry (RBS) and hydrogen forward scattering spectrometry (HFS), shows concentrations of oxygen, nitrogen, silicon, and hydrogen at a range from 50 to 70 at. %, 0.5 to 15 at. %, 25 to 35 at. %, and 0.1 to 10 at. %, respectively. Further, a silicon nitride oxide film is a film which contains more nitrogen than oxygen and, in the case where measurement is performed using RBS and HFS, shows concentrations of oxygen, nitrogen, silicon, and hydrogen at a range from 5 to 30 at. %, 20 to 55 at. %, 25 to 35 at. %, and 10 to 25 at. %, respectively. Note that percentages of nitrogen, oxygen, silicon, and hydrogen fall within the ranges given above if the total number of atoms contained in silicon oxynitride or silicon nitride oxide is defined as 100 at. %.

The insulating layer 501 may be formed using a single insulating film or a stack of a plurality of insulating films. Here, the insulating layer 501 is formed by sequentially stacking a 50-nm-thick silicon nitride oxide film and a 140-nm-thick silicon oxynitride film. However, the material and the thickness of each film, and the number of stacked layers are not limited to these.

A silicon oxide film can be formed using a mixed gas of silane and oxygen, tetraethoxysilane (TEOS) and oxygen, or the like by a method such as thermal CVD, plasma-enhanced CVD, atmospheric pressure CVD, or bias ECRCVD. A silicon nitride film can be typically formed using a mixed gas of silane and ammonia by plasma-enhanced CVD. A silicon oxynitride film and a silicon nitride oxide film can be typically formed using a mixed gas of silane and dinitrogen monoxide by plasma-enhanced CVD.

The semiconductor layer 502 is preferably formed without being exposed to the air after the insulating layer 501 is formed. The thickness of the semiconductor layer 502 is 20 to 200 nm (preferably 40 to 170 nm, more preferably 50 to 150 nm). Note that the semiconductor layer 502 includes a polycrystalline semiconductor containing silicon or germanium.

The semiconductor layer 502 including a polycrystalline semiconductor can be formed by crystallization of an amorphous semiconductor layer or a microcrystalline semiconductor layer by laser crystallization, thermal crystallization, thermal crystallization in which a catalytic element which promotes crystallization, such as nickel, is used, or the like alone, or by a combination of any of the above methods.

Alternatively, a polycrystalline semiconductor may be formed directly by sputtering, plasma-enhanced CVD, thermal CVD, or the like. In the case where laser crystallization is performed without introduction of a catalytic element which promotes crystallization, in order to prevent generation of a phenomenon in which the amorphous semiconductor layer scatter due to laser light irradiation (such a phenomenon is referred to as ablation), the amorphous semiconductor layer is heated at 500° C. for one hour in a nitrogen atmosphere so that the concentration of hydrogen contained in the amorphous semiconductor layer is $1 \times 10^{20}$ atoms/cm$^3$ or lower before the amorphous semiconductor layer is irradiated with laser light.

For example, in the case where a polycrystalline semiconductor layer is formed by laser crystallization, heat treatment at 550° C. for four hours is performed on the semiconductor layer 502 before the laser crystallization in order to improve resistance of the semiconductor layer 502 to laser. A crystal with a large grain size can be obtained by irradiation with laser light having one of the second, third, and fourth harmonics of a fundamental wave by using a continuous-wave solid-state laser. Typically, for example, the second (532 nm) harmonic or the third (355 nm) harmonic of an Nd:YVO$_4$ laser (having a fundamental wave of 1064 nm) is preferably used. Specifically, the laser light emitted from the continuous wave YVO$_4$ laser is converted into the harmonic by a non-linear optical element so that laser light having an output of 10 W is obtained. The laser light is preferably shaped into a rectangular or elliptical shape on an irradiated surface by an optical system and is emitted to the semiconductor layer 502. The power density in that case needs to be approximately 0.01 to 100 MW/cm$^2$ (preferably 0.1 to 10 MW/cm$^2$). The scan rate is set to approximately 10 to 200 cm/sec for the irradiation.

As a continuous-wave gas laser, an Ar laser, a Kr laser, or the like can be used. As a continuous-wave solid-state laser, a YAG laser, a YVO$_4$ laser, a YLF laser, a YAlO$_3$ laser, a forsterite (Mg$_2$SiO$_4$) laser, a GdVO$_4$ laser, a Y$_2$O$_3$ laser, a glass laser, a ruby laser, an alexandrite laser, a Ti:sapphire laser, or the like can be used.

Alternatively, laser crystallization may be performed using pulsed laser light having a pulse repetition rate of 10 MHz or higher. The repetition rate of the pulsed laser light is much higher than the frequency band of several tens of hertz to several hundreds of hertz, which is usually used. It is said that the time between irradiation with pulsed laser light and complete solidification of the semiconductor layer 502 is several ten to several hundred nanoseconds. Thus, when the pulsed laser light has the above repetition rate, the semiconductor layer 502 can be irradiated with laser light of the next pulse before the semiconductor layer 502 melted by preceding laser light is solidified. Therefore, since a solid-liquid interface can be continuously moved in the semiconductor layer 502, the semiconductor layer 502 having crystal grains grown continuously in a scan direction is formed. Specifically, an aggregate of crystal grains having widths of approximately 10 to 30 μm in the scan direction and widths of approximately 1 to 5 μm in a direction perpendicular to the scan direction can be formed. By formation of such crystal grains of single crystal that are grown continuously in the scan direction, the semiconductor layer 502 having few grain boundaries at least in a channel direction of a TFT can be formed.

As a pulsed laser, an Ar laser, a Kr laser, an excimer laser, a CO$_2$ laser, a YAG laser, a Y$_2$O$_3$ laser, a YVO$_4$ laser, a YLF laser, a YAlO$_3$ laser, a glass laser, a ruby laser, an alexandrite laser, a Ti:sapphire laser, a copper vapor laser, or a gold vapor laser can be used, for example.

Note that the laser crystallization can be performed by irradiation with a fundamental wave of continuous-wave laser light and a harmonic of the continuous-wave laser light in parallel. Alternatively, the laser crystallization may be performed by irradiation with a fundamental wave of continuous-wave laser light and a harmonic of pulsed laser light in parallel.

Note that laser irradiation may be performed in an inert gas atmosphere such as a rare gas or a nitrogen gas. Thus, the increase in roughness of a semiconductor surface due to laser light irradiation can be suppressed, and variation in threshold voltage due to variation in interface state density can be suppressed.

In the case of using thermal crystallization using a catalytic element which promotes crystallization, a method for introducing the catalytic element into the amorphous semiconductor layer is not particularly limited to a certain method as long as the catalytic element can be introduced onto a surface of or inside the amorphous semiconductor layer. For example, sputtering, CVD, plasma treatment (also including plasma-enhanced CVD), an adsorption method, or a method of applying a solution of a metal salt can be used. Among them, the method of using a solution is easy and can easily adjust the concentration of the catalytic element. Further, it is preferable that an oxide film be formed by UV light irradiation in an oxygen atmosphere, thermal oxidation, treatment with ozone water or hydrogen peroxide containing a hydroxyl radical, or the like, in order to improve the wettability of the surface of the amorphous semiconductor layer and to spread the aqueous solution over the entire surface of the amorphous semiconductor layer.

After the catalytic element is introduced into the amorphous semiconductor layer, the polycrystalline semiconductor layer can be formed by heat treatment (at 550 to 750° C. for 3 minutes to 24 hours). As the catalytic element which promotes the crystallization, one or more kinds of elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

After the crystallization, the catalytic element which promotes the crystallization is removed from the polycrystalline semiconductor layer, and a semiconductor layer which contains an impurity element is formed so as to be in contact with the polycrystalline semiconductor layer in order to lower the concentration of the catalytic element. The semiconductor layer which contains the impurity element serves as a gettering sink. As the impurity element, an impurity element which imparts n-type conductivity, an impurity element which imparts p-type conductivity, or a rare gas element can be used. For example, one or more kinds of elements selected from phosphorus (P), nitrogen (N), arsenic (As), antimony (Sb), bismuth (Bi), boron (B), helium (He), neon (Ne), argon (Ar), krypton (Kr), and xenon (Xe) can be used. Then, a semiconductor layer containing a rare gas element is formed so as to be in contact with the polycrystalline semiconductor layer containing the catalytic element which promotes the crystallization, and heat treatment (at 550 to 750° C. for 3 minutes to 24 hours) is performed. With the treatment, the catalytic element which is contained in the polycrystalline semiconductor layer and promotes the crystallization is moved into the semiconductor layer containing the rare gas element, so that the concentration of the catalytic element which promotes the crystallization in the polycrystalline semiconductor layer is lowered. After that, the semiconductor layer containing the rare gas element that serves as the gettering sink is removed.

Here, the semiconductor layer 502 is formed using polycrystalline silicon by a combination of crystallization using a catalytic element and laser crystallization. A specific method for manufacturing the semiconductor layer 502 is described below.

Here, first, a 50-nm-thick amorphous silicon film is formed over the insulating layer 501. Then, a nickel acetate solution containing 10 ppm by weight of nickel is applied to the amorphous silicon film by a spinner. Note that a method by which a nickel element is dispersed over the entire surface by sputtering may be used instead of a method by which the catalytic element is added using the solution. Next, after heat treatment (at 500° C. for one hour), heat treatment for crystallization (at 550° C. for four hours) is performed, so that the amorphous silicon film is crystallized.

Next, the oxide film formed on the surface of the semiconductor layer 502 containing polycrystalline silicon is removed with dilute hydrofluoric acid. After that, irradiation with laser light (XeCl: a wavelength of 308 nm) for increasing the degree of crystallization and reducing defects left in crystal grains is performed in the atmosphere or an oxygen atmosphere.

Excimer laser light having a wavelength of 400 nm or less, or the second harmonic or the third harmonic of a YAG laser is used for the laser light. Here, pulsed laser light having a repetition rate of approximately 10 to 1000 Hz is used. The laser light is condensed to 100 to 500 mJ/cm$^2$ by an optical system, and irradiation is performed with an overlap rate of 90 to 95%, thereby scanning the surface of the silicon film. In this embodiment, irradiation with laser light having a repetition rate of 30 Hz and an energy density of 470 mJ/cm$^2$ is performed in the air.

Note that since the laser light irradiation is performed in the air or an oxygen atmosphere, an oxide film is formed on the surface by the laser light irradiation. Note that although an example where the pulsed laser is used is illustrated in this embodiment, a continuous wave laser may be used. In order to obtain a crystal with a large grain size at the time of crystallization of the semiconductor layer, it is preferable to use a continuous-wave solid-state laser and any of the second to fourth harmonics of a fundamental wave. Typically, the second harmonic (532 nm) or the third harmonic (355 nm) of an Nd:YVO$_4$ laser (a fundamental wave of 1064 nm) may be used.

In the case where a continuous wave laser is used, laser light emitted from the continuous wave YVO$_4$ laser having an output of 10 W is converted into harmonics by a non-linear optical element. Alternatively, the harmonics are obtained by putting a YVO$_4$ crystal and a non-linear optical element in a resonator. Then, the laser light is preferably shaped by an optical system so that the laser light has a rectangular shape or an elliptical shape on an irradiated face, and an object is irradiated with this laser light. The power density in that case needs to be approximately 0.01 to 100 MW/cm$^2$ (preferably 0.1 to 10 MW/cm$^2$). Then, irradiation with the laser light is performed while the semiconductor layer is moved relatively to the laser light at a rate of approximately 10 to 2000 cm/s.

Next, in addition to the oxide film formed by the laser light irradiation, a barrier layer formed using an oxide film having a thickness of 1 to 5 nm in total is formed on the surface of the polycrystalline semiconductor layer by processing of the surface of the polycrystalline semiconductor layer subjected to the laser crystallization with ozone water for 120 seconds. The barrier layer is formed in order to remove the catalytic element which is added for crystallization, such as nickel (Ni), from the polycrystalline semiconductor layer. Although the barrier layer is formed using ozone water here, the barrier layer may be formed by deposition of an oxide film having a thickness of approximately 1 to 10 nm by a method of oxidizing a surface of a semiconductor layer having a crystal structure by UV light irradiation in an oxygen atmosphere, a method of oxidizing a surface of a semiconductor layer having a crystal structure by oxygen plasma treatment, plasma-enhanced CVD, sputtering, evaporation, or the like. In addition, before the barrier layer is formed, the oxide film formed by the laser light irradiation may be removed.

Next, over the barrier layer, an amorphous silicon film containing an argon element that serves as a gettering site is formed to a thickness of 10 to 400 nm, for example, 100 nm here, by sputtering. Here, the amorphous silicon film containing an argon element is formed in an atmosphere containing argon with the use of a silicon target. In the case where the amorphous silicon film containing an argon element is formed by plasma-enhanced CVD, the amorphous silicon film containing an argon element is formed under the following deposition conditions: a monosilane/argon (SiH$_4$:Ar) flow ratio of 1:99; a deposition pressure of 6.665 Pa; an RF power density of 0.087 W/cm$^2$; and a deposition temperature of 350° C.

After that, a furnace heated to 650° C. is used for heat treatment for three minutes so that the catalytic element is removed (gettering). Accordingly, the concentration of the catalytic element in the semiconductor layer 502 having a crystal structure is lowered. A lamp annealing apparatus may be used instead of the furnace.

Next, after the amorphous silicon film containing an argon element that is the gettering site is selectively removed using the barrier layer as an etching stopper, the barrier layer is selectively removed with dilute hydrofluoric acid. Note that since nickel tends to move to a region with a high concentration of oxygen in gettering, the barrier layer formed using an oxide film is preferably removed after the gettering.

When the semiconductor layer is crystallized in the absence of a catalytic element, the above steps including the formation of a barrier layer, the formation of a gettering site, heat treatment for gettering, removal of the gettering site, removal of the barrier layer, and the like are not necessary.

After the semiconductor layer 502 is formed as described above, channel doping by which an impurity element which imparts p-type conductivity or an impurity element which imparts n-type conductivity is added at a low concentration is performed on the semiconductor layer 502. The channel doping may be performed on the whole semiconductor layer 502 or may be selectively performed on part of the semiconductor layer 502. As the impurity element which imparts p-type conductivity, boron (B), aluminum (Al), gallium (Ga), or the like can be used. As the impurity element which imparts n-type conductivity, phosphorus (P), arsenic (As), or the like can be used. Here, boron (B) is used as the impurity element and is added so as to be contained at a concentration of $1\times10^{16}$ to $5\times10^{17}$/cm$^3$.

Figure 17B:

Next, the semiconductor layer 502 is processed (patterned) to have a desired shape by etching, so that semiconductor layers 503 and 504 which are separated into island shapes are formed as illustrated in FIG. 17B. Note that the channel doping may be performed not on the semiconductor layer 502 but on the processed semiconductor layers 503 and 504.

Figure 17C:
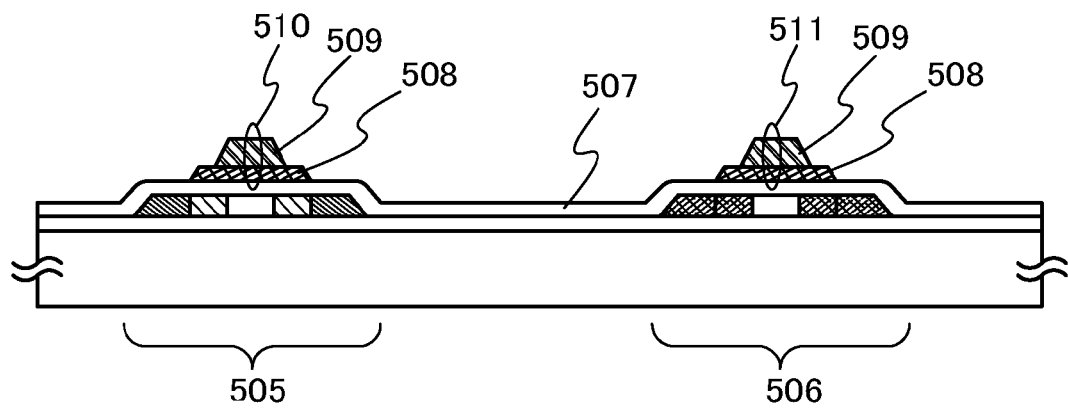

Then, as illustrated in FIG. 17C, transistors 505 and 506 are formed using the semiconductor layers 503 and 504. Specifically, a gate insulating layer 507 is formed so as to cover the semiconductor layers 503 and 504. Then, over the gate insulating layer 507, conductive films 508 and 509 which are processed (patterned) to have desired shapes are formed. The conductive films 508 and 509 are sequentially stacked over the gate insulating layer 507. The conductive films 508 and 509 which overlap with the semiconductor layer 503 function as a gate layer 510 of the transistor 505. The conductive films 508 and 509 which overlap with the semiconductor layer 504 function as a gate layer 511 of the transistor 506.

Then, impurities which impart n-type or p-type conductivity are added to the semiconductor layers 503 and 504 with the use of the conductive film 508, the conductive film 509, or a resist which is deposited and patterned, as a mask, so that impurity regions which function as a source region, a drain region, and LDD regions, and the like are formed. Note that although FIG. 17C illustrates the case where the transistor 505 is an n-channel transistor and the transistor 506 is a p-channel transistor, the transistor 505 may be a p-channel transistor and the transistor 506 may be an n-channel transistor, the transistors 505 and 506 may be n-channel transistors, or the transistors 505 and 506 may be p-channel transistors.

Note that the gate insulating layer 507 can be formed using a single layer of silicon oxide film, a silicon nitride film, a silicon oxynitride film, or a silicon nitride oxide film or a stack of any of a silicon oxide film, a silicon nitride film, a silicon oxynitride film, and a silicon nitride oxide film, for example. In the case where the gate insulating layer 507 is formed using a stack, it is preferable to use a three-layer structure in which a silicon oxide film, a silicon nitride film, and a silicon oxide film are sequentially stacked from the substrate 500 side, for example. Further, the gate insulating layer 507 can be formed by plasma-enhanced CVD, low-pressure CVD, sputtering, or the like. For example, in the case where the gate insulating layer 507 including silicon oxide is formed by plasma-enhanced CVD, the gate insulating layer 507 is formed under the following conditions: a gas in which tetraethyl orthosilicate (TEOS) and $O_2$ are mixed; a reaction pressure of 40 Pa; a substrate temperature of 300 to 400° C.; and a high-frequency (13.56 MHz) power density of 0.5 to 0.8 $W/cm^2$.

The gate insulating layer 507 may be formed by oxidation or nitriding of surfaces of the semiconductor layers 503 and 504 by high-density plasma treatment. The high-density plasma treatment is performed using, for example, a mixed gas of a rare gas such as He, Ar, Kr, or Xe and oxygen, nitrogen oxide, ammonia, nitrogen, hydrogen, or the like. In that case, when plasma is excited by introduction of microwaves, plasma with a low electron temperature and high density can be generated. By oxidation or nitriding of the surfaces of the semiconductor layers 503 and 504 with oxygen radicals (including OH radicals in some cases) or nitrogen radicals (including NH radicals in some cases) generated by such high-density plasma, an insulating film having a thickness of 1 to 20 nm, typically 5 to 10 nm is formed so as to be in contact with the semiconductor layers 503 and 504. The insulating film having a thickness of 5 to 10 nm may be used as the gate insulating layer 507.

The oxidation or nitriding of the semiconductor layers by the high-density plasma treatment proceeds by solid-phase reaction. Therefore, interface state density between the gate insulating film and the semiconductor layers can be made extremely low. Further, by direct oxidation or nitriding of the semiconductor layers by high-density plasma treatment, variations in the thickness of the insulating film to be formed can be suppressed. Further, in the case where the semiconductor layers have crystallinity, by oxidation of the surfaces of the semiconductor layers by solid-phase reaction by high-density plasma treatment, crystal grain boundaries can be prevented from being locally oxidized at fast speed. Thus, a uniform gate insulating film with low interface state density can be formed. Variations in the characteristics of a transistor can be suppressed when the gate insulating film partly or entirely includes an insulating film formed by high-density plasma treatment.

Alternatively, aluminum nitride can be used for the gate insulating layer 507. Aluminum nitride has comparatively high thermal conductivity and can efficiently diffuse heat generated in a transistor. Alternatively, after silicon oxide, silicon oxynitride, or the like which does not contain aluminum is formed, aluminum nitride may be stacked thereon to be used for the gate insulating layer 507.

Here, the 30-nm-thick gate insulating layer 507 containing silicon oxynitride is formed using nitrous oxide ($N_2O$) and silane ($SiH_4$) at a pressure of 10 to 30 Pa and a microwave (2.45 GHz) power of 3 to 5 kW by vapor deposition. By a combination of solid phase reaction and reaction due to vapor deposition, the gate insulating layer 507 having low interface state density and high withstand voltage can be formed.

Alternatively, for the gate insulating layer 507, a high dielectric constant material such as zirconium dioxide, hafnium oxide, titanium dioxide, or tantalum pentoxide may be used. With the use of a high dielectric constant material for the gate insulating layer 507, gate leakage current can be reduced.

Although the gate layers 510 and 511 are formed using the two conductive films 508 and 509 which are stacked in this embodiment, the present invention is not limited to this structure. Instead of the conductive films 508 and 509, the gate layers 510 and 511 may be formed using a single-layer conductive film, or may be formed using three or more conductive films which are stacked. In the case of a three-layer structure in which three or more conductive films are stacked, a layered structure of a molybdenum film, an aluminum film, and a molybdenum film is preferably used.

For the conductive film used for the gate layers 510 and 511, tantalum (Ta), tungsten (W), titanium (Ti), molybdenum (Mo), aluminum (Al), copper (Cu), chromium (Cr), niobium (Nb), neodymium (Nd), cobalt (Co), zirconium (Zr), zinc (Zn), ruthenium (Ru), rhodium (Rh), palladium (Pd), osmium (Os), iridium (Ir), platinum (Pt), gold (Au), silver (Ag), or the like can be used. Alternatively, either an alloy containing the metal as its main component or a compound containing the metal may be used. Alternatively, the conductive film may be formed using a semiconductor such as polycrystalline silicon that is doped with an impurity element which imparts conductivity, such as phosphorus, to a semiconductor layer.

Alternatively, for the conductive film used for the gate layers 510 and 511, a conductive material having light transmitting properties with respect to visible light can be used. As a light-transmitting conductive material, indium tin oxide (ITO), indium tin oxide containing silicon oxide (ITSO), zinc oxide, or the like can be used. Alternatively, for the conductive film used for the gate layers 510 and 511, indium zinc oxide (IZO) containing zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

Here, tantalum nitride or tantalum (Ta) is used for the first conductive film 508 and tungsten (W) is used for the second conductive film 509. As well as the example illustrated in this embodiment, any of the following combination of the two conductive films can be used: tungsten nitride and tungsten; molybdenum nitride and molybdenum; aluminum and tantalum; aluminum and titanium; and the like. Since tungsten and tantalum nitride have high heat resistance, heat treatment for thermal activation can be performed in a step performed after the two conductive films are formed. Alternatively, as the combination of the two conductive films, for example, nickel silicide and silicon doped with an impurity which imparts n-type conductivity, WSix and silicon doped with an impurity which imparts n-type conductivity, or the like can be used.

The conductive films 508 and 509 can be formed by CVD, sputtering, or the like. In the case where the gate layers 510 and 511 are formed using the two conductive films, the first conductive film 508 is formed to a thickness of 20 to 100 nm, and the second conductive film 509 is formed to a thickness of 100 to 400 nm. Here, the first conductive film 508 containing tantalum nitride or tantalum (Ta) is formed to a thickness of 30 nm, and the second conductive film 509 containing tungsten (W) is formed to a thickness of 170 nm.

Note that as a mask used for forming the gate layers 510 and 511, silicon oxide, silicon oxynitride, or the like may be used instead of a resist. In that case, a step of forming the mask of silicon oxide, silicon oxynitride, or the like by patterning is additionally needed; however, the thickness of the mask is less reduced at the time of etching as compared to the resist, so that the gate layers 510 and 511 with desired shapes can be formed. Alternatively, the gate layers 510 and 511 may be selectively formed by a droplet discharge method without the use of a mask. Note that a droplet discharge method is a method for forming a predetermined pattern by discharge or ejection of a droplet containing a predetermined composition from an orifice, and includes an inkjet method in its category.

Note that when the gate layers 510 and 511 are formed, an optimal etching method and an optimal etchant are selected as appropriate in accordance with the material of the conductive films. An example of an etching method when tantalum nitride is used for the first conductive film 508 and tungsten is used for the second conductive film 509 is specifically described below.

First, after a tantalum nitride film is formed, a tungsten film is formed over the tantalum nitride film. Then, a mask is formed over the tungsten film and first etching is performed. In the first etching, etching is performed under a first etching condition, and then, under a second etching condition. In the first etching condition, etching is performed as follows: inductively coupled plasma (ICP) etching is used; $CF_4$, $Cl_2$, and $O_2$ are used for an etching gas with a flow ratio of 25:25:10 (sccm); and an RF (13.56 MHz) power of 500 W is applied to a coiled electrode at a pressure of 1 Pa so that plasma is generated. Then, an RF (13.56 MHz) power of 150 W is applied to the substrate side (sample stage) so that negative self-bias voltage is substantially applied. Under this first etching condition, it is possible to etch the tungsten film so that end portions thereof are tapered.

Next, etching is performed under the second etching condition. In the second etching conduction, etching is performed for approximately 30 seconds as follows: $CF_4$ and $Cl_2$ are used for an etching gas with a flow ratio of 30:30 (sccm); and an RF (13.56 MHz) power of 500 W is applied to a coiled electrode at a pressure of 1 Pa so that plasma is generated. An RF (13.56 MHz) power of 20 W is applied to the substrate side (sample stage) so that negative self-bias voltage is substantially applied. In the second etching condition where $CF_4$ and $Cl_2$ are mixed with each other, the tungsten film and the tantalum nitride film are etched to the same or substantially the same degree.

In the first etching, when the mask is formed to have a suitable shape, the end portions of the tantalum nitride film and the tungsten film are tapered with an angle of approximately 15 to 45° due to the effect of the bias voltage applied to the substrate side. Note that in the gate insulating layer 507, a portion which is exposed by the first etching is slightly etched to be thinner than other portions which are covered with the tantalum nitride film and the tungsten film depending on the etching condition.

Next, second etching is performed without removal of the mask. In the second etching, the tungsten film is selectively etched using $CF_4$, $Cl_2$, and $O_2$ for an etching gas. In that case, the tungsten film is preferentially etched by the second etching; however, the tantalum nitride film is hardly etched.

Through the first etching and the second etching, the conductive film 508 including tantalum nitride and the conductive film 509 including tungsten that has smaller width than the conductive film 508 can be formed.

Next, impurities which impart one conductivity type are introduced into the semiconductor layers 503 and 504 so that impurity regions of the transistors 505 and 506 are formed. Here, the transistor 505 is an n-channel transistor, and the transistor 506 is a p-channel transistor. Thus, an impurity which imparts n-type conductivity, for example, phosphorus (P), arsenic (As), or the like is introduced into the semiconductor layer 503. Further, an impurity which imparts p-type conductivity, for example, boron (B) is introduced into the semiconductor layer 504.

When the conductive films 508 and 509 which are formed through the first etching and the second etching as masks, the impurity regions which function as the source region, the drain region, and the LDD regions can be separately formed in the semiconductor layer 503 and the semiconductor layer 504, without formation of an additional mask.

Through the series of steps, the transistors 505 and 506 can be formed. Note that the method for manufacturing the transistors is not limited to the above process.

Note that although a single-gate transistor is illustrated in this embodiment, a multi-gate transistor such as a double-gate transistor may be used.

Alternatively, a transistor or the like formed by an inkjet method or a printing method can be used. Thus, a transistor can be formed at room temperature, or can be formed using a large substrate. In addition, since the transistor can be formed without a mask (a reticle), the layout of the transistor can be easily changed. Further, since it is not necessary to use a resist, material cost is reduced and the number of steps can be reduced. Furthermore, since a film is formed only in a portion where the film is needed, a material is not wasted compared to a manufacturing method in which etching is performed after a film is formed over the entire surface, so that cost can be reduced.

Figure 17D:
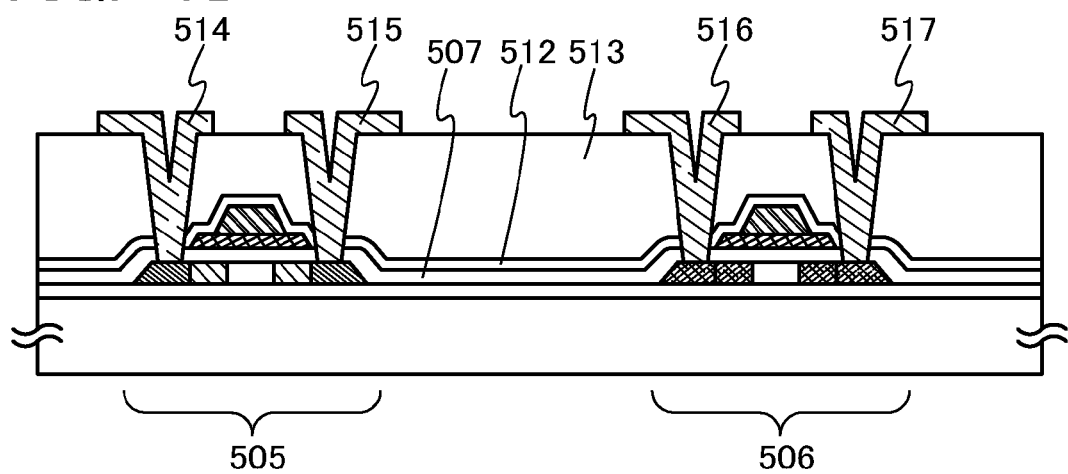

Then, as illustrated in FIG. 17D, an insulating film 512 is formed so as to cover the transistors 505 and 506. The insulating film 512 is not necessarily provided; however, by provision of the insulating film 512, an impurity such as alkali metal or alkaline earth metal can be prevented from entering the transistors 505 and 506. Specifically, it is preferable to use silicon nitride, silicon nitride oxide, silicon oxynitride, aluminum nitride, aluminum oxide, silicon oxide, or the like for the insulating film 512. Here, a silicon oxynitride film having a thickness of approximately 30 nm is formed by CVD and is used as the insulating film 512.

After the insulating film 512 is formed, the impurity regions may be activated by heat treatment. For example, heat treatment may be performed at 480° C. for one hour in a nitrogen atmosphere. For the heat treatment, a thermal annealing method using an annealing furnace, a laser annealing method, a rapid thermal annealing method (an RTA method), or the like can be used.

Next, an insulating film 513 is formed over the insulating film 512. An organic material having heat resistance, such as an acrylic resin, a polyimide, a benzocyclobutene-based resin, a polyamide, or an epoxy resin can be used for the insulating film 513. As well as such an organic material, a low-dielectric constant material (a low-k material), a siloxane-based resin, silicon oxide, silicon nitride, silicon oxynitride, silicon nitride oxide, phosphosilicate glass (PSG), borophosphosilicate glass (BPSG), alumina, or the like can be used. A siloxane-based resin is a material in which a skeleton structure is formed by the bond of silicon (Si) and oxygen (O). As well as hydrogen, at least one of a fluoro group and an organic group (e.g., an alkyl group or aromatic hydrocarbon) may be used as a substituent. Note that the insulating film 513 may be formed using a stack of a plurality of insulating films formed using any of these materials.

There is no particular limitation on the method for forming the insulating film 513. The insulating film 513 can be formed, depending on the material, by a method such as CVD, sputtering, SOG, spin coating, dipping, spray coating, a droplet discharge method (e.g., an inkjet method), a screen printing method, or an offset printing method.

Here, a 100-nm-thick silicon nitride oxide film containing hydrogen that is formed by CVD and a 900-nm-thick silicon oxynitride film formed by CVD are stacked and used as the insulating film 513.

Note that although the insulating films 512 and 513 serve as interlayer insulating films in this embodiment, a single-layer insulating film may be used as the interlayer insulating film, or an insulating film having two stacked layers or an insulating film having four or more stacked layers may be used as the interlayer insulating film.

Next, heat treatment is preferably performed at 300 to 550° C. for 1 to 12 hours. Here, heat treatment is performed at 410° C. for one hour in a nitrogen atmosphere. Through the heat treatment, dangling bonds in the semiconductor layers 503 and 504 can be terminated with hydrogen contained in the insulating film 513. For the heat treatment, thermal annealing using an annealing furnace, laser annealing, rapid thermal annealing (RTA), or the like can be used. Through the heat treatment, not only hydrogenation but also activation of impurity elements added to the semiconductor layers 503 and 504 can be performed. As a different method for performing hydrogenation for terminating the dangling bonds, plasma hydrogenation (using hydrogen excited by plasma) may be performed.

Next, contact holes are formed in the gate insulating layer 507, the insulating film 512, and the insulating film 513 so that the semiconductor layers 503 and 504 are partly exposed. Then, conductive films 514 and 515 which are in contact with the semiconductor layer 503 through the contact holes and conductive films 516 and 517 which are in contact with the semiconductor layer 504 through the contact holes are formed.

The conductive films 514 to 517 can be formed by CVD, sputtering, or the like. Specifically, for the conductive films 514 to 517, tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon (Si), or the like can be used. Alternatively, either an alloy containing the metal as its main component or a compound containing the metal may be used. For the conductive films 514 to 517, a single-layer film including the metal or a plurality of stacked films including the metal can be used.

<Second Example of Method for Manufacturing Transistor>

Next, an example of a method for manufacturing a transistor including a single crystalline semiconductor in a channel formation region is described. Note that here, an example of a transistor formed using an SOI substrate is described.

An SOI substrate can be manufactured using, for example, UNIBOND (registered trademark) typified by Smart Cut (registered trademark), epitaxial layer transfer (ELTRAN) (registered trademark), a dielectric separation method, plasma assisted chemical etching (PACE), or the like. In a transistor formed using an SOI substrate, a semiconductor film is formed over an insulating layer; thus, parasitic capacitance is reduced and generation of leakage current flowing through the substrate can be suppressed. Therefore, the transistor formed using an SOI substrate can be expected to have higher operation speed and lower power consumption of a circuit as compared to a bulk transistor. In addition, a semiconductor film used as an active layer can be formed to a small thickness. Thus, a short channel effect can be suppressed, so that an element can be miniaturized and higher integration of the circuit can be realized. An SOI substrate in which a glass substrate is used has advantages that it can be manufactured at lower cost than an SOI substrate in which a semiconductor substrate is used and that a liquid crystal display device can be easily made large.

Figure 20A:
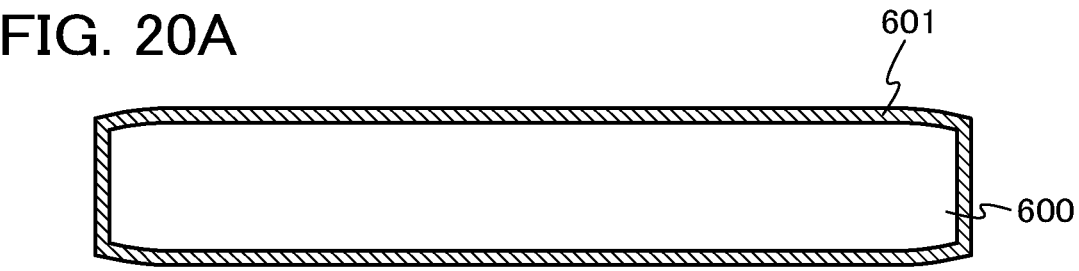
FIGS. 20A to 20D are cross-sectional views illustrating a specific example of a method for manufacturing a transistor with the use of an SOI substrate.

First, as illustrated in FIG. 20A, after a bond substrate 600 is cleaned, an insulating layer 601 is formed over the bond substrate 600.

A single crystal semiconductor substrate formed using silicon, germanium, or the like can be used as the bond substrate 600. Alternatively, a semiconductor substrate formed using silicon having crystal lattice distortion, silicon germanium in which germanium is added to silicon, or the like may be used as the bond substrate 600.

Note that in a single crystal semiconductor substrate used as the bond substrate 600, the directions of crystal axes are preferably uniform; however, the substrate is not necessarily formed using perfect crystals in which a lattice defect such as a point defect, a line defect, or a plane defect is completely eliminated.

In addition, the shape of the bond substrate 600 is not limited to a circle, and the substrate can be processed to have a shape other than a circle. For example, in consideration of the facts that the shape of a base substrate 603 to which the bond substrate 600 is attached later is generally a rectangle and that an exposure region of an exposure apparatus such as a reduced projection exposure apparatus is rectangular, the bond substrate 600 may be processed to have a rectangular shape. The bond substrate 600 can be processed by cutting of a circular single crystal semiconductor substrate that is commercially available.

The insulating layer 601 may be formed using a single insulating film or a stack of a plurality of insulating films. Considering that a region which includes impurities is to be removed later, it is preferable to form the insulating layer 601 to a thickness of 15 to 500 nm.

An insulating film containing silicon or germanium as its component, such as a silicon oxide film, a silicon nitride film, a silicon oxynitride film, a silicon nitride oxide film, a germanium oxide film, a germanium nitride film, a germanium oxynitride film, or a germanium nitride oxide film can be used as a film included in the insulating layer 601. Alternatively, an insulating film containing a metal oxide, such as an aluminum oxide film, a tantalum oxide film, or a hafnium oxide film; an insulating film containing a metal nitride, such as an aluminum nitride film; an insulating film containing a metal oxynitride, such as an aluminum oxynitride film; or an insulating film containing a metal nitride oxide, such as an aluminum nitride oxide film, can be used.

For example, here, an example in which silicon oxide formed by thermal oxidation of the bond substrate 600 is used as the insulating layer 601 is described. Note that in FIG. 20A, the insulating layer 601 is formed so as to cover the entire surface of the bond substrate 600; however, the insulating layer 601 may be formed on at least one surface of the bond substrate 600.

Note that in this specification, an oxynitride is a substance which includes more oxygen than nitrogen, and a nitride oxide is a substance which includes more nitrogen than oxygen.

In the case where the insulating layer 601 is formed by thermal oxidation of the surface of the bond substrate 600, dry oxidation in which oxygen having a small amount of moisture is used, thermal oxidation in which a gas including a halogen such as hydrogen chloride is added to an oxygen atmosphere, or the like can be used as the thermal oxidation. In addition, wet oxidation such as pyrogenic oxidation in which hydrogen is burnt with oxygen so that water is generated, or water vapor oxidation in which oxidation is performed with water vapor obtained by heat treatment of high-purity water at 100° C. or higher may be used for forming the insulating layer 601.

In the case where the base substrate 603 includes an impurity which decreases the reliability of a liquid crystal display device, such as alkali metal or alkaline earth metal, the insulating layer 601 preferably includes at least one barrier layer that can prevent such an impurity from diffusing from the base substrate 603 into a semiconductor film which is to be formed after separation. For an insulating layer which can be used as the barrier layer, a silicon nitride film, a silicon nitride oxide film, an aluminum nitride film, an aluminum nitride oxide film, or the like can be used. The insulating layer which is used as the barrier layer is preferably formed to a thickness of 15 to 300 nm, for example. Such a barrier layer has a high blocking effect of preventing impurity diffusion; however, internal stress is high. Therefore, as a lower layer of the insulating layer that is in contact with the bond substrate 600, a film with an effect of relieving the stress of an upper layer of the insulating layer is preferably selected. For the insulating layer with the effect of relieving the stress of the upper layer of the insulating layer, a silicon oxide film such as a thermally oxidized film obtained by thermal oxidation of the bond substrate 600, or the like can be used. The lower layer of the insulating layer can be formed to a thickness of 5 to 200 nm.

In the case where silicon oxide is used for the insulating layer 601, a method for forming silicon oxide is not limited to thermal oxidation. For example, silicon oxide can be formed using a mixed gas of silane and oxygen, tetraethoxysilane (TEOS) and oxygen, or the like by vapor deposition such as thermal CVD, plasma-enhanced CVD, atmospheric pressure CVD, or bias ECRCVD. In that case, a surface of the insulating layer 601 may be densified by oxygen plasma treatment. Alternatively, in the case where silicon nitride is used for the insulating layer 601, the insulating layer 601 can be formed using a mixed gas of silane and ammonia by vapor deposition such as plasma-enhanced CVD. Alternatively, in the case where silicon nitride oxide is used for the insulating layer 601, the insulating layer 601 can be formed using a mixed gas of silane and ammonia or a mixed gas of silane and nitrogen oxide by vapor deposition such as plasma-enhanced CVD.

Alternatively, silicon oxide formed using an organosilane gas by chemical vapor deposition may be used for the insulating layer 701. A silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used as an organosilane gas.

With the use of an organosilane gas for a source gas, a silicon oxide film with a flat surface can be formed at a process temperature of 350° C. or lower. Alternatively, low temperature oxide (LTO) formed at a heating temperature of 200 to 500° C. by thermal CVD can be used. LTO can be formed using monosilane ($SiH_4$), disilane ($Si_2H_6$), or the like as a silicon source gas and using dinitrogen monoxide ($N_2O$) or the like as an oxygen source gas.

For example, in the case where the insulating layer 601 including a silicon oxide film is formed using TEOS and $O_2$ for the source gas, the conditions may be set as follows: the flow rate of TEOS is 15 sccm, the flow rate of $O_2$ is 750 sccm, the deposition pressure is 100 Pa, the deposition temperature is 300° C., the RF output is 300 W, and the power source frequency is 13.56 MHz.

Note that an insulating film formed at comparatively low temperature, such as a silicon oxide film formed using organosilane or a silicon nitride oxide film formed at low temperature, has a number of OH groups on its surface. In other words, the surface has a number of silanol groups. The silanol groups form hydrogen bonds with hydroxyl groups on a surface of the base substrate, which allows the insulating layer to be bonded to the base substrate at a low temperature. A siloxane bond, which is a covalent bond, is formed finally between the base substrate and the insulating layer. Thus, the insulating layer such as the silicon oxide film formed using organosilane or the LTO formed at comparatively low temperature is suitable for bonding at low temperature, as compared to a thermally oxidized film having no OH groups or having very few OH groups that is used in Smart Cut (registered trademark) or the like.

The insulating layer 601 forms a smooth hydrophilic bonding plane over the surface of the bond substrate 600. The average surface roughness $R_a$ of the insulating layer 601 is preferably 0.7 nm or less, more preferably 0.4 nm or less. In addition, the thickness of the insulating layer 601 can be 5 to 500 nm. The thickness of the insulating layer 601 is preferably 10 to 200 nm.

Figure 20B:
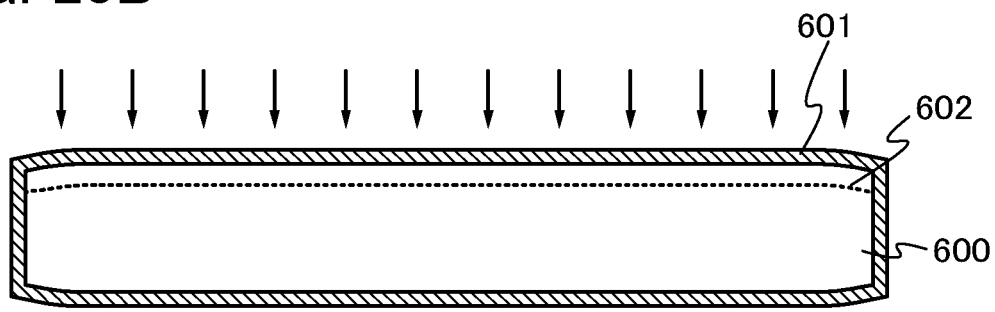

Next, as illustrated in FIG. 20B, the bond substrate 600 is irradiated with an ion beam including ions accelerated by an electric field through the insulating layer 601 as indicated by arrows, so that a fragile layer 602 having microvoids is formed in a region at a predetermined depth from the surface of the bond substrate 600. The fragile layer is a layer which is locally weakened by disorder of a crystal structure, and the state of the fragile layer depends on a means for forming the fragile layer. Note that a region from one surface of the bond substrate to the fragile layer might be weakened to some extent; however, the fragile layer in this specification indicates a region at which separation is to be performed later and its vicinity.

The depth at which the fragile layer 602 is formed can be adjusted by the acceleration energy of the ion beam and the incident angle of the ion beam. The acceleration energy can be adjusted by acceleration voltage or the like. The fragile layer 602 can be formed at the same or substantially the same depth as the average depth at which the ions enter. The thickness of a semiconductor layer 604 which is to be separated from the bond substrate 600 depends on the depth at which the ions are implanted. The depth at which the fragile layer 602 is formed can be 50 to 500 nm, for example. The depth at which the fragile layer 602 is formed is preferably 50 to 200 nm.

It is preferable that the ions be implanted into the bond substrate 600 by ion doping, in which mass separation is not performed because cycle time can be shortened; however, ion implantation, in which mass separation is performed, may be employed.

When hydrogen ($H_2$) is used for a source gas, $H^+$, $H_2^+$, and $H_3^+$ can be produced by excitation of a hydrogen gas. Proportions of ion species produced from the source gas can be changed by adjustment of a plasma excitation method, the pressure of an atmosphere for generating plasma, the supply of the source gas, or the like. In the case where ion implantation is performed by ion doping, it is preferable that $H_3^+$ occupy 50% or more, more preferably 80% or more of the total amount of $H^+$, $H_2^+$, and $H_3^+$ in the ion beam. When $H_3^+$ occupies 80% or more, the proportion of $H_2^+$ ions in the ion beam is lowered relatively, which results in smaller variations in the average depth at which hydrogen ions contained in the ion beam enter. Thus, the efficiency of the ion implantation is improved, so that the cycle time can be shortened.

$H_3^+$ has larger mass than $H^+$ and $H_2^+$. Thus, when the ion beam containing a higher proportion of $H_3^+$ is compared to the ion beam containing a higher proportion of $H^+$ and $H_2^+$, the former can implant hydrogen into a shallower region of the bond substrate 600 than the latter even if acceleration voltage at the time of doping is the same. Further, the former has a steep concentration distribution of hydrogen implanted into the bond substrate 600 in a thickness direction, so that the fragile layer 602 itself can be formed thinner.

In the case where ion implantation is performed using a hydrogen gas by ion doping, acceleration voltage is set to 10 to 200 kV and dosage is set to $1\times10^{16}$ to $6\times10^{16}$ ions/cm$^2$. Under these conditions, depending on the ion species included in the ion beam and its proportion, and the thickness of the insulating layer 601, the fragile layer 602 can be formed in a region at a depth of 50 to 500 nm of the bond substrate 600.

For example, in the case where the bond substrate 600 is a single crystal silicon substrate and the insulating layer 601 is formed using a 100-nm-thick thermal oxide film, a semiconductor film with a thickness of 146 nm can be separated from the bond substrate 600 under the conditions that the flow rate of 100% hydrogen gas, which is the source gas, is 50 sccm, the beam current density is 5 µA/cm$^2$, the acceleration voltage is 50 kV, and the dosage is $2.0\times10^{16}$ atoms/cm$^2$. Note that even when the conditions at the time of addition of hydrogen to the bond substrate 600 are not changed, the thickness of the semiconductor film can be made smaller when the thickness of the insulating layer 501 is made larger.

Helium (He) can be used for the source gas of the ion beam. Since most ion species produced by excitation of helium are $He^+$, $He^+$ can be mainly implanted into the bond substrate 600 even by ion doping, in which mass separation is not performed. Therefore, microvoids can be formed in the fragile layer 602 efficiently by ion doping. In the case where ion implantation is performed using helium by ion doping, acceleration voltage can be 10 to 200 kV and dosage can be $1\times10^{16}$ to $6\times10^{16}$ ions/cm$^2$.

A halogen gas such as a chlorine gas ($Cl_2$ gas) or a fluorine gas ($F_2$ gas) can be used as a source gas.

In the case where ion implantation is performed on the bond substrate 600 by ion doping, impurities existing in an ion doping apparatus are implanted together with ions; thus, impurities such as S, Ca, Fe, and Mo might exist on and near the surface of the insulating layer 601. Therefore, a region on and near the surface of the insulating layer 601 where the impurities are most plausibly distributed may be removed by etching, polishing, or the like. As dry etching, reactive ion etching (RIE), inductively coupled plasma (ICP) etching, electron cyclotron resonance (ECR) etching, parallel plate (capacitively coupled) etching, magnetron plasma etching, dual frequency plasma etching, helicon wave plasma etching, or the like can be used. For example, in the case where a region on and near a surface of a silicon nitride oxide film is removed by ICP etching, the region can be removed to a depth of about 50 nm from the surface under the conditions that the flow rate of $CHF_3$ as an etching gas is 7.5 sccm, the flow rate of He is 100 sccm, the reaction pressure is 5.5 Pa, the temperature of a lower electrode is 70° C., the RF (13.56 MHz) electric power applied to a coil-shaped electrode is 475 W, the electric power applied to the lower electrode (on bias side) is 300 W, and the etching time is about 10 seconds.

Instead of $CHF_3$, which is a fluorine-based gas, a chlorine-based gas such as $Cl_2$, $BCl_3$, $SiCl_4$, or $CCl_4$; another fluorine-based gas such as $CF_4$, $SF_6$, or $NF_3$; or $O_2$ can be used as appropriate for the etching gas. Further, an inert gas other than He may be added to the etching gas. For example, one or more elements selected from Ne, Ar, Kr, or Xe can be used as an inert element which is added to the etching gas. In the case where a region on and near a surface of a silicon nitride oxide film is removed by wet etching, an aqueous solution containing ammonium hydrogen fluoride, ammonium fluoride, or the like may be used as an etchant. Polishing can be performed by chemical mechanical polishing (CMP), liquid jet polishing, or the like.

After the formation of the fragile layer 602, an extremely contaminated region on and near the surface of the insulating layer 601 is removed by etching, polishing, or the like, so that the amount of impurities which enter the semiconductor layer 604 formed over the base substrate 603 can be reduced. Further, in a liquid crystal display device which is completed finally, it is possible to prevent the impurities from causing the decrease in reliability and the decrease in electrical characteristics of transistors, such as variations in threshold voltage or the increase in leakage current.

Figure 20C:
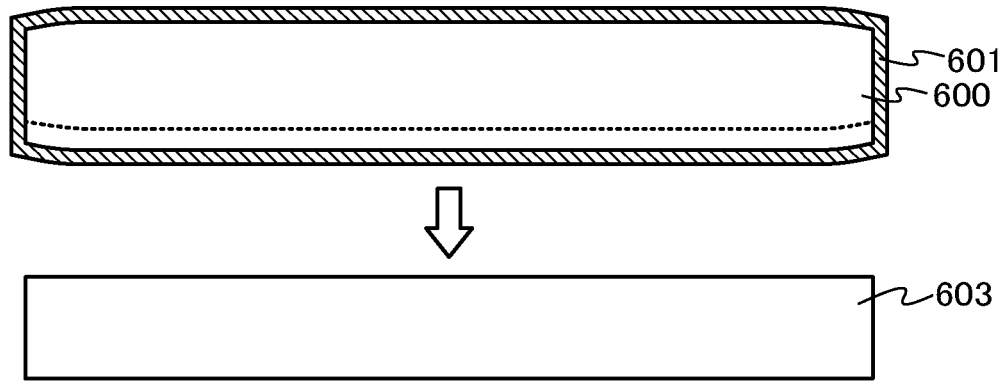
Figure 20D:
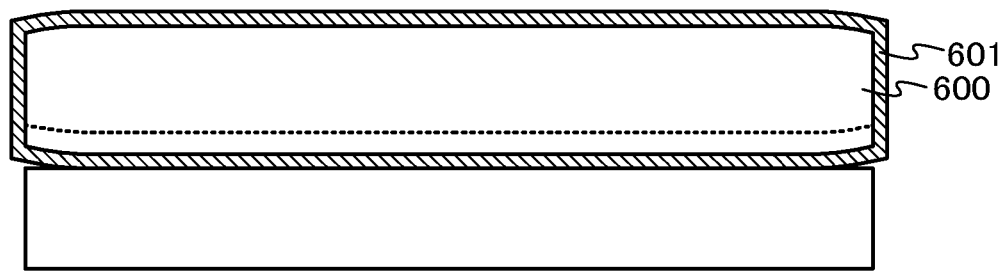

Next, as illustrated in FIGS. 20C and 20D, the bond substrate 600 and the base substrate 603 are attached to each other with the insulating layer 601 provided therebetween.

Note that before the base substrate 603 and the bond substrate 600 are attached to each other, surfaces for attachment, i.e., a surface of the insulating layer 601 formed over the bond substrate 600 and a surface of the base substrate 603 in this embodiment are preferably subjected to surface treatment for increasing bonding strength between the insulating layer 601 and the base substrate 603.

As the surface treatment, wet treatment, dry treatment, or a combination of wet treatment and dry treatment can be used. A combination of different wet treatments or different dry treatments may be used. Examples of the wet treatment include ozone treatment using ozone water (ozone water cleaning), ultrasonic cleaning such as megasonic cleaning, two-fluid cleaning (a method by which functional water such as pure water or water to which hydrogen is added and a carrier gas such as nitrogen are sprayed together), cleaning with hydrochloric acid and a hydrogen peroxide solution, and the like. Examples of the dry treatment include inert gas neutral atomic beam treatment, inert gas ion beam treatment, ultraviolet treatment, ozone treatment, plasma treatment, plasma treatment with bias application, radical treatment, and the like. By the surface treatment, the hydrophilicity and cleanliness of the surfaces for the attachment are increased. Accordingly, the bonding strength can be increased.

For the attaching, the base substrate 603 and the insulating layer 601 which is formed over the bond substrate 600 are located in contact with each other, and then, a pressure of approximately 1 to 500 N/cm$^2$, preferably, 11 to 20 N/cm$^2$ is applied to part of the base substrate 603 and part of the bond substrate 600 which are superposed on each other. When the pressure is applied, bonding between the base substrate 603 and the insulating layer 601 starts from the portion, which results in bonding of the entire surface where the base substrate 603 and the insulating layer 601 are in contact with each other.

The bonding is performed by van der Waals force and/or a hydrogen bond, so that the base substrate 603 and the insulating layer 601 are firmly bonded to each other even at room temperature. Note that since the bonding can be performed at low temperature, a variety of substrates can be used as the base substrate 603. For example, a variety of glass substrates used in the electronics industry, such as an aluminosilicate glass substrate, a barium borosilicate glass substrate, or an aluminoborosilicate glass substrate, a quartz substrate, a ceramic substrate, a sapphire substrate, or the like can be used as the base substrate 603. A substrate with a thermal expansion coefficient of $25 \times 10^{-7}$ to $50 \times 10^{-7}/°$ C. (preferably $30 \times 10^{-7}$ to $40 \times 10^{-7}/°$ C.) and a strain point of 580 to 680° C. (preferably 600 to 680° C.) is preferably used as a glass substrate which serves as the base substrate 603. When the glass substrate is an alkali-free glass substrate, impurity contamination of a liquid crystal display device can be suppressed.

A mother glass substrate developed for production of liquid crystal panels can be used as the glass substrate. As such a mother glass substrate, substrates having the following sizes are known: the 3rd generation (e.g., 550 mm×650 mm), the 3.5th generation (e.g., 600 mm×720 mm), the 4th generation (e.g., 680 mm×880 mm or 730 mm×920 mm), the 5th generation (e.g., 1100 mm×1300 mm), the 6th generation (e.g., 1500 mm×1800 mm), the 7th generation (e.g., 1900 mm×2200 mm), the 8th generation (e.g., 2160 mm×2460 mm), and the like. With the use of a large substrate like a mother glass substrate as the base substrate 603, an SOI substrate can have a larger area. The increase in the area of the SOI substrate allows a large liquid crystal display device to be manufactured.

If the base substrate 603 is a glass substrate that greatly shrinks when heat treatment is performed thereon, such as EAGLE 2000 (registered trademark) (manufactured by Corning Incorporated), defective attachment might be caused after the bonding step. Thus, in order to avoid such defective attachment that is caused by the shrink, the base substrate 603 may be subjected to heat treatment in advance before the bonding step.

Further, an insulating layer may be formed in advance over the base substrate 603. The base substrate 603 is not necessarily provided with an insulating layer on its surface; however, the formation of the insulating layer on the surface of the base substrate 603 can prevent an impurity such as an alkali metal or an alkaline earth metal from entering the bond substrate 600 from the base substrate 603. Furthermore, in the case where the insulating layer is formed on the surface of the base substrate 603, the insulating layer over the base substrate 603 is bonded to the insulating layer 601; thus, a wider variety of substrates can be used as the base substrate 603. In general, the upper temperature limits of substrates including flexible synthetic resins such as plastics tend to be low. However, as long as the substrates can withstand process temperatures in later steps of forming semiconductor elements, the substrates including such resins can be used as the base substrate 603 when the insulating layer is formed over the base substrate 603. Examples of plastic substrates include a polyester typified by poly(ethylene terephthalate) (PET), poly(ethylene naphthalate) (PEN), poly(butylene terephthalate) (PBT), and polyarylate (PAR, a polyethersulfone (PES), a polycarbonate (PC), a polyetheretherketone (PEEK), a polysulfone (PSF), a polyetherimide (PEI), a polyimide, an acrylonitrile-butadiene-styrene resin, poly(vinyl chloride), polypropylene, poly (vinyl acetate), an acrylic resin, and the like. In the case where the insulating layer is formed over the base substrate 603, the base substrate 603 and the bond substrate 600 are preferably attached to each other after surface treatment is performed on the surface of this insulating layer in a manner similar to the insulating layer 601.

After the bond substrate 600 is attached to the base substrate 603, heat treatment for increasing the bonding strength at the bonding interface between the base substrate 603 and the insulating layer 601 is preferably performed. This treatment is performed at a temperature at which the fragile layer 602 does not crack and can be performed at temperatures in the range of 200 to 400° C. Further, when the bond substrate 600 is attached to the base substrate 603 while being heated within this temperature range, the bonding strength between the base substrate 603 and the insulating layer 601 can be increased.

Note that if the bonding plane is contaminated by dust or the like at the time of the attachment of the bond substrate 600 and the base substrate 603 to each other, the contaminated portion is not bonded. In order to avoid the contamination of the bonding plane, the bond substrate 600 and the base substrate 603 are preferably attached to each other in an airtight chamber. Further, when the bond substrate 600 and the base substrate 603 are attached to each other, a treatment chamber may have pressure reduced to approximately $5.0 \times 10^{-3}$ Pa and the atmosphere of the bonding treatment may be cleaned.

Figure 21A:
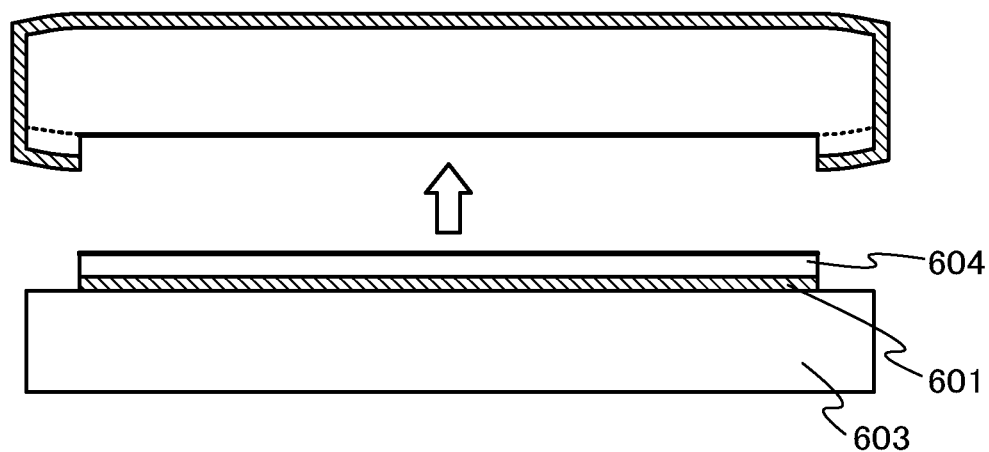
FIGS. 21A to 21D are cross-sectional views illustrating the specific example of the method for manufacturing a transistor with the use of an SOI substrate.

Next, heat treatment is carried out by which the volume of the microvoids is increased and, as a result, the microvoids adjacent to each other in the fragile layer 602 are combined with each other. Accordingly, as illustrated in FIG. 21A, the semiconductor layer 604 which is part of the bond substrate 600 is separated from the bond substrate 600 along the fragile layer 602. Since the insulating layer 601 and the base substrate 603 are bonded to each other, the semiconductor layer 604 which is separated from the bond substrate 600 is fixed to the base substrate 603. The heat treatment for separating the semiconductor layer 604 from the bond substrate 600 is preferably performed at a temperature which does not exceed the strain point of the base substrate 603.

For this heat treatment, a rapid thermal annealing (RTA) apparatus, a resistive heating furnace, or a microwave heating apparatus can be used. As an RTA apparatus, a gas rapid thermal annealing (GRTA) apparatus or a lamp rapid thermal annealing (LRTA) apparatus can be used. In the case where a GRTA apparatus is used, heating temperature can be 550 to 650° C. and processing time can be 0.5 to 60 minutes. In the case where a resistive heating apparatus is used, heating temperature can be 200 to 650° C. and processing time can be 2 to 4 hours.

The heat treatment may be performed by dielectric heating with a high-frequency wave such as a microwave. The heat treatment by the dielectric heating can be performed by irradiation of the bond substrate 600 with a high frequency wave with a frequency of 300 MHz to 3 THz that is generated by a high-frequency wave generation apparatus. Specifically, for example, irradiation with a microwave with a frequency of 2.45 GHz at 900 W is performed for 14 minutes to combine microvoids adjacent to each other in the fragile layer, whereby the bond substrate 600 can be separated along the fragile layer finally.

A specific treatment method of heat treatment using a vertical furnace having resistive heating is described. The base substrate 603 to which the bond substrate 600 is attached is disposed on a boat of the vertical furnace and this boat is delivered in a chamber of the vertical furnace. In order to suppress oxidation of the bond substrate 600, the chamber is first exhausted to have a vacuum state. The degree of vacuum is approximately $5\times10^{-3}$ Pa. After the vacuum state is obtained, nitrogen is supplied to the chamber so that the chamber has a nitrogen atmosphere under atmospheric pressure. In this period, the heating temperature is increased to 200° C.

After the chamber is set in a nitrogen atmosphere under atmospheric pressure, heating is performed at 200° C. for two hours. Then, the temperature is increased to 400° C. for one hour. After the state at a heating temperature of 400° C. is stabilized, heat treatment is performed at 600° C. for two hours. Then, the temperature is decreased to 400° C. in one hour, and after 10 to 30 minutes, the boat is carried out from the chamber. The base substrate 603 to which the bond substrate 600 and the semiconductor layer 604 are attached and which is disposed on the boat is cooled in an air atmosphere.

As the heat treatment using the resistive heating furnace, heat treatment for increasing the bonding strength between the insulating layer 601 and the base substrate 603 and heat treatment for separation along the fragile layer 602 are successively performed. In the case where these two heat treatments are performed with different apparatuses, for example, heat treatment is performed at 200° C. for two hours in a resistive heating furnace and then the base substrate 603 and the bond substrate 600 which are attached to each other are carried out from the furnace. Then, heat treatment is performed by an RTA apparatus at a processing temperature of 600 to 700° C. for one minute to several hours, so that the bond substrate 600 is separated along the fragile layer 602.

Note that a periphery of the bond substrate 600 is not bonded to the base substrate 603 in some cases. One reason is that the periphery of the bond substrate 600 is chamfered or has a curvature, so that the base substrate 603 and the insulating layer 601 are not located in contact with each other or separation is not easily performed along the fragile layer 602 at the periphery of the bond substrate 600. Another reason is that polishing such as CMP performed at the time of manufacture of the bond substrate 600 is not enough at the periphery of the bond substrate 600, so that a surface of the periphery is rougher than that of a central portion. Still another reason is that, in the case where a carrier or the like damages the periphery of the bond substrate 600 at the time of delivery of the bond substrate 600, the damage makes it difficult to bond the periphery to the base substrate 603. For these reasons, the semiconductor layer 604 which is smaller than the bond substrate 600 is attached to the base substrate 603.

Note that the bond substrate 600 may be subjected to hydrogenation treatment before the bond substrate 600 is separated. Hydrogenation treatment is performed, for example, at 350° C. for about two hours in a hydrogen atmosphere.

In the case where a plurality of bond substrates 600 are attached to the base substrate 603, the plurality of bond substrates 600 may have different crystal plane orientation. The mobility of majority carriers in a semiconductor depends on crystal plane orientation. Therefore, the semiconductor layer 604 may be formed by selecting as appropriate the bond substrate 600 which has crystal plane orientation suitable for a semiconductor element to be formed. For example, when an n-type semiconductor element is formed using the semiconductor layer 604, the mobility of majority carriers in the semiconductor element can be increased by formation of the semiconductor layer 604 having a face {100}. In contrast, for example, when a p-type semiconductor element is formed using the semiconductor layer 604, the mobility of majority carriers in the semiconductor element can be increased by formation of the semiconductor layer 604 having a face {110}. In the case where a transistor is formed as a semiconductor element, the attachment direction of the semiconductor layer 604 is determined in consideration of a channel direction and crystal plane orientation.

Next, a surface of the semiconductor layer 604 may be planarized by polishing. The planarization is not necessarily essential; however, the planarization makes it possible to improve the characteristics of an interface between semiconductor layers 611 and 612 and a gate insulating layer which are to be formed later. Specifically, the polishing can be performed by chemical mechanical polishing (CMP), liquid jet polishing, or the like. The thickness of the semiconductor layer 604 is decreased by the planarization. The planarization may be performed on the semiconductor layer 604 which is not etched or may be performed on the semiconductor layers 611 and 611 formed by etching.

Instead of polishing, etching may be performed on the surface of the semiconductor layer 604 so that the surface of the semiconductor layer 604 can be planarized. The etching may be performed by dry etching such as reactive ion etching (RIE), inductively coupled plasma (ICP) etching, electron cyclotron resonance (RIE) etching, parallel plate (capacitively coupled) etching, magnetron plasma etching, dual frequency plasma etching, or helicon wave plasma etching.

For example, when ICP etching is employed, etching may be performed under the following conditions: the flow rate of chlorine, which is an etching gas is 40 to 100 sccm; the electric power applied to a coil-shaped electrode is 100 to 200 W; the electric power applied to a lower electrode (on a bias side) is 40 to 100 W; and the reaction pressure is 0.5 to 1.0 Pa. For example, the thickness of the semiconductor layer 604 can be reduced to about 50 to 60 nm by etching under the conditions that the flow rate of chlorine as an etching gas is 100 sccm, the reaction pressure is 1.0 Pa, the temperature of the lower electrode is 70° C., the RF (13.56 MHz) electric power applied to the coil-shaped electrode is 150 W, the electric power applied to the lower electrode (on the bias side) is 40 W, and the etching time is about 25 to 27 seconds. For the etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

By the etching, the thickness of the semiconductor layer 604 can be reduced to be optimal for a semiconductor element to be formed later and the surface of the semiconductor layer 604 can be planarized.

Note that in the semiconductor layer 604 which is located in contact with the base substrate 603, crystal defects are formed due to the formation of the fragile layer 602 and the separation along the fragile layer 602, or the planarity of the surface of the semiconductor layer 604 is impaired. Thus, in order to reduce crystal defects and improve planarity, the semiconductor layer 604 may be irradiated with a laser beam after treatment for removing an oxide film such as a native oxide film which is formed on the surface of the semiconductor layer 604.

Note that the semiconductor layer 604 may be immersed in DHF with a hydrogen fluoride concentration of 0.5 wt % for 110 seconds, so that the oxide film is removed.

Figure 21B:
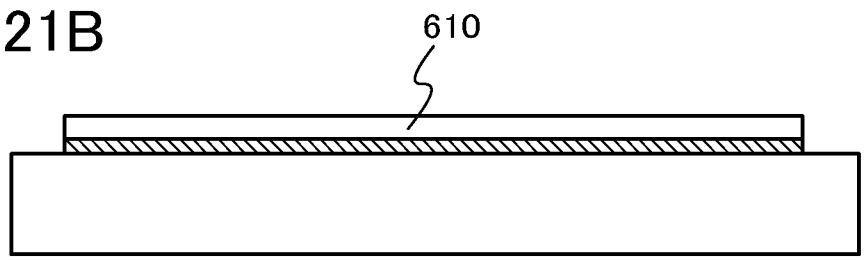

Specifically, in the case where the thickness of the semiconductor layer 604 is 146 nm, the laser beam irradiation can be performed in the following manner. As a laser apparatus of a laser beam, a XeCl excimer laser (wavelength: 308 nm, pulse width: 20 ns, and repetition rate: 30 Hz) is used. A cross section of the laser beam is shaped into a linear form with a size of 0.4 mm×120 mm through an optical system. The laser scan speed is 0.5 mm/s; the scan pitch is 16.7 μm; and the beam shot number is about 24. In this manner, the semiconductor layer 604 is irradiated with the laser beam. Through the laser beam irradiation, a semiconductor layer 610 whose crystal defects are repaired is formed as illustrated in FIG. 21B.

In order to perform the laser light irradiation in a reduced pressure atmosphere or an inert atmosphere such as a rare gas atmosphere or a nitrogen atmosphere, the laser light irradiation may be performed in an airtight chamber whose atmosphere is controlled. If the chamber is not used, the laser beam irradiation in an inert atmosphere can be realized by spraying an inert gas such as a nitrogen gas to the surface to be irradiated with the laser beam. The laser beam irradiation is performed in an inert atmosphere or a reduced pressure atmosphere instead of an air atmosphere, so that a native oxide film is further prevented from being formed, cracks or pitch stripes can be prevented from being formed in the semiconductor layer 610 which is formed after the laser beam irradiation, the planarity of the semiconductor layer 611 can be improved, and the applicable energy range for the laser beam can be broadened.

In the case where the surface of the semiconductor layer 604 is planarized by dry etching before the laser beam irradiation, damages such as crystal defects might be caused on and near the surface of the semiconductor layer 604 by the dry etching. However, the laser irradiation can recover even the damages are caused by the dry etching.

Note that a surface of the semiconductor layer 610 may be etched after the laser beam irradiation so that the thickness of the semiconductor layer 610 can be reduced to be optimal for the semiconductor element to be formed later and the surface of the semiconductor layer 610 can be planarized.

After the laser beam irradiation, the semiconductor layer 610 is preferably subjected to heat treatment at 500 to 650° C. This heat treatment can eliminate defects of the semiconductor layer 610, which are not repaired by the laser beam irradiation, and can relieve distortion of the semiconductor layer 610. For this heat treatment, a rapid thermal annealing (RTA) apparatus, a resistive heating furnace, or a microwave heating apparatus can be used. As an RTA apparatus, a gas rapid thermal annealing (GRTA) apparatus or a lamp rapid thermal annealing (LRTA) apparatus can be used. In the case where a GRTA apparatus is used, heating temperature can be 550 to 650° C. and processing time can be 0.5 to 60 minutes. For example, in the case where a resistive heating apparatus is used, heating at a temperature of 500° C. may be performed for one hour and then heating at 550° C. may be performed for four hours.

Figure 21C:
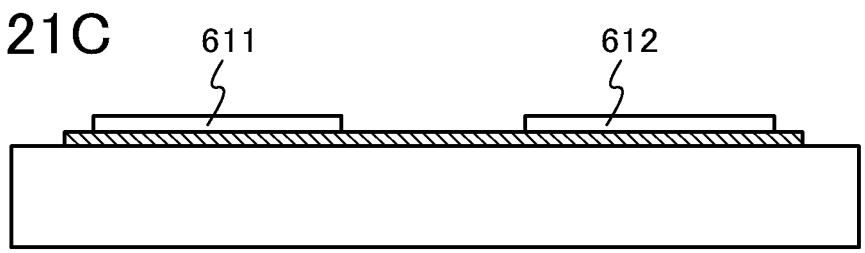

Next, as illustrated in FIG. 21C, the semiconductor layer 610 is partly etched so that the island-shaped semiconductor layers 611 and 612 are formed. When the semiconductor layer 610 is further etched, edges of the semiconductor layer 610 that do not have enough bonding strength can be removed.

Although the semiconductor layers 611 and 612 are formed by etching of the semiconductor layer 610 in this embodiment, the number of semiconductor layers which are formed is not limited to two.

In order to control the threshold voltage, a p-type impurity such as boron, aluminum, or gallium or an n-type impurity such as phosphorus or arsenic may be added to the semiconductor layers 611 and 612. An impurity for controlling the threshold voltage may be added to the semiconductor layer 610 which is not patterned or may be added to the patterned semiconductor layers 611 and 612. Alternatively, the impurity for controlling the threshold voltage may be added to the bond substrate. Alternatively, the impurity may be added to the bond substrate in order to roughly control the threshold voltage, and the impurity may be further added to the semiconductor layer which is not patterned or the patterned semiconductor layers 611 and 612 in order to finely control the threshold voltage.

Figure 21D:
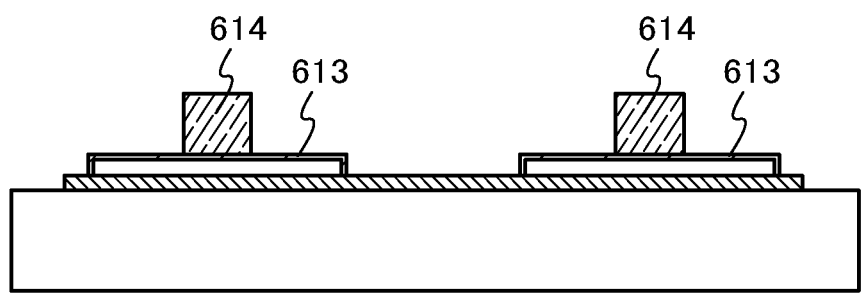

As illustrated in FIG. 21D, gate insulating layers 613 are formed so as to cover the semiconductor layers 611 and 612. The gate insulating layers 613 can be formed by oxidation or nitriding of surfaces of the semiconductor layers 611 and 612 by high-density plasma treatment. The high-density plasma treatment is performed using, for example, a mixed gas of a rare gas such as He, Ar, Kr, or Xe and oxygen, nitrogen oxide, ammonia, nitrogen, hydrogen, or the like. In that case, when plasma is excited by introduction of microwaves, plasma with a low electron temperature and high density can be generated. By oxidation or nitriding of the surfaces of the semiconductor layers 611 and 612 with oxygen radicals (including OH radicals in some cases) or nitrogen radicals (including NH radicals in some cases) generated by such high-density plasma, an insulating film having a thickness of 1 to 20 nm, typically 5 to 10 nm is formed so as to be in contact with the semiconductor layers. The insulating film having a thickness of 5 to 10 nm is used for the gate insulating layers 613. For example, dinitrogen monoxide ($N_2O$) is diluted with Ar by 1 to 3 times (flow rate) and a microwave (2.45 GHz) electric power of 3 to 5 kW is applied with a pressure of 10 to 30 Pa so that the oxidation or nitriding of the surfaces of the semiconductor layers 611 and 612 is performed. By this treatment, an insulating film having a thickness of 1 to 10 nm (preferably 2 to 6 nm) is formed. Further, dinitrogen monoxide ($N_2O$) and silane ($SiH_4$) are introduced and a microwave (2.45 GHz) electric power of 3 to 5 kW is applied with a pressure of 10 to 30 Pa so that a silicon oxynitride film is formed by vapor deposition, thereby forming a gate insulating layer. With a combination of solid-phase reaction and vapor deposition, a gate insulating layer having low interface state density and high withstand voltage can be formed.

The oxidation or nitriding of the semiconductor layers by the high-density plasma treatment proceeds by solid-phase reaction. Therefore, interface state density between the gate insulating layers 613 and the semiconductor layers 611 and 612 can be made extremely low. Further, by direct oxidation or nitriding of the semiconductor layers 611 and 612 by high-density plasma treatment, variations in the thickness of the insulating film to be formed can be suppressed. Variations in the characteristics of a transistor whose gate insulating layer partly or entirely includes an insulating film formed by high-density plasma treatment can be suppressed.

Alternatively, the gate insulating layers 613 may be formed by thermal oxidation of the semiconductor layers 611 and 612. The gate insulating layers 613 may be formed using a single layer or a stack of layers of a film including silicon oxide, silicon nitride oxide, silicon oxynitride, silicon nitride, hafnium oxide, aluminum oxide, or tantalum oxide by plasma-enhanced CVD, sputtering, or the like.

Next, after a conductive film is formed over the gate insulating layers 613, the conductive layer is processed (patterned) to have a desired shape so that gate layers 614 are formed over the semiconductor layers 611 and 612. The conductive film can be formed by CVD, sputtering, or the like. For the conductive film, tantalum (Ta), tungsten (W), titanium (Ti), molybdenum (Mo), aluminum (Al), copper (Cu), chromium (Cr), niobium (Nb), or the like may be used. Alternatively, either an alloy containing the metal as its main component or a compound containing the metal may be used. Alternatively, the conductive film may be formed using a semiconductor such as polycrystalline silicon that is doped with an impurity element which imparts conductivity, such as phosphorus, to a semiconductor layer.

As a combination of two conductive films, tantalum nitride or tantalum (Ta) is used for a first conductive film and tungsten (W) is used for a second conductive film. As well as the example, any of the following combination can be used: tungsten nitride and tungsten; molybdenum nitride and molybdenum; aluminum and tantalum; aluminum and titanium; and the like. Since tungsten and tantalum nitride have high heat resistance, heat treatment for thermal activation can be performed in a step performed after the two conductive films are formed. Alternatively, as the combination of the two conductive films, for example, nickel silicide and silicon doped with an impurity which imparts n-type conductivity, tungsten silicide and silicon doped with an impurity which imparts n-type conductivity, or the like can be used.

Although the gate layer 614 is formed using a single-layer conductive film in this embodiment, the structure of the gate layer 614 is not limited to this structure. The gate layer 614 may be formed using a plurality of conductive films which are stacked. In the case of a three-layer structure in which three or more conductive films are stacked, a layered structure of a molybdenum film, an aluminum film, and a molybdenum film is preferably used.

Note that the gate layer 614 may be selectively formed by a droplet discharge method without the use of a mask Note that the droplet discharge method is a method for forming a predetermined pattern by discharge or ejection of a droplet containing a predetermined composition from an orifice, and includes an inkjet method in its category.

In addition, the gate layer 614 may be formed by forming a conductive film, and the conductive film is etched by inductively coupled plasma (ICP) etching under appropriately controlled conditions (e.g., the amount of electric power applied to a coil-shaped electrode layer, the amount of electric power applied to an electrode layer on the substrate side, and the electrode temperature on the substrate side) to have a desired tapered shape. Further, an angle and the like of the tapered shape may be controlled by the shape of a mask. Note that for an etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

Figure 22A:
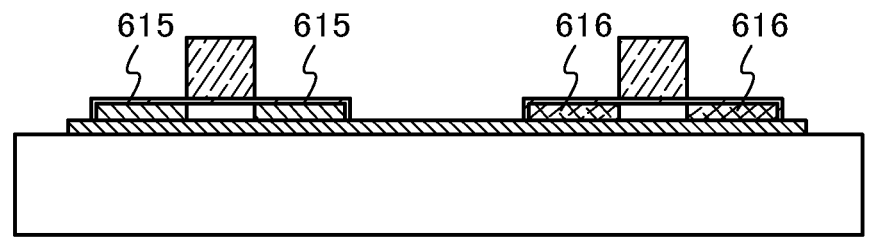
FIGS. 22A to 22C are cross-sectional views illustrating the specific example of the method for manufacturing a transistor with the use of an SOI substrate.

Next, as illustrated in FIG. 22A, an impurity element imparting one conductivity type is added to each of the semiconductor layers 611 and 612 with the gate layers 614 used as masks. Here, an impurity element imparting n-type conductivity (e.g., phosphorus or arsenic) is added to the semiconductor layer 611, and an impurity element imparting p-type conductivity (e.g., boron) is added to the semiconductor layer 612. Note that when the impurity element imparting p-type conductivity is added to the semiconductor layer 612, the semiconductor layer 611 to which the n-type impurity element is added is covered with the mask or the like so that the impurity element imparting p-type conductivity is added selectively. On the other hand, when the n-type impurity element is added to the semiconductor layer 611, the semiconductor layer 612 to which the p-type impurity element is added is covered with the mask or the like so that the n-type impurity element is added selectively. Alternatively, an impurity element imparting one of p-type conductivity and n-type conductivity is added to the semiconductor layers 611 and 612 in advance, and then, an impurity element imparting the other of p-type conductivity and n-type conductivity may be added to one of the semiconductor layers selectively at a higher concentration than the added impurity. By the impurity addition, impurity regions 615 are formed in the semiconductor layer 611 and impurity regions 616 are formed in the semiconductor layer 612.

Figure 22B:
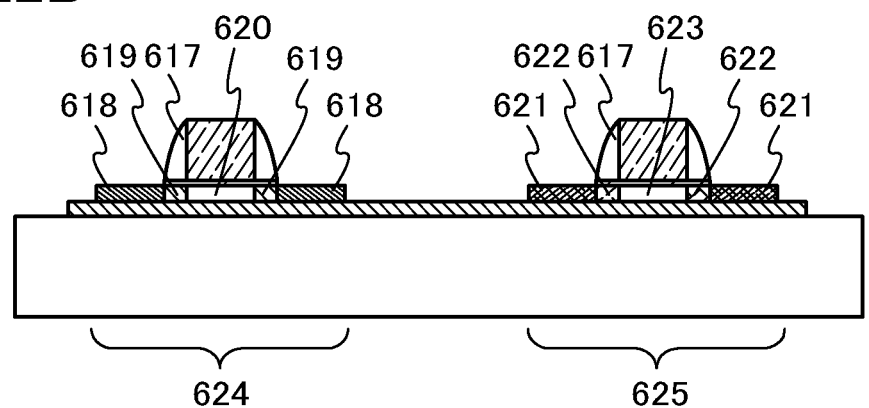

Next, as illustrated in FIG. 22B, sidewalls 617 are formed on side surfaces of the gate layers 614. For example, the sidewalls 617 can be formed in such a manner that an insulating film is additionally formed so as to cover the gate insulating layers 613 and the gate layers 614 and is partly etched by anisotropic etching in which etching is performed mainly in a perpendicular direction. By the anisotropic etching, the additionally formed insulating film is partly etched so that the sidewalls 617 on the side surfaces of the gate layers 614 are formed. Note that the gate insulating layers 613 may also be partly etched by the anisotropic etching. The insulating film used for forming the sidewalls 617 can be a single layer or a stack of layers of a silicon film, a silicon oxide film, a silicon oxynitride film, or a silicon nitride oxide film formed by LPCVD, plasma-enhanced CVD, sputtering, or the like. A film containing an organic material such as an organic resin may also be used as the insulating film used for sidewalls 617. In this embodiment, a 100-nm-thick silicon oxide film is formed by plasma-enhanced CVD. As an etching gas, a mixed gas of $CHF_3$ and helium can be used. Note that the steps of forming the sidewalls 617 are not limited to these steps.

Next, an impurity element imparting one conductivity type is added to each of the semiconductor layers 611 and 612 with the gate layers 614 and the sidewalls used as masks. Note that an impurity element imparting the same conductivity as that of the impurity element which has been added in the former step is added to each of the semiconductor layers 611 and 612 at a higher concentration. When an impurity element imparting p-type conductivity is added to the semiconductor layer 612, the semiconductor layer 611 to which an n-type impurity element is added is covered with the mask or the like so that the impurity element imparting p-type conductivity is added selectively. On the other hand, when the n-type impurity element is added to the semiconductor layer 611, the semiconductor layer 612 to which the p-type impurity element is added is covered with the mask or the like so that the n-type impurity element is added selectively.

By the addition of the impurity element, a pair of high-concentration impurity regions 618, a pair of low-concentration impurity regions 619, and a channel formation region 620 are formed in the semiconductor layer 611. Further, by the addition of the impurity element, a pair of high-concentration impurity regions 621, a pair of low-concentration impurity regions 622, and a channel formation region 623 are formed in the semiconductor layer 612. The high-concentration impurity regions 618 and the high-concentration impurity regions 621 each serve as a source region or a drain region. The low-concentration impurity regions 619 and the low-concentration impurity regions 622 each serve as a lightly doped drain (LDD) region. Note that the LDD regions are not necessarily provided, and only impurity regions which serve as source and drain regions may be formed. Alternatively, the LDD region may be formed on one of the source region side and the drain region side.

Note that in the case of a transistor including silicon, a source region and a drain region serve as a source layer and a drain layer.

Next, in order to further reduce the resistance of the source region and the drain region, silicidation may be performed on the semiconductor layers 611 and 612 to silicide layers. The silicidation is performed in such a manner that the semiconductor layers are in contact with a metal and heated by a GRTA method, a LRTA method, or the like to allow silicon in the semiconductor layers to react with the metal. The silicide layer is exemplified by cobalt silicide or nickel silicide. In the case where the thickness of each of the semiconductor layers 611 and 612 is small, silicidation may proceed to bottom portions of the semiconductor layers 611 and 612. As a metal used for the formation of the silicide, titanium (Ti), nickel (Ni), tungsten (W), molybdenum (Mo), cobalt (Co), zirconium (Zr), hafnium (Hf), tantalum (Ta), vanadium (V), neodymium (Nd), chromium (Cr), platinum (Pt), palladium (Pd), or the like can be used. Alternatively, the silicidation may be performed by laser irradiation, light irradiation using a lamp or the like.

Through the series of steps, an n-channel transistor 624 and a p-channel transistor 625 are formed.

Figure 22C:
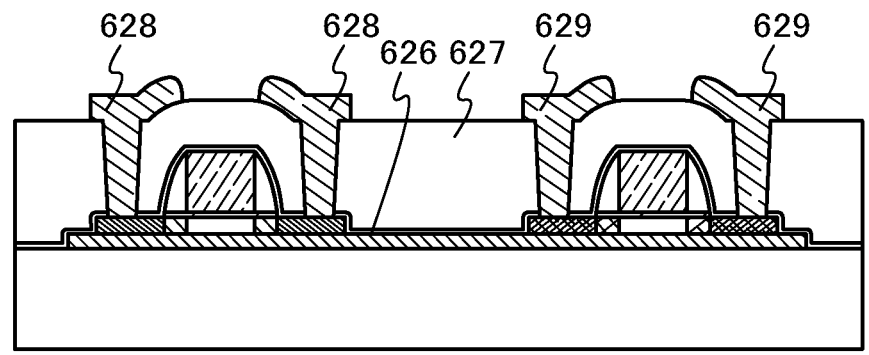

Next, as illustrated in FIG. 22C, an insulating film 626 is formed so as to cover the transistors 624 and 625. By provision of the insulating film 626, oxidation of surfaces of the gate layers 614 can be prevented when heat treatment is performed. Specifically, it is preferable to use silicon nitride, silicon nitride oxide, silicon oxynitride, aluminum nitride, aluminum oxide, silicon oxide, or the like for the insulating film 626. In this embodiment, a silicon oxynitride film with a thickness of approximately 50 nm is used as the insulating film 626.

Then, an insulating film 627 is formed over the insulating film 626 so as to cover the transistors 624 and 625. An organic material having heat resistance, such as a polyimide, an acrylic resin, a benzocyclobutene-based resin, a polyamide, or an epoxy resin can be used for the insulating film 627. As well as such an organic material, a low-dielectric constant material (a low-k material), a siloxane-based resin, silicon oxide, silicon nitride, silicon oxynitride, silicon nitride oxide, phosphosilicate glass (PSG), borophosphosilicate glass (BPSG), alumina, or the like can be used. As well as hydrogen, at least one of fluorine, an alkyl group, and aromatic hydrocarbon may be used as a substituent of a siloxane-based resin. Note that the insulating film 627 may be formed using a stack of a plurality of insulating films formed using any of these materials. A surface of the insulating film 627 may be planarized by CMP or the like.

Note that a siloxane-based resin corresponds to a resin including a Si—O—Si bond. As well as hydrogen, at least one of fluorine, an alkyl group, and aromatic hydrocarbon may be used as a substituent of a siloxane-based resin.

The insulating film 627 can be formed, depending on the material, by a method such as CVD, sputtering, SOG, spin coating, dipping, spray coating, a droplet discharge method (e.g., an inkjet method), a screen printing method, or an offset printing method.

Next, contact holes are formed in the insulating films 626 and 627 so that the semiconductor layers 611 and 612 are partly exposed. Then, conductive films 628 and conductive films 629 which are in contact with the semiconductor layers 611 and 612 through the contact holes are formed. As an etching gas used for forming the contact holes, a mixed gas of $CHF_3$ and He is employed; however, the etching gas is not limited to this.

The conductive films 628 and 629 can be formed by CVD, sputtering, or the like. Specifically, for the conductive films 628 and 629, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon (Si), or the like can be used. Further, an alloy containing the metal as its main component or a compound containing the metal may be used. The conductive films 628 and 629 can be formed using a single layer or a stack of layers of a film formed using the metal.

An example of an alloy containing aluminum as its main component is a nickel-containing aluminum. Another example is an alloy which contains aluminum as its main component and contains nickel and one or both of carbon and silicon. Since aluminum and aluminum silicon have low resistance values and are inexpensive, aluminum and aluminum silicon are suitable for materials used for the conductive films 628 and 629. In comparison to an aluminum film, an aluminum silicon film can particularly prevent generation of hillocks during resist baking at the time of patterning the conductive films 628 and 629. Further, instead of silicon (Si), copper (Cu) may be mixed into the aluminum film at about 0.5%.

For example, a layered structure of a barrier film, an aluminum silicon film, and a barrier film or a layered structure of a barrier film, an aluminum silicon film, a titanium nitride film, and a barrier film may be used for the conductive films 628 and 629. Note that a barrier film is a film formed using titanium, a nitride of titanium, molybdenum, or a nitride of molybdenum. When barrier films are formed with an aluminum silicon film provided therebetween, generation of hillocks in aluminum or aluminum silicon can be further prevented. Alternatively, when the barrier film is formed using titanium that has an ability as an reductant, even if a thin oxide film is formed over the semiconductor layers 611 and 612, the oxide film is reduced by titanium contained in the barrier film, so that favorable contact between the conductive films 628 and 629 and the semiconductor layers 611 and 612 can be obtained. Moreover, a plurality of barrier films may be stacked.

Note that the conductive films 628 are connected to the high-concentration impurity regions 618 in the n-channel transistor 624. The conductive films 629 are connected to the high-concentration impurity regions 621 in the p-channel transistor 625.

Note that although the case where each of the n-channel transistor 624 and the p-channel transistor 625 includes one gate layer 614 is illustrated in this embodiment, the present invention is not limited to this structure. The transistor may have a multi-gate structure in which a plurality of gate layers are included and are electrically connected to each other.

<Various Kinds of Electronic Devices Including Liquid Crystal Display Device>

Examples of electronic devices each including the liquid crystal display device disclosed in this specification are described below with reference to FIGS. 18A to 18F.

Figure 18A:
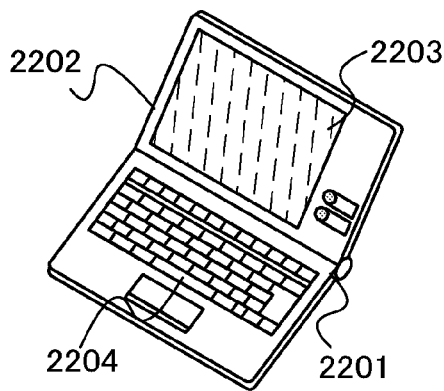
FIGS. 18A to 18F illustrate examples of electronic devices.

FIG. 18A illustrates a laptop personal computer, which includes a main body 2201, a housing 2202, a display portion 2203, a keyboard 2204, and the like.

Figure 18B:
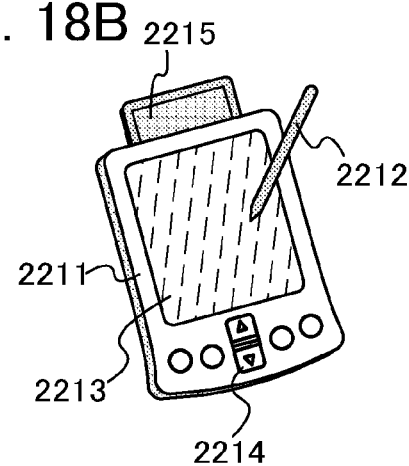

FIG. 18B illustrates a portable information terminal (PDA), which includes a main body 2211 provided with a display portion 2213, an external interface 2215, operation buttons 2214, and the like. Further, a stylus 2212 for operation is included as an accessory.

Figure 18C:
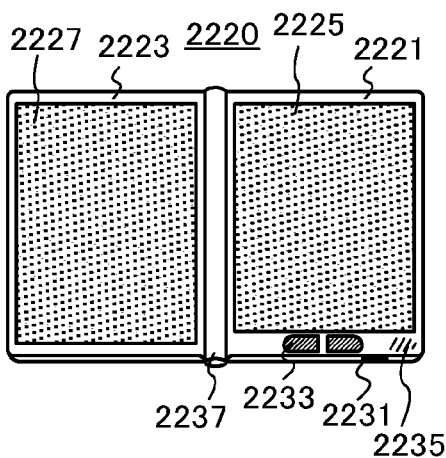

FIG. 18C illustrates an e-book reader 2220 as an example of electronic paper. The e-book reader 2220 includes two housings 2221 and 2223. The housings 2221 and 2223 are combined with each other with a hinge 2237 so that the e-book reader 2220 can be opened and closed with the hinge 2237 used as an axis. With such a structure, the e-book reader 2220 can be used like a paper book.

A display portion 2225 is incorporated in the housing 2221, and a display portion 2227 is incorporated in the housing 2223. The display portions 2225 and 2227 may display one image or different images. In the case where the display portions 2225 and 2227 display different images, for example, a display portion on the right side (the display portion 2225 in FIG. 18C) can display text and a display portion on the left side (the display portion 2227 in FIG. 18C) can display images.

Further, in FIG. 18C, the housing 2221 includes an operation portion and the like. For example, the housing 2221 includes a power button 2231, operation keys 2233, a speaker 2235, and the like. With the operation key 2233, pages can be turned. Note that a keyboard, a pointing device, or the like may be provided on the same surface as the display portion of the housing. Further, an external connection terminal (e.g., an earphone terminal, a USB terminal, or a terminal which can be connected to an AC adapter or a variety of cables such as USB cables), a recording medium insertion portion, or the like may be provided on a back surface or a side surface of the housing. Furthermore, the e-book reader 2220 may function as an electronic dictionary.

The e-book reader 2220 may transmit and receive data wirelessly. Through wireless communication, desired book data or the like can be purchased and downloaded from an electronic book server.

Note that electronic paper can be applied to devices in a variety of fields as long as they display information. For example, electronic paper can be used for posters, advertisement in vehicles such as trains, display in a variety of cards such as credit cards, and the like in addition to e-book readers.

Figure 18D:
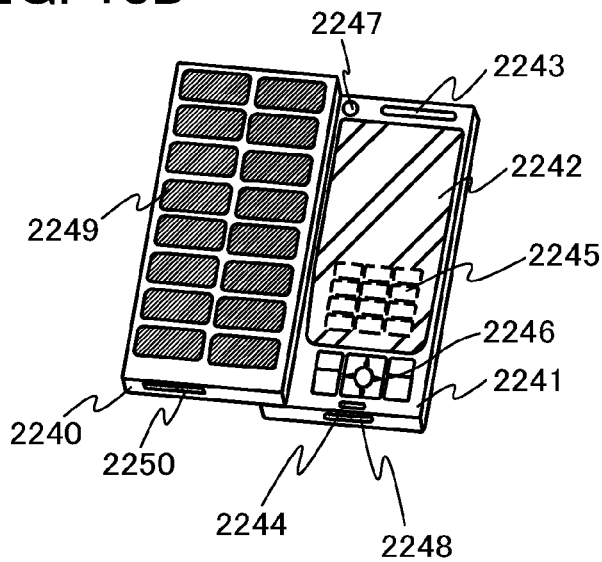

FIG. 18D illustrates a cellular phone. The cellular phone includes two housings 2240 and 2241. The housing 2241 includes a display panel 2242, a speaker 2243, a microphone 2244, a pointing device 2246, a camera lens 2247, an external connection terminal 2248, and the like. The housing 2240 includes a solar cell 2249 for storing electricity in the cellular phone, an external memory slot 2250, and the like. Further, an antenna is incorporated in the housing 2241.

The display panel 2242 has a touch panel function. A plurality of operation keys 2245 which are displayed as images are indicated by dashed lines in FIG. 18D. Note that the cellular phone includes a DC-DC converter for raising voltage output from the solar cell 2249 to voltage needed for each circuit. Further, the cellular phone can include a contactless IC chip, a small recording device, or the like in addition to the above components.

The display direction of the display panel 2242 is changed as appropriate in accordance with applications. Further, the camera lens 2247 is provided on the same surface as the display panel 2242; thus, the cellular phone can be used as a video phone. The speaker 2243 and the microphone 2224 can be used for videophone calls, recording, and playing sound, and the like as well as voice calls. Furthermore, the housings 2240 and 2241 which are developed as illustrated in FIG. 18D can overlap with each other by sliding; thus, the size of the cellular phone can be decreased, which makes the cellular phone suitable for being carried.

The external connection terminal 2248 can be connected to an AC adapter or a variety of cables such as USB cables, so that electricity can be stored and data communication can be performed. In addition, a larger amount of data can be saved and moved by insertion of a recording medium in the external memory slot 2250. Further, in addition to the above functions, the cellular phone may have an infrared communication function, a television reception function, or the like.

Figure 18E:
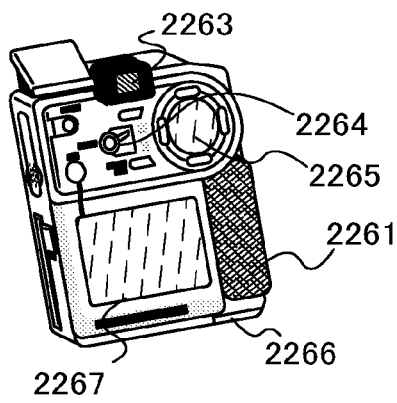

FIG. 18E illustrates a digital camera. The digital camera includes a main body 2261, a first display portion 2267, an eyepiece portion 2263, an operation switch 2264, a second display portion 2265, a battery 2266, and the like.

Figure 18F:
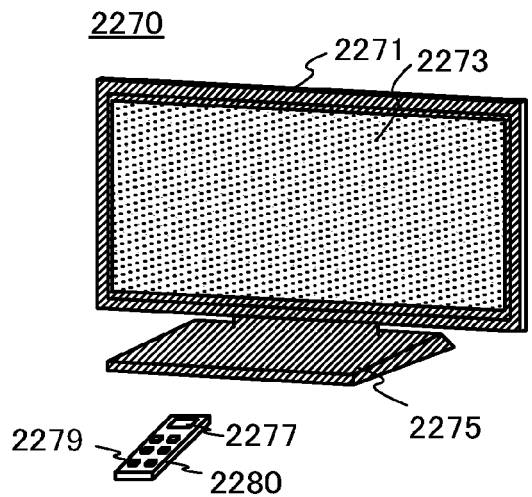

FIG. 18F illustrates a television set. A television set 2270 includes a display portion 2273 incorporated in a housing 2271. The display portion 2273 can display images. Note that here, the housing 2271 is supported by a stand 2275.

The television set 2270 can be operated by an operation switch of the housing 2271 or a remote control 2280. Channels and volume can be controlled with operation keys 2279 of the remote control 2280, so that an image displayed on the display portion 2273 can be controlled. Further, the remote control 2280 may have a display portion 2227 for displaying data output from the remote control 2280.

Note that the television set 2270 preferably includes a receiver, a modem, and the like. A general television broadcast can be received with the receiver. Further, when the television set is connected to a communication network with or without wires via the modem, one-way (from a transmitter to a receiver) or two-way (between a transmitter and a receiver or between receivers) data communication can be performed.

This application is based on Japanese Patent Application serial No. 2010-090938 and Japanese Patent Application serial No. 2010-090944 filed with Japan Patent Office on Apr. 9, 2010 and Japanese Patent Application serial No. 2010-114440 and Japanese Patent Application serial No. 2010-114445 filed with Japan Patent Office on May 18, 2010, the entire contents of which are hereby incorporated by reference.

What is claimed is:

1. A liquid crystal display device comprising a plurality of pixels, at least one of the plurality of pixels comprising:
   a first signal line, a second signal line, and a third signal line;
   a first scan line, a second scan line, and a third scan line;
   a first transistor, a second transistor, and a third transistor; and
   a liquid crystal element,
   wherein a gate of the first transistor is electrically connected to the first scan line, a first terminal of the first transistor is electrically connected to the first signal line without passing through a semiconductor, and a second terminal of the first transistor is electrically connected to a first electrode of the liquid crystal element, a second terminal of the second transistor, and a second terminal of the third transistor,
   wherein a gate of the second transistor is electrically connected to the second scan line and a first terminal of the second transistor is electrically connected to the second signal line without passing through the semiconductor,
   wherein a gate of the third transistor is electrically connected to the third scan line and a first terminal of the third transistor is electrically connected to the third signal line without passing through the semiconductor, and
   wherein each of the first to third transistors comprises a semiconductor layer which comprises a polycrystalline semiconductor or a single crystal semiconductor.

2. The liquid crystal display device according to claim 1, wherein the one of the plurality of pixels comprises a capacitor, and
   wherein a first terminal of the capacitor is electrically connected to the second terminal of the first transistor.

3. The liquid crystal display device according to claim 1, further comprising a plurality of backlight units,
   wherein each of the plurality of backlight units comprises a light source of red color, a light source of green color, and a light source of blue color.

4. The liquid crystal display device according to claim 1, further comprising a first shift register, a second shift register, and a third shift register, wherein the first transistor is electrically connected to the first shift register, wherein the second transistor is electrically connected to the second shift register, and wherein the third transistor is electrically connected to the third shift register.

5. A liquid crystal display device comprising:
a first signal line, a second signal line, and a third signal line;
a first pixel comprising:
  a first scan line, a second scan line, and a third scan line;
  a first transistor, a second transistor, and a third transistor; and
  a first liquid crystal element;
a second pixel comprising:
  a fourth scan line, a fifth scan line, and a sixth scan line;
  a fourth transistor, a fifth transistor, and a sixth transistor; and
  a second liquid crystal element; and
a third pixel comprising:
  a seventh scan line, an eighth scan line, and a ninth scan line;
  a seventh transistor, an eighth transistor, and a ninth transistor; and
  a third liquid crystal element; and
wherein a gate of the first transistor is electrically connected to the first scan line, a first terminal of the first transistor is electrically connected to the first signal line without passing through a semiconductor, and a second terminal of the first transistor is electrically connected to a second terminal of the second transistor, a second terminal of the third transistor, and a first electrode of the first liquid crystal element, wherein a gate of the second transistor is electrically connected to the second scan line and a first terminal of the second transistor is electrically connected to the second signal line without passing through the semiconductor, wherein a gate of the third transistor is electrically connected to the third scan line and a first terminal of the third transistor is electrically connected to the third signal line without passing through the semiconductor, wherein a gate of the fourth transistor is electrically connected to the fourth scan line, a first terminal of the fourth transistor is electrically connected to the first signal line, and a second terminal of the fourth transistor is electrically connected to a second terminal of the fifth transistor without passing through the semiconductor, a second terminal of the sixth transistor, and a first electrode of the second liquid crystal element, wherein a gate of the fifth transistor is electrically connected to the fifth scan line and a first terminal of the fifth transistor is electrically connected to the second signal line without passing through the semiconductor, wherein a gate of the sixth transistor is electrically connected to the sixth scan line and a first terminal of the sixth transistor is electrically connected to the third signal line without passing through the semiconductor, wherein a gate of the seventh transistor is electrically connected to the seventh scan line, a first terminal of the seventh transistor is electrically connected to the first signal line, and a second terminal of the seventh transistor is electrically connected to a second terminal of the eighth transistor without passing through the semiconductor, a second terminal of the ninth transistor, and a first electrode of the third liquid crystal element, wherein a gate of the eighth transistor is electrically connected to the eighth scan line and a first terminal of the eighth transistor is electrically connected to the second signal line without passing through the semiconductor, wherein a gate of the ninth transistor is electrically connected to the ninth scan line and a first terminal of the ninth transistor is electrically connected to the third signal line without passing through the semiconductor, wherein each of the first to ninth transistors comprises a semiconductor layer which comprises a polycrystalline semiconductor or a single crystal semiconductor.

6. The liquid crystal display device according to claim 5,
wherein the first signal line is configured to supply a first image signal in a first horizontal scan period included in a first sampling period, a second image signal in a first horizontal scan period included in a second sampling period, and a third image signal in a first horizontal scan period included in a third sampling period, wherein the second signal line is configured to supply a fourth image signal in the first horizontal scan period included in the first sampling period, a fifth image signal in the first horizontal scan period included in the second sampling period, and a sixth image signal in the first horizontal scan period included in the third sampling period, and wherein the third signal line is configured to supply a seventh image signal in the first horizontal scan period included in the first sampling period, an eighth image signal in the first horizontal scan period included in the second sampling period, and a ninth image signal in the first horizontal scan period included in the third sampling period.

7. The liquid crystal display device according to claim 5, further comprising a first shift register, a second shift register, and a third shift register,
wherein the first scan line, the fourth scan line, and the seventh scan line are electrically connected to the first shift register, wherein the second scan line, the fifth scan line, and the eighth scan line are electrically connected to the second shift register, and wherein the third scan line, the sixth scan line, and the ninth scan line are electrically connected to the third shift register.

* * * * *